United States Patent
Okazaki

(10) Patent No.: US 9,238,769 B2
(45) Date of Patent: *Jan. 19, 2016

(54) MONOLAYER FILM AND HYDROPHILIC MATERIAL COMPRISING THE SAME

(75) Inventor: Koju Okazaki, Ichihara (JP)

(73) Assignee: MITSUI CHEMICALS, INC., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/234,941

(22) PCT Filed: Jul. 25, 2011

(86) PCT No.: PCT/JP2011/066794
§ 371 (c)(1),
(2), (4) Date: Jan. 24, 2014

(87) PCT Pub. No.: WO2013/014733
PCT Pub. Date: Jan. 31, 2013

(65) Prior Publication Data
US 2014/0154451 A1   Jun. 5, 2014

(51) Int. Cl.
*C09K 3/18* (2006.01)
*C09K 8/16* (2006.01)
*C09D 4/00* (2006.01)
*C09D 5/00* (2006.01)
*C09D 133/06* (2006.01)
*C09D 133/14* (2006.01)
*C08F 220/38* (2006.01)
*C09D 5/16* (2006.01)
*B05D 1/18* (2006.01)

(52) U.S. Cl.
CPC ............... *C09K 3/18* (2013.01); *C08F 220/38* (2013.01); *C09D 4/00* (2013.01); *C09D 5/00* (2013.01); *C09D 5/1668* (2013.01); *C09D 133/06* (2013.01); *C09D 133/14* (2013.01); *C09K 8/16* (2013.01); *B05D 1/185* (2013.01); *Y10T 428/1462* (2015.01); *Y10T 428/263* (2015.01); *Y10T 428/2848* (2015.01); *Y10T 428/31938* (2015.04)

(58) Field of Classification Search
CPC ......... C08G 75/24; C08F 2/38; C08F 220/38; C09D 4/00; C09D 5/00; C09D 5/1668; C09D 133/06; C09D 133/14; C08J 7/04; C09K 3/18; C09K 8/16; Y10T 428/263; Y10T 428/2848; Y10T 428/1462; Y10T 428/31938

USPC ............... 524/556; 526/287, 288, 321, 323.1, 526/323.2; 528/363

See application file for complete search history.

(56) References Cited

U.S. PATENT DOCUMENTS

| 4,274,933 | A | 6/1981 | Kamada et al. |
| 6,592,898 | B2 | 7/2003 | Munro et al. |
| 8,617,711 | B2 * | 12/2013 | Okazaki et al. ............... 428/409 |
| 9,034,464 | B2 * | 5/2015 | Okazaki ........................ 428/220 |
| 2006/0165934 | A1 | 7/2006 | Okazaki et al. |
| 2009/0191373 | A1 * | 7/2009 | Okazaki et al. .............. 428/41.8 |

FOREIGN PATENT DOCUMENTS

| JP | S63-006064 A | 1/1988 |
| JP | S63-151901 A | 6/1988 |

OTHER PUBLICATIONS

International Search Report dated Aug. 30, 2011 received in International Application No. PCT/JP2011/066794.
W.Y. Chen, Journal of Colloid and Interface Science, Apr. 1986, vol. 110(2), pp. 468-476.
Mirai Zairyou, Expected Materials for the Future Materials, Jan. 10, 2002, vol. 2(1), pp. 36-41 with English translation (partial).
Trend, Annual Research Report by Toagosei Co., Ltd., Feb. 1999, vol. 2, pp. 39-44 with English translation (partial).
Fumitoshi Tsukiyama, Koubunshi High Polymers Japan, 44(5), May 1995, p. 307 with English Translation (full).
Taiwanese Office Action dated May 19, 2015 issued in Application No. 100126143.

* cited by examiner

*Primary Examiner* — Michael M Bernshteyn
(74) *Attorney, Agent, or Firm* — Foley & Lardner LLP

(57) ABSTRACT

The invention provides monolayer films which not only have hydrophilicity and are excellent in such properties as antifogging properties, antifouling properties, antistatic properties and anti-condensation properties but also tend to exhibit excellent transparency even with a large film thickness and excellent scratch resistance, as well as stacks having the monolayer film. The monolayer film is obtained by preparing a mixture including a monomer composition and a solvent, the monomer composition including a specific monomer and a polyvalent monomer having two or more (meth)acryloyl groups and being free of sulfonic group, carboxyl group and phosphoric group in a specific molar ratio, the solvent having a specific solubility parameter σ; applying the mixture onto a substrate and removing at least part of the solvent; and polymerizing the monomer composition to produce a monolayer film having at least one anionic hydrophilic group selected from a sulfonic group, a carboxyl group and a phosphoric group and a specific anion concentration ratio (Sa/Da) of the anion concentration (Sa) at the outer surface to the anion concentration (Da) at the middle point between the inner surface in contact with the substrate and the outer surface.

10 Claims, 1 Drawing Sheet

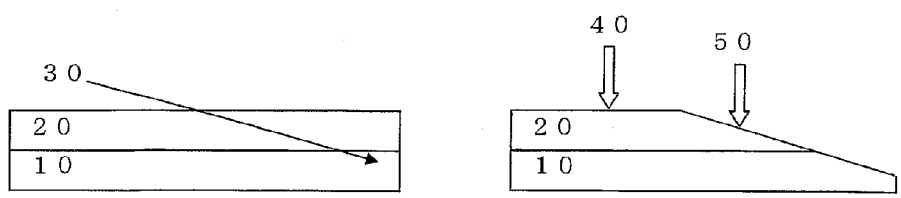

MONOLAYER FILM AND HYDROPHILIC MATERIAL COMPRISING THE SAME

This application is the National Phase of PCT/JP2011/066794, filed Jul. 25, 2011, the disclosure of which is hereby incorporated by reference in its entirety.

TECHNICAL FIELD

The present invention relates to monolayer films excellent in antifogging properties, antifouling properties and antistatic properties as well as in transparency and scratch resistance, and to stacks having the monolayer film.

BACKGROUND ART

There have recently been increasing demands that substrates formed of organic materials such as plastics and inorganic materials such as glass be improved in terms of antifogging properties and antifouling properties.

As an approach to solving the fogging problems, a method has been proposed in which an antifogging coating containing a reactive surfactant and an acrylic oligomer provides enhanced hydrophilicity and water absorption (see, for example, Non Patent Literature 1). The fouling problems have been addressed by methods in which the hydrophilicity of the surface of materials is enhanced so that fouling such as hydrophobic substances in the air which have become attached to surfaces such as exterior walls can be detached and removed from the surface by water spray or rainfall (see, for example, Non Patent Literatures 2 and 3).

As proposed in the art, the use of hydrophilic materials such as hydrophilic resins is a possible remedy to solving the problems related to fogging, fouling and the like. Many resins having a large number of hydroxyl groups in the molecule, for example, polyvinyl alcohols are known as the hydrophilic resins.

Other hydrophilic resins which are known are, for example, resins obtained by polymerizing 3-sulfopropyl methacrylate potassium salt, 2-acrylamido-2-methylpropane-sulfonic acid sodium salt and polyethylene glycol diacrylate (see, for example, Patent Literature 1), resins obtained by polymerizing 3-sulfopropyl methacrylate sodium salt and long-chain urethane diacrylate (see, for example, Patent Literature 2), resins obtained by polymerizing 2-sulfoethyl acrylate, tetrahydrofurfuryl acrylate, trimethylolpropane acrylate and spiroglycol urethane diacrylate (see, for example, Patent Literature 3), resins obtained from 2-sulfoethyl methacrylate and/or phosphoric group-containing (meth)acrylate, and epoxy resin (see, for example, Patent Literature 4), and resins obtained by polymerizing hydroxyethyl methacrylate, sulfoalkylene (C6 to C10) methacrylate and methylenebisacrylamide (see, for example, Non Patent Literature 4).

The hydrophilic resins of Patent Literature 1 are in the form of transparent gels and are allegedly usable as bioadhesives. The hydrophilic resins of Patent Literature 2 are described to be excellent in ink absorption, have high water resistance and be usable as blocking-free recording media in inkjet recording systems. Patent Literature 3 describes that the hydrophilic resins can strongly bond a metal hub for the driving of optical information disks with a resin substrate. The hydrophilic resins of Patent Literature 4 are allegedly usable as conductive cured films exhibiting excellent mechanical performance, solvent resistance, film-forming properties, adhesion, transparency and abrasion resistance. Non Patent Literature 4 discloses that the hydrophilicity of a lightly crosslinked film of the hydrophilic resin formed on glass varies depending on the length of the alkylene chain (C6 to C10) of the sulfoalkylene methacrylate used as a monomer (advancing contact angle and receding contact angle) as well as depending on the hydration time.

However, most of the above hydrophilic resins have a relatively low degree of intermolecular crosslinking to exhibit high water solubility or to show, if not being water soluble, a tendency of absorbing water to form a gel. Further, the surface is soft and easily scratched in some cases due to the relatively low degree of intermolecular crosslinking.

Further, some of the above hydrophilic resins are insufficient in terms of hydrophilicity and cannot perform appropriately as antifogging materials and antifouling materials.

On the other hand, Patent Literature 5 proposes a hydrophilic material which has a bilayer structure produced by double coating, first by applying a crosslinkable polymerizable monomer composition onto the surface of a substrate and incompletely polymerizing the composition while controlling the dose of UV irradiation to form a crosslinked polymer, and subsequently applying a hydrophilic monomer and performing UV irradiation again to block- or graft-polymerize the hydrophilic monomer to the surface of the crosslinked polymer.

However, this double coating process is complicated, adds costs, and is often unsatisfactory in terms of surface smoothness compared to a usual single coating process for producing a monolayer structure.

The present inventors have proposed a polymer obtained from a hydroxyl group-containing (meth)acrylamide as an approach to solving the above problem (see Patent Literature 6).

However, the properties of the polymer are still to be improved for the polymer to be used as an antifouling film or an antifogging film.

Further, the present inventors have proposed another approach to solving the above problem wherein a monolayer film has specific anionic hydrophilic groups present in a high concentration on the surface (see Patent Literature 7).

However, the properties of the film are still to be improved for the film to be used as an antifouling film or an antifogging film.

CITATION LIST

Patent Literature

Patent Literature 1: JP-A-2002-521140
Patent Literature 2: JP-A-H11-115305
Patent Literature 3: JP-A-H08-325524
Patent Literature 4: JP-B-S53-010636
Patent Literature 5: JP-A-2001-98007
Patent Literature 6: WO 2004/058900
Patent Literature 7: WO 2007/064003

Non Patent Literature

Non Patent Literature 1: TREND, annual research report by TOAGOSEI CO., LTD., 1999, February issue, pp. 39-44
Non Patent Literature 2: Koubunshi (Polymers), 44(5), p. 307
Non Patent Literature 3: Mirai Zairyou (Future materials), 2(1), pp. 36-41
Non Patent Literature 4: Journal of Colloid and Interface Science, Vol. 110(2), 468-476 (1986)

SUMMARY OF INVENTION

Technical Problem

It is an object of the present invention to provide monolayer films which not only have hydrophilicity and are excellent in such properties as antifogging properties, antifouling properties, antistatic properties and anti-condensation properties but also tend to exhibit excellent transparency even with a large film thickness and excellent scratch resistance, as well as stacks having the monolayer film.

Solution to Problem

The present inventors carried out extensive studies to achieve the above object. As a result, the present inventors have found that a monolayer film produced from a mixture which contains a monomer mixture including a specific monomer and a specific polyvalent monomer, and a specific solvent in a specific ratio not only exhibits hydrophilicity and is excellent in such properties as antifogging properties, antifouling properties, antistatic properties and anti-condensation properties but also tends to exhibit excellent transparency even with a large film thickness and excellent scratch resistance. The present invention has been completed based on the finding.

That is, a monolayer film according to the present invention is obtained by preparing a mixture including a monomer composition and a solvent, the monomer composition including a monomer (I) represented by General Formula (1) below and a polyvalent monomer (II) having two or more (meth)acryloyl groups and being free of sulfonic group, carboxyl group and phosphoric group in a monomer (I)/polyvalent monomer (II) molar ratio of 1/1000 to less than 1/30, the solvent including a compound with a solubility parameter a of not less than 9.3 (cal/cm$^3$);

applying the mixture onto a substrate and removing at least part of the solvent; and polymerizing the monomer composition including the monomer (I) and the monomer (II);

the monolayer film having at least one anionic hydrophilic group selected from a sulfonic group, a carboxyl group and a phosphoric group, the anion concentration ratio (Sa/Da) of the anion concentration (Sa) at the outer surface to the anion concentration (Da) at the middle point between the inner surface in contact with the substrate and the outer surface being not less than 1.1;

$$[X]_s[M1]_l[M2]_m \quad (1)$$

(in Formula (1), s indicates 1 or 2; l and m indicate integers satisfying s=l+m/2; M1 is at least one monovalent cation selected from hydrogen ion, ammonium ions and alkali metal ions; M2 is at least one divalent cation selected from alkaline earth metal ions; and X is at least one monovalent anion selected from groups represented by General Formulae (1-1) to (1-4) below:

[Chem. 1]

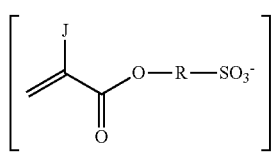

(1-1)

[Chem. 2]

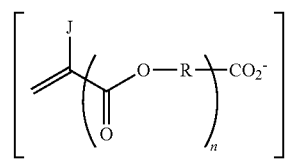

(1-2)

[Chem. 3]

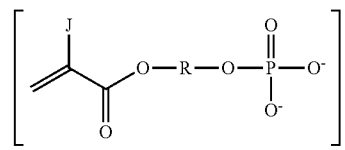

(1-3)

[Chem. 4]

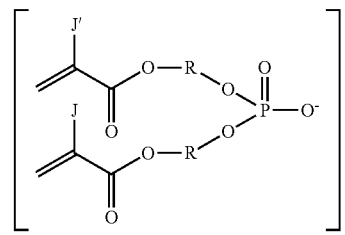

(1-4)

(in Formulae (1-1) to (1-4), J and J' are each independently H or CH$_3$; n indicates 0 or 1; and Rs are each independently an aliphatic hydrocarbon group of 1 to 600 carbon atoms optionally substituted at a carbon atom with at least one group selected from aromatic groups, aliphatic cyclic groups, ether groups and ester groups)).

The monomer (I) is preferably at least one monomer selected from compounds represented by General Formula (1-1-1) and General Formula (1-1-2) below:

[Chem. 5]

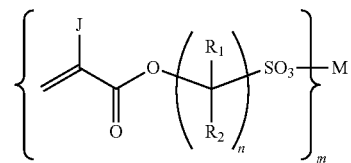

(1-1-1)

[Chem. 6]

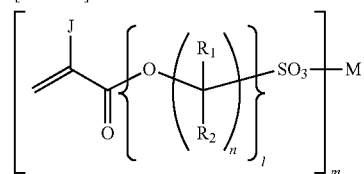

(1-1-2)

(in Formulae (1-1-1) and (1-1-2), J is H or CH$_3$; R$_1$ and R$_2$ are each independently H, CH$_3$ or C$_2$H$_5$; n indicates an integer of 1 to 20; l indicates an integer of 2 to 10; M is at least one monovalent cation selected from hydrogen ion, ammonium ions and alkali metal ions, or is at least one divalent cation selected from alkaline earth metal ions; and m is 1 when M is a monovalent cation, and m is 2 when M is a divalent cation).

The polyvalent monomer (II) is preferably at least one monomer selected from compounds represented by General Formula (2-1) and General Formula (2-2) below:

[Chem. 7]

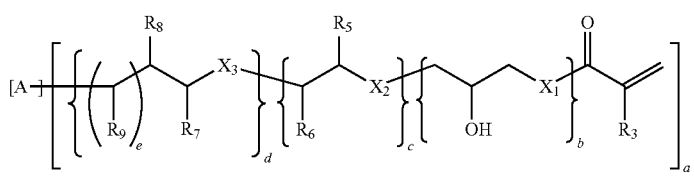

(2-1)

[Chem. 8]

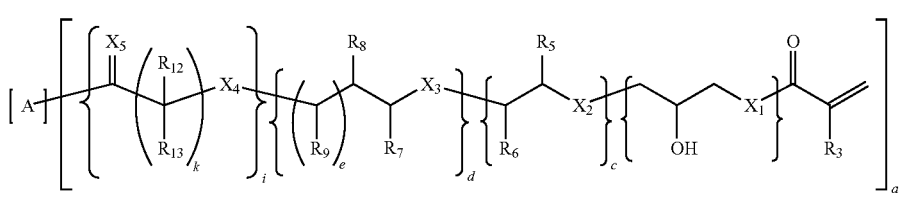

(2-2)

(in Formulae (2-1) and (2-2), $R_3$ and $R_5$ to $R_9$ are each independently H or $CH_3$; $R_{12}$ and $R_{13}$ are each independently H or $CH_3$;

$X_1$, $X_2$, $X_3$, $X_4$ and $X_5$ are each independently O or S;

the letter a indicates an integer of 2 to 30; b indicates an integer of 0 to 2; c indicates an integer of 0 to 30; d indicates an integer of 0 to 20; e indicates an integer of 0 to 2; i indicates an integer of 1 to 20; k indicates an integer of 1 to 10; and the letter A indicates an atom or group selected from:

[Chem. 9]

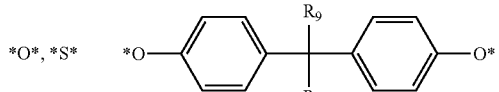

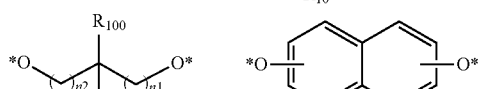

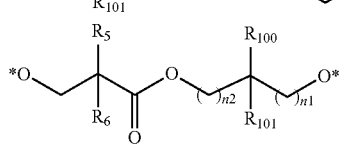

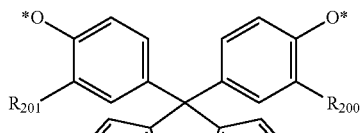

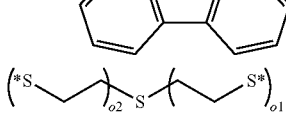

-continued

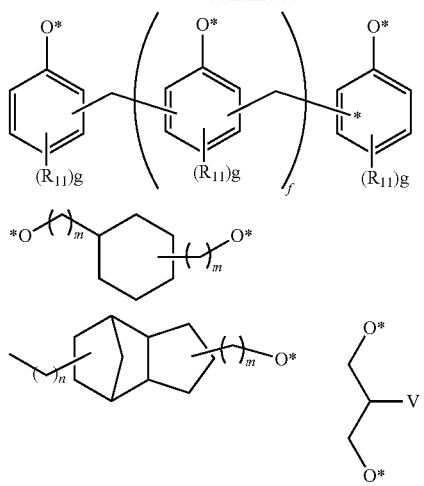

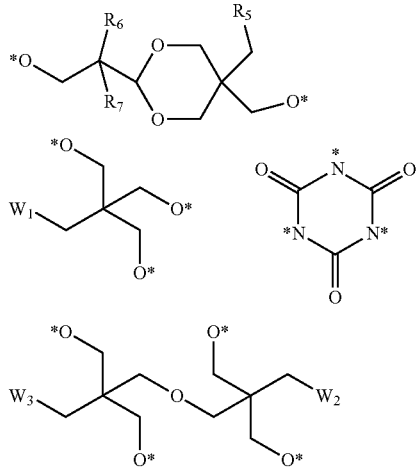

-continued
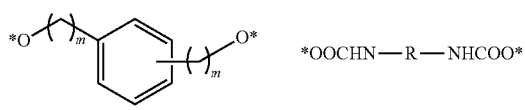 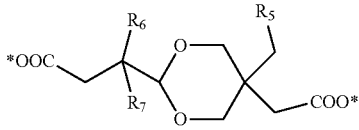
or from:
[Chem. 10]
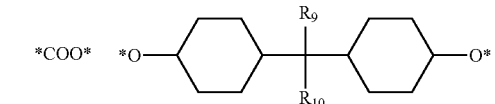
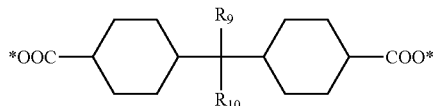
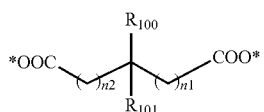
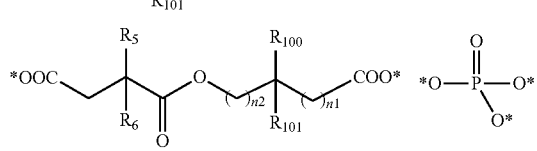
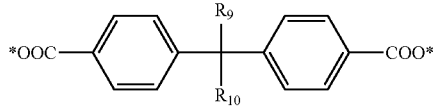
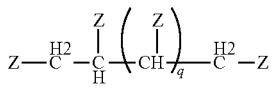
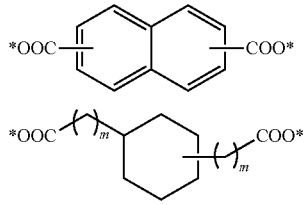
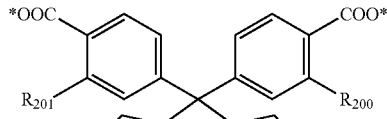
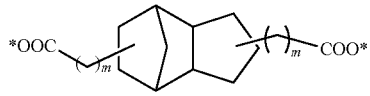
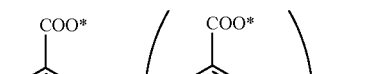
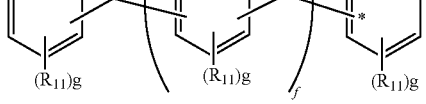
-continued
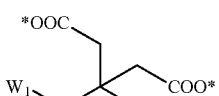
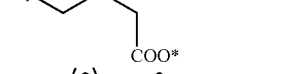
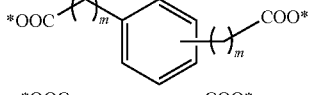
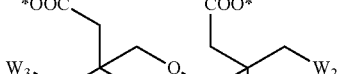
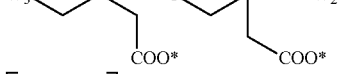
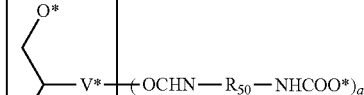
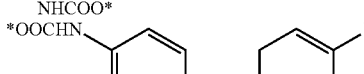
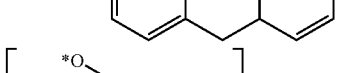
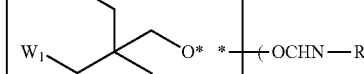
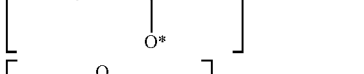
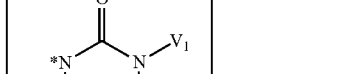
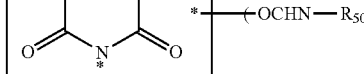
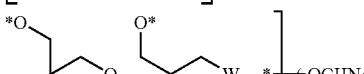
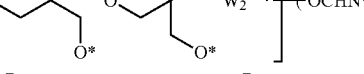
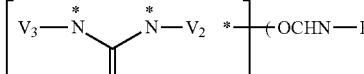
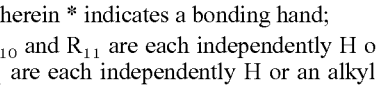
wherein * indicates a bonding hand;
$R_{10}$ and $R_{11}$ are each independently H or $CH_3$; $R_{100}$ and $R_{101}$ are each independently H or an alkyl group of 1 to 6 carbon atoms; $R_{200}$ and $R_{201}$ are each independently H, $CH_3$ or a phenyl group; R is hexamethylene, isophorone (1-methylene-3-ethylene-3-methyl-5,5-dimethyl-cyclohexane), norbornanedimethylene, dicyclohexylenemethane, cyclohexanedimethylene or xylylene; $R_{50}$ is hexamethylene, isophorone (1-methylene-3-ethylene-3-methyl-5,5-dimethyl-cyclohexane), norbornanedimethylene, dicyclohexylenemethane, cyclohexanedimethylene, toluylene, diphenylmethane or xylylene; V is OH or an oxygen atom having a bonding hand (*); W1 to W3 are each independently H, $CH_3$, OH or an oxygen atom having a bonding hand (*); Z is OH, an oxygen atom having a bonding hand (*), COOH or a carboxyl group having a bonding hand (*) (COO); V1 to V3 are each independently H or a bonding hand (*);

n1 and n2 each independently indicate an integer of 0 to 8; o1 and o2 each independently indicate an integer of 1 to 3; f indicates an integer of 1 to 20; g indicates an integer of 0 to 3; m indicates 0 or 1; q indicates an integer of 1 to 7; a1 indicates an integer of 2 to 3; a2 indicates an integer of 3 to 4; a3 indicates an integer of 4 to 6; a4 indicates an integer of 2 to 3; and a5 indicates an integer of 2 to 4).

The polyvalent monomer (II) is preferably at least one monomer selected from compounds represented by General Formulae (3) to (8) and (10) to (33) below:

[Chem. 11]

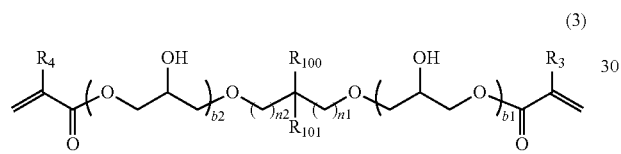

(3)

[Chem. 12]

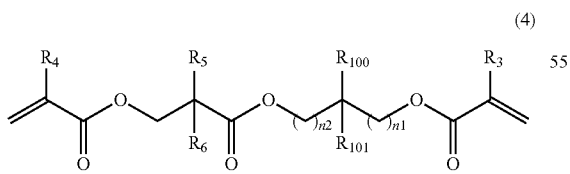

(4)

(in Formula (3), $R_3$ and $R_4$ are each independently H or $CH_3$; $R_{100}$ and $R_{101}$ are each independently H or an alkyl group of 1 to 6 carbon atoms; b1 and b2 each independently indicate an integer of 0 to 2; and n1 and n2 each independently indicate an integer of 0 to 8)

(in Formula (4), $R_3$ to $R_6$ are each independently H or $CH_3$; $R_{100}$ and $R_{101}$ are each independently H or an alkyl group of 1 to 6 carbon atoms; and n1 and n2 each independently indicate an integer of 0 to 8)

[Chem. 13]

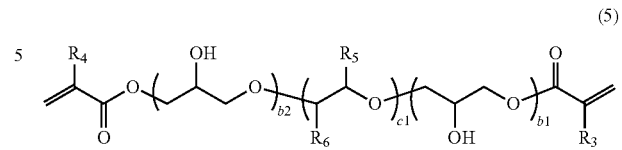

(5)

(in Formula (5), $R_3$ to $R_6$ are each independently H or $CH_3$; b1 and b2 each independently indicate an integer of 0 to 2; and c1 indicates an integer of 2 to 30)

[Chem. 14]

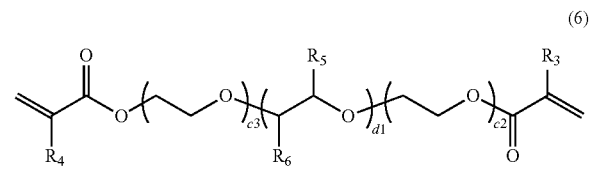

(6)

(in Formula (6), $R_3$ to $R_6$ are each independently H or $CH_3$; c2 and c3 each independently indicate an integer of 1 to 5; and d1 indicates an integer of 2 to 20)

[Chem. 15]

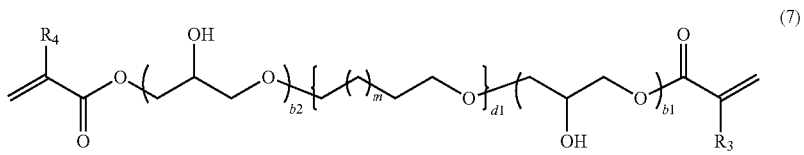

(7)

(in Formula (7), $R_3$ and $R_4$ are each independently H or $CH_3$; b1 and b2 each independently indicate an integer of 0 to 2; d1 indicates an integer of 2 to 20; and m indicates 0 or 1)

[Chem. 16]

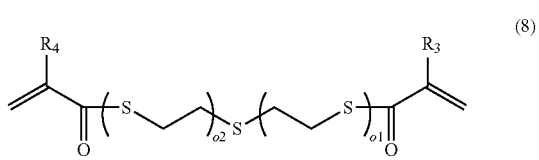

(8)

(in Formula (8), $R_3$ and $R_4$ are each independently H or $CH_3$; and o1 and o2 each independently indicate an integer of 1 to 3)

[Chem. 17]

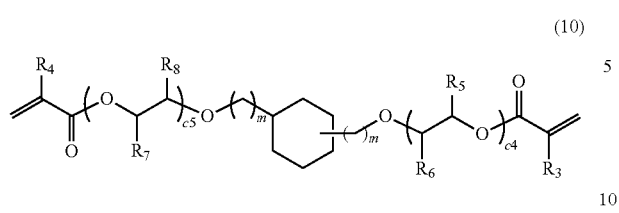
(10)

(in Formula (10), $R_3$ to $R_8$ are each independently H or $CH_3$; c4 and c5 each independently indicate an integer of 0 to 5; and m indicates 0 or 1)

[Chem. 18]

(11)

(in Formula (11), $R_3$ and $R_4$ are each independently H or $CH_3$; and m indicates 0 or 1)

[Chem. 19]

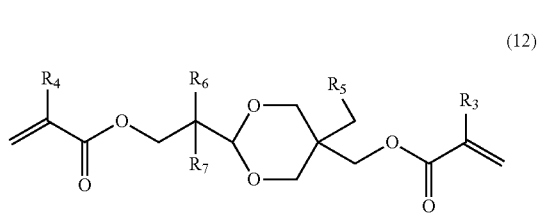
(12)

(in Formula (12), $R_3$ to $R_7$ are each independently H or $CH_3$)

[Chem. 20]

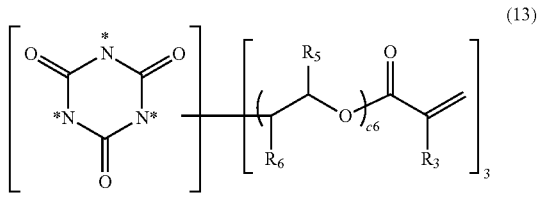
(13)

(in Formula (13), * represents a bonding hand; R3, R5 and R6 are each independently H or $CH_3$; and c6 indicates an integer of 0 to 3)

[Chem. 21]

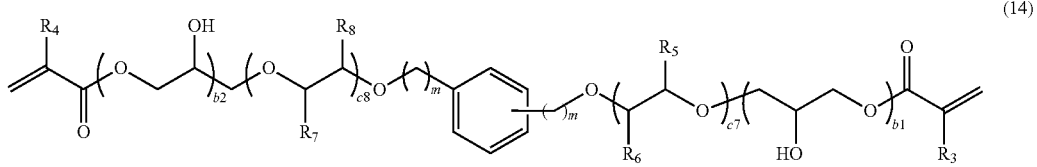
(14)

(in Formula (14), $R_3$ to $R_8$ are each independently H or $CH_3$; b1 and b2 each independently indicate an integer of 0 to 2; c7 and c8 each independently indicate an integer of 0 to 5; and m indicates 0 or 1)

[Chem. 22]

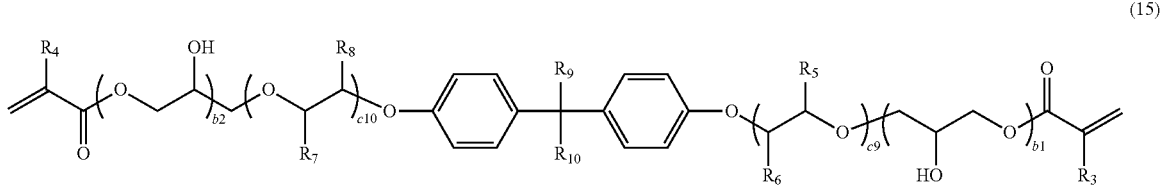
(15)

(in Formula (15), $R_3$ to $R_{10}$ are each independently H or $CH_3$; b1 and b2 each independently indicate an integer of 0 to 2; and c9 and c10 each independently indicate an integer of 0 to 30)

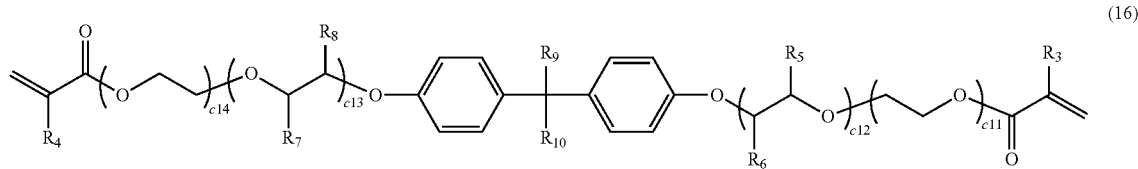

(16)

(in Formula (16), $R_3$ to $R_{10}$ are each independently H or $CH_3$; c11 to c14 indicate integers of 1 or above and satisfy c11+c12+c13+c14=4 to 30)

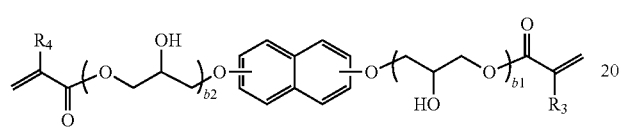

(17)

(in Formula (17), $R_3$ and $R_4$ are each independently H or $CH_3$; and b1 and b2 each independently indicate an integer of 0 to 2)

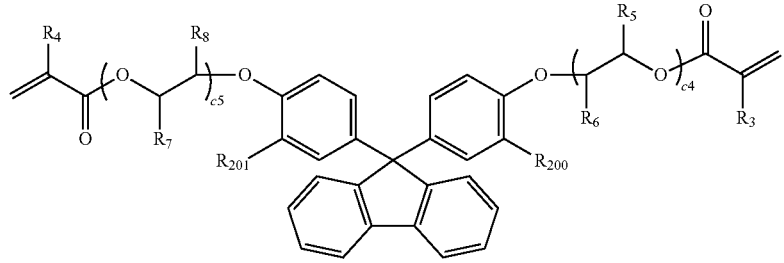

(18)

(in Formula (18), $R_3$ to $R_8$ are each independently H or $CH_3$; $R_{200}$ and $R_{201}$ are each independently H, $CH_3$ or a phenyl group; and c4 and c5 each independently indicate an integer of 0 to 5)

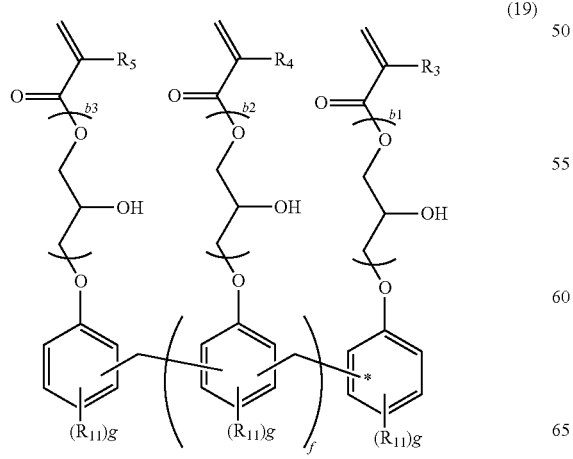

(19)

(in Formula (19), $R_3$ to $R_5$ and $R_{11}$ are each independently H or $CH_3$; b1 to b3 each independently indicate an integer of 0 to 2; and f indicates an integer of 1 to 20)

[Chem. 27]

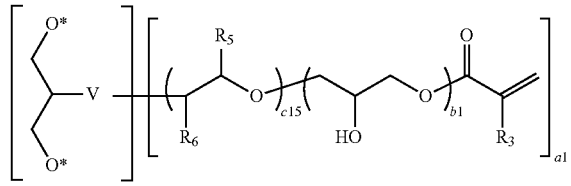

(20)

[Chem. 29]

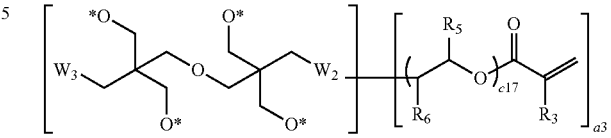

(22)

(in Formula (22), * represents a bonding hand; W2 and W3 are each independently H, $CH_3$, OH or an oxygen atom having a bonding hand (*); $R_3$, $R_5$ and $R_6$ are each independently H or $CH_3$; a3 indicates an integer of 4 to 6; and c17 indicates an integer of 0 to 3)

[Chem. 30]

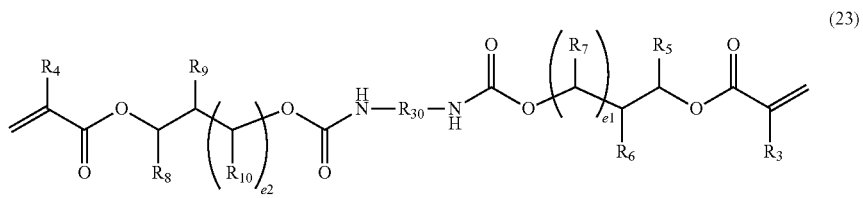

(23)

(in Formula (20), * represents a bonding hand; V is OH or an oxygen atom having a bonding hand (*); $R_3$, $R_5$ and $R_6$ are each independently H or $CH_3$; a1 indicates 2 or 3; b1 indicates an integer of 0 to 2; and c15 indicates an integer of 0 to 20)

(in Formula (23), $R_{30}$ is hexamethylene, isophorone (1-methylene-3-ethylene-3-methyl-5,5-dimethyl-cyclohexane), norbornanedimethylene, dicyclohexylenemethane, cyclohexanedimethylene or xylylene; $R_3$ to $R_{10}$ are each independently H or $CH_3$; and e1 and e2 each independently indicate an integer of 0 to 2)

[Chem. 28]

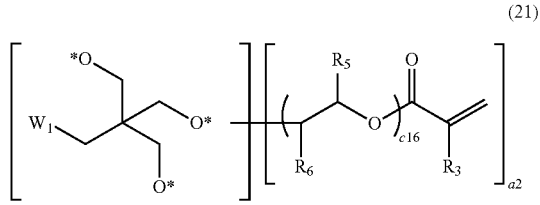

(21)

[Chem. 31]

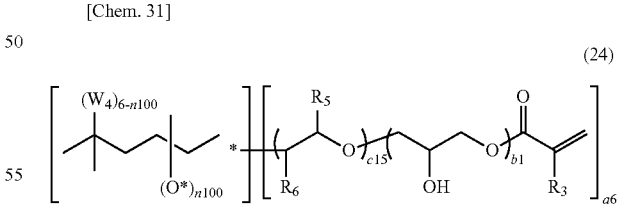

(24)

(in Formula (21), * represents a bonding hand; W1 is H, $CH_3$, OH or an oxygen atom having a bonding hand (*); $R_3$, $R_5$ and $R_6$ are each independently H or $CH_3$; a2 indicates 3 or 4; and c16 indicates an integer of 0 to 20)

(in Formula (24), $R_3$, $R_5$ and $R_6$ are each independently H or $CH_3$; b1 indicates an integer of 0 to 2; c15 indicates an integer of 0 to 20; and n100 indicates an integer of 1 to 6)

[Chem. 32]

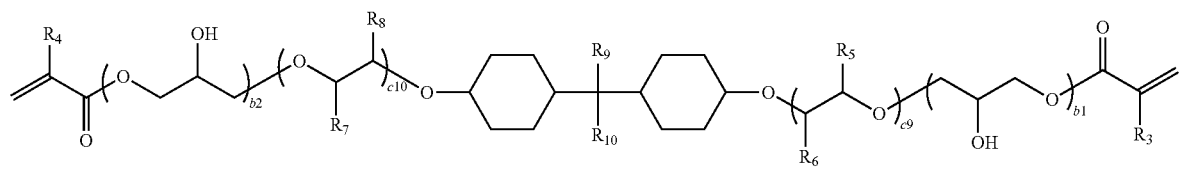
(25)

(in Formula (25), $R_3$ to $R_{10}$ are each independently H or $CH_3$; b1 and b2 each independently indicate an integer of 0 to 2; and c9 and c10 each independently indicate an integer of 0 to 5)

[Chem. 33]

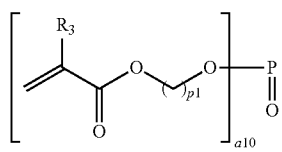
(26)

(in Formula (26), $R_3$ is H or $CH_3$; p1 indicates an integer of 1 to 6; and a10 indicates 3)

[Chem. 34]

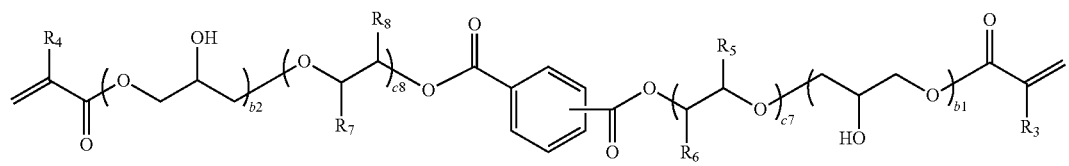
(27)

(in Formula (27), $R_3$ to $R_8$ are each independently H or $CH_3$; b1 and b2 each independently indicate an integer of 0 to 2; and c7 and c8 each independently indicate an integer of 0 to 5)

[Chem. 35]

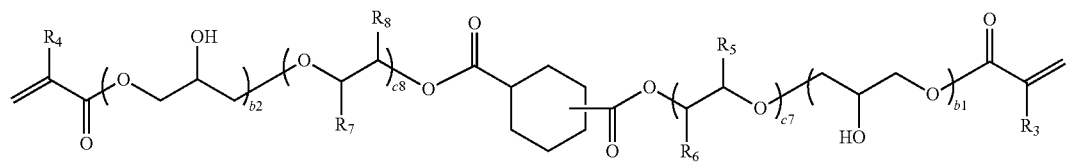
(28)

(in Formula (28), $R_3$ to $R_8$ are each independently H or $CH_3$; b1 and b2 each independently indicate an integer of 0 to 2; and c7 and c8 each independently indicate an integer of 0 to 5)

[Chem. 36]

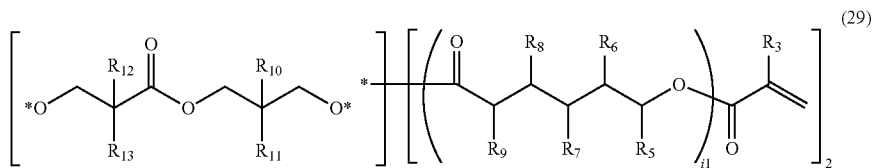

(in Formula (29), $R_3$ and $R_5$ to $R_{13}$ are each independently H or $CH_3$; and i1 indicates an integer of 0 to 5)

[Chem. 37]

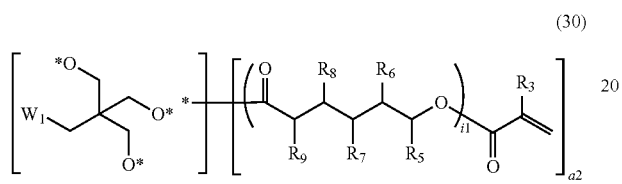

(in Formula (30), $R_3$ and $R_5$ to $R_9$ are each independently H or $CH_3$; W1 is H, $CH_3$, OH or an oxygen atom having a bonding hand (*); a2 indicates 3 or 4; and i1 indicates an integer of 0 to 5)

[Chem. 38]

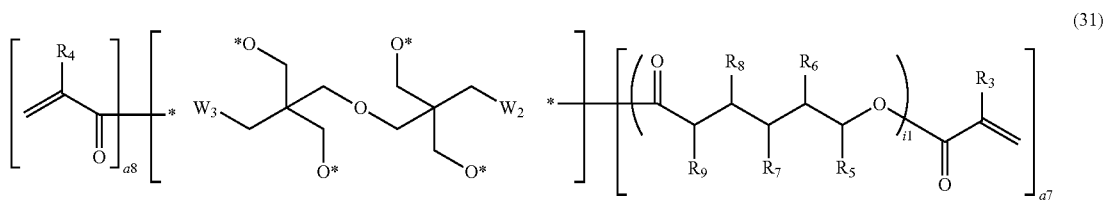

(in Formula (31), $R_3$ to $R_9$ are each independently H or $CH_3$; W2 and W3 are each independently H, $CH_3$, OH or an oxygen atom having a bonding hand (*); a7 indicates an integer of 1 to 6; a8 indicates an integer of 0 to 5; and a7+a8=2 to 6)

[Chem. 39]

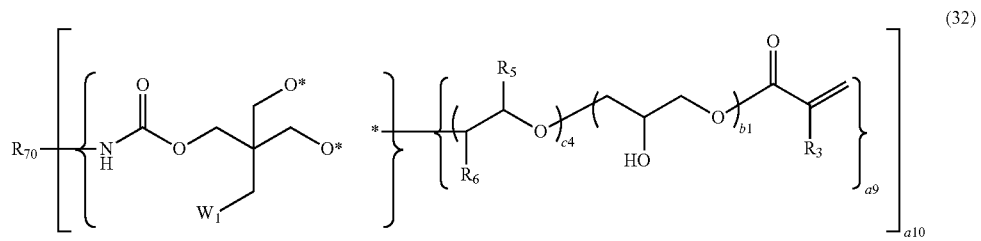

(in Formula (32), $R_{70}$ is toluylene, diphenylmethane, hexamethylene, isophorone (1-methylene-3-ethylene-3-methyl-5,5-dimethyl-cyclohexane), norbornanedimethylene, dicyclohexylenemethane, cyclohexanedimethylene, N, N',N''-tris (hexamethylene)-isocyanurate, N,N,N'-tris(hexamethylene)-urea, N,N,N',N'-tetrakis(hexamethylene)-urea or xylylene; $R_3$, $R_5$ and $R_6$ are each independently H or $CH_3$; W1 is H, $CH_3$, OH or an oxygen atom having a bonding hand (*); a9 indicates an integer of 1 to 4; a10 indicates an integer of 2 to 4; b1 indicates an integer of 0 to 2; and c4 indicates an integer of 0 to 5)

[Chem. 40]

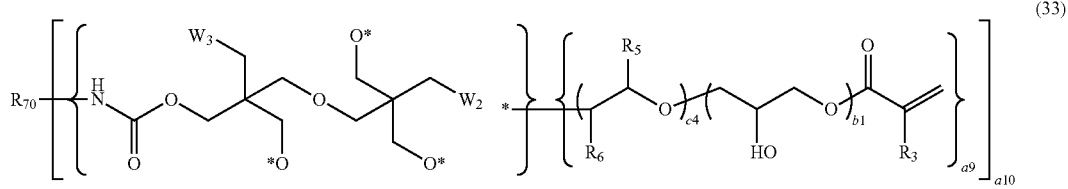

(in Formula (33), $R_{70}$ is toluylene, diphenylmethane, hexamethylene, isophorone (1-methylene-3-ethylene-3-methyl-5,5-dimethyl-cyclohexane), norbornanedimethylene, dicyclohexylenemethane, cyclohexanedimethylene, N,N',N''-tris (hexamethylene)-isocyanurate, N,N,N'-tris(hexamethylene)-urea, N,N,N',N'-tetrakis(hexamethylene)-urea or xylylene; $R_3$, $R_5$ and $R_6$ are each independently H or $CH_3$; W2 and W3 is H, $CH_3$, OH or an oxygen atom having a bonding hand (*); a9 indicates an integer of 1 to 4; a10 indicates an integer of 2 to 4; b1 indicates an integer of 0 to 2; and c4 indicates an integer of 0 to 5).

The water contact angle of the monolayer film is preferably not more than 30°.

The film thickness of the monolayer film is usually in the range of 0.5 to 100 μm.

The monolayer film may be used as a material such as an antifogging material, an antifouling material or an antistatic material.

A stack according to the present invention is characterized in that the aforementioned monolayer film is disposed on at least one surface of a substrate.

The stack may be such that the monolayer film is disposed on one surface of the substrate and a pressure-sensitive adhesive layer is disposed on the surface of the substrate on which the monolayer film is not disposed. A peel layer may be further disposed on the surface of the pressure-sensitive adhesive layer.

In the stack, a peelable cover layer may be disposed on the surface of the monolayer film.

A method for producing stacks according to the present invention includes a step of preparing a mixture including a monomer composition and a solvent, the monomer composition including a monomer (I) represented by General Formula (1) below and a polyvalent monomer (II) having two or more (meth)acryloyl groups and being free of sulfonic group, carboxyl group and phosphoric group in a monomer (I)/polyvalent monomer (II) molar ratio of 1/1000 to less than 1/30, the solvent including a compound with a solubility parameter a of not less than 9.3 $(cal/cm^3)$;

a step of applying the mixture onto at least one surface of a substrate;

a step of removing at least part of the solvent from the mixture applied; and a step of polymerizing the monomer (I) and the monomer (II) present in the mixture resulting from the above steps;

the method thus producing a stack having a monolayer film on at least one surface of the substrate, the monolayer film having at least one anionic hydrophilic group selected from a sulfonic group, a carboxyl group and a phosphoric group, the anion concentration ratio (Sa/Da) of the anion concentration (Sa) at the outer surface of the monolayer film to the anion concentration (Da) at the middle point between the inner surface in contact with the substrate and the outer surface being not less than 1.1;

$$[X]_s[M1]_l[M2]_m \qquad (1)$$

(in Formula (1), s indicates 1 or 2; l and m indicate integers satisfying s=l+m/2;

M1 is at least one monovalent cation selected from hydrogen ion, ammonium ions and alkali metal ions; M2 is at least one divalent cation selected from alkaline earth metal ions; and X is at least one monovalent anion selected from groups represented by General Formulae (1-1) to (1-4) below:

[Chem. 41]

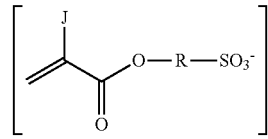

(1-1)

[Chem. 42]

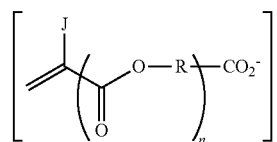

(1-2)

[Chem. 43]

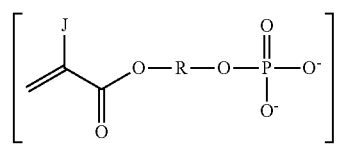

(1-3)

[Chem. 44]

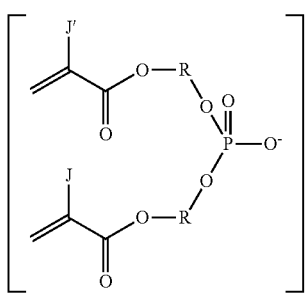
(1-4)

(in Formulae (1-1) to (1-4), J and J' are each independently H or $CH_3$; n indicates 0 or 1; and Rs are each independently an aliphatic hydrocarbon group of 1 to 600 carbon atoms optionally substituted at a carbon atom with at least one group selected from aromatic groups, aliphatic cyclic groups, ether groups and ester groups)).

Advantageously, the above stack production method can produce a stack which has a monolayer film exhibiting a water contact angle of not more than 30°.

Advantageous Effects of Invention

The monolayer films of the invention and the stacks having the monolayer film not only have hydrophilicity and are excellent in such properties as antifogging properties, antifouling properties, antistatic properties and anti-condensation properties but also tend to exhibit excellent transparency even when the monolayer film has a large film thickness, and further tend to exhibit excellent scratch resistance.

BRIEF DESCRIPTION OF DRAWING

FIG. 1 is a schematic view illustrating a method of preparing specimens for the measurement of anion concentration ratio.

DESCRIPTION OF EMBODIMENTS

A monolayer film according to the present invention is obtained by polymerizing a specific monomer composition.

The monomer composition includes a monomer (I) represented by General Formula (1) below.

$[X]_s[M1]_l[M2]_m$     (1)

In Formula (1), s indicates 1 or 2; and l and m indicate integers satisfying s=l+m/2.

M1 is at least one monovalent cation selected from hydrogen ion, ammonium ions and alkali metal ions.

As used in the invention, the term ammonium ion refers to a cation formed by the bonding of hydrogen ion to ammonia, a primary amine, a secondary amine or a tertiary amine. From the viewpoint of hydrophilicity, preferred ammonium ions are cations formed by the bonding of hydrogen ion to ammonia and amines having a small number of carbon atom(s). Ammonium ion formed by the bonding of hydrogen ion to ammonia, and methylammonium are more preferable.

Examples of the alkali metals include lithium, sodium, potassium and rubidium.

Of the cations represented by M1, alkali metal ions are preferable, and sodium ion, potassium ion and rubidium ion are more preferable.

M2 is at least one divalent cation selected from alkaline earth metal ions.

X is at least one monovalent anion selected from groups represented by General Formulae (1-1) to (1-4) below:

[Chem. 45]

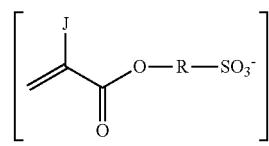
(1-1)

[Chem. 46]

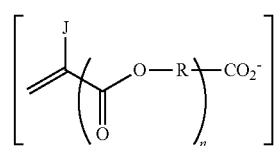
(1-2)

[Chem. 47]

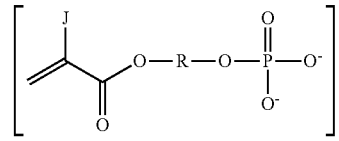
(1-3)

[Chem. 48]

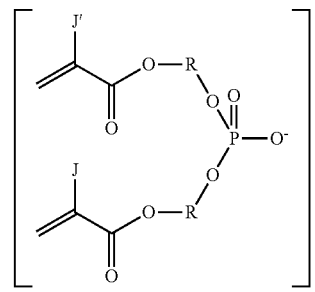
(1-4)

In General Formulae (1-1) to (1-4), J and J' are each independently H or $CH_3$; and n indicates 0 or 1.

Rs are each independently an aliphatic hydrocarbon group of 1 to 600 carbon atoms optionally substituted at a carbon atom with at least one group selected from aromatic groups, aliphatic cyclic groups, ether groups and ester groups. Preferably, Rs are aliphatic hydrocarbon groups of 2 to 100 carbon atoms optionally substituted at a carbon atom with at least one group selected from aromatic groups, aliphatic cyclic groups, ether groups and ester groups, and are more preferably aliphatic hydrocarbon groups of 2 to 20 carbon atoms optionally substituted at a carbon atom with at least one group selected from aromatic groups, aliphatic cyclic groups, ether groups and ester groups.

Of the monomers (I), those monomers in which m=0 are preferable.

The formula weight of the anion X is usually 50 to 18,000, preferably 100 to 1,000, and more preferably 170 to 500.

Of the monomers (I), those monomers represented by General Formula (1-1-1) and General Formula (1-1-2) below are preferable.

[Chem. 49]

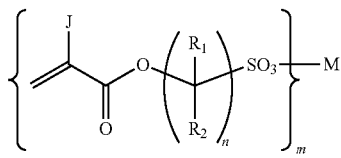
(1-1-1)

[Chem. 50]

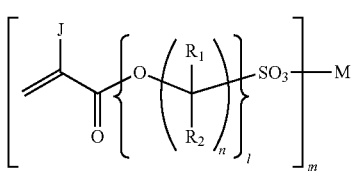
(1-1-2)

In Formulae (1-1-1) and (1-1-2), J is H or $CH_3$.

$R_1$ and $R_2$ are each independently H, $CH_3$ or $C_2H_5$. $R_1$ and $R_2$ are preferably H because of easy synthesis.

The letter n indicates an integer of 1 to 20 and, because of easy synthesis, is preferably an integer of 2 to 10, and more preferably an integer of 2 to 4.

The letter l indicates an integer of 2 to 10, preferably an integer of 2 to 6, and more preferably an integer of 2 to 4.

M is at least one monovalent cation selected from hydrogen ion, ammonium ions and alkali metal ions, or is at least one divalent cation selected from alkaline earth metal ions.

The letter m is 1 when M is a monovalent cation, and m is 2 when M is a divalent cation.

The ammonium ions are cations formed by the bonding of hydrogen ion to ammonia, primary amines, secondary amines or tertiary amines. From the viewpoint of hydrophilicity, preferred ammonium ions are cations formed by the bonding of hydrogen ion to ammonia and amines having a small number of carbon atom(s). Ammonium ion formed by the bonding of hydrogen ion to ammonia, and methylammonium are more preferable.

Examples of the alkali metals include lithium, sodium, potassium and rubidium. Examples of the alkaline earth metals include beryllium, magnesium, calcium and strontium.

Of the cations represented by M, monovalent cations are preferable, alkali metal ions are more preferable, and sodium ion, potassium ion and rubidium ion are even more preferable.

Of the monomers represented by Formulae (1-1-1) and (1-1-2), 2-sulfonylethyl-(meth)acrylate, 3-sulfonylpropyl-(meth)acrylate, and alkali metal salts of these compounds are preferable.

The molecular weight of the monomers (I) is usually 168 to 18,000, preferably 180 to 1,000, and more preferably 200 to 500.

The monomers (I) may be used singly, or two or more may be used as a mixture.

The monomer composition of the invention may contain the monomer (I) in such a configuration that at least part of the monomer (I) has been reacted and is in the form of an oligomer. As used herein, the term oligomer refers to a molecule which usually includes 2 to 20 repeating units derived from the monomer (I).

The monomer (I) may be produced by a known method or in accordance with a known method, for example, by any of the methods described in JP-B-S49-36214, JP-B-S51-9732, JP-A-S63284157 and U.S. Pat. No. 3,024,221.

For example, a monomer represented by Formula (1-1-1) may be produced by reacting (meth)acrylic acid with propane sultone in the presence of an alkali metal carbonate salt; and a monomer represented by Formula (1-1-2) may be produced by halogenating part of the hydroxyl groups of a polyol with a hydrogen halide, subsequently reacting the introduced halogen with an alkali metal sulfonate to synthesize a hydroxyl group-containing alkali metal sulfonate compound, and finally reacting the hydroxyl groups with a (meth)acryloyl halide or (meth)acrylic acid.

The monomer composition further includes a polyvalent monomer (II) having two or more (meth)acryloyl groups and being free of sulfonic group, carboxyl group and phosphoric group.

The forms of the (meth)acryloyl groups present in the polyvalent monomer (II) are not particularly limited. For example, the (meth)acryloyl groups may be present in the polyvalent monomer (II) in such forms as (meth)acryloyloxy groups, (meth)acryloylthio groups or (meth)acrylamide groups, and preferably in the forms of (meth)acryloyloxy groups or (meth)acryloylthio groups.

Examples of the polyvalent monomers (II) include compounds having one or more hydroxyl groups and two or more (meth)acryloyl groups, compounds having one or more ether bonds or thioether bonds and two or more (meth)acryloyl groups, compounds having one or more ester bonds and two or more (meth)acryloyl groups, compounds having one or more aliphatic cyclic structures or aromatic ring structures and two or more (meth)acryloyl groups, and compounds having one or more heterocyclic structures and two or more (meth)acryloyl groups.

Of the polyvalent monomers (II), those monomers represented by General Formulae (2-1) and (2-2) below are preferable.

[Chem. 51]

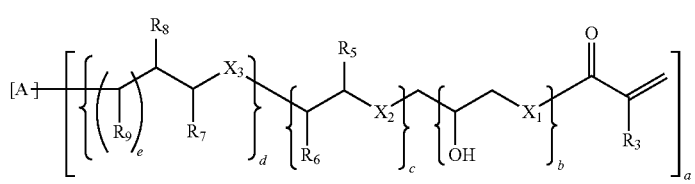
(2-1)

[Chem. 52]

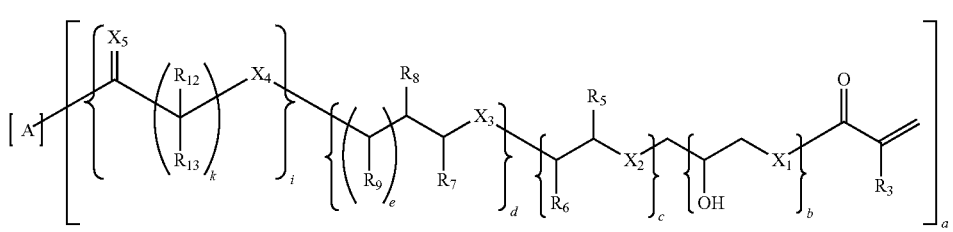

In Formulae (2-1) and (2-2), $R_3$ and $R_5$ to $R_9$ are each independently H or $CH_3$; $R_{12}$ and $R_{13}$ are each independently H or $CH_3$; $X_1$, $X_2$, $X_3$, $X_4$ and $X_5$ are each independently O or S; the letter a indicates an integer of 2 to 30; b indicates an integer of 0 to 2; c indicates an integer of 0 to 30; d indicates an integer of 0 to 20; e indicates an integer of 0 to 2; i indicates an integer of 1 to 20, preferably an integer of 1 to 10, more preferably 1 to 5, and still more preferably 1 to 3; and k indicates an integer of 1 to 10, more preferably an integer of 2 to 8, and still more preferably 2 to 6.

The letter A indicates an atom or group selected from:

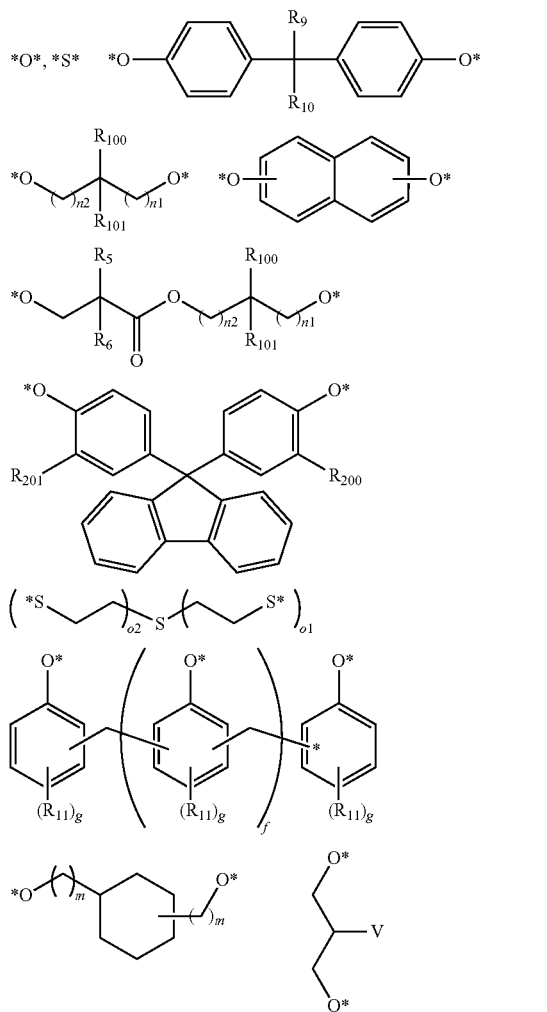

or from:

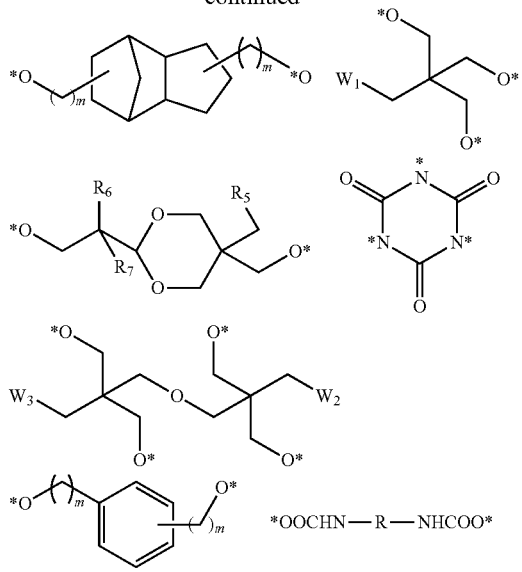

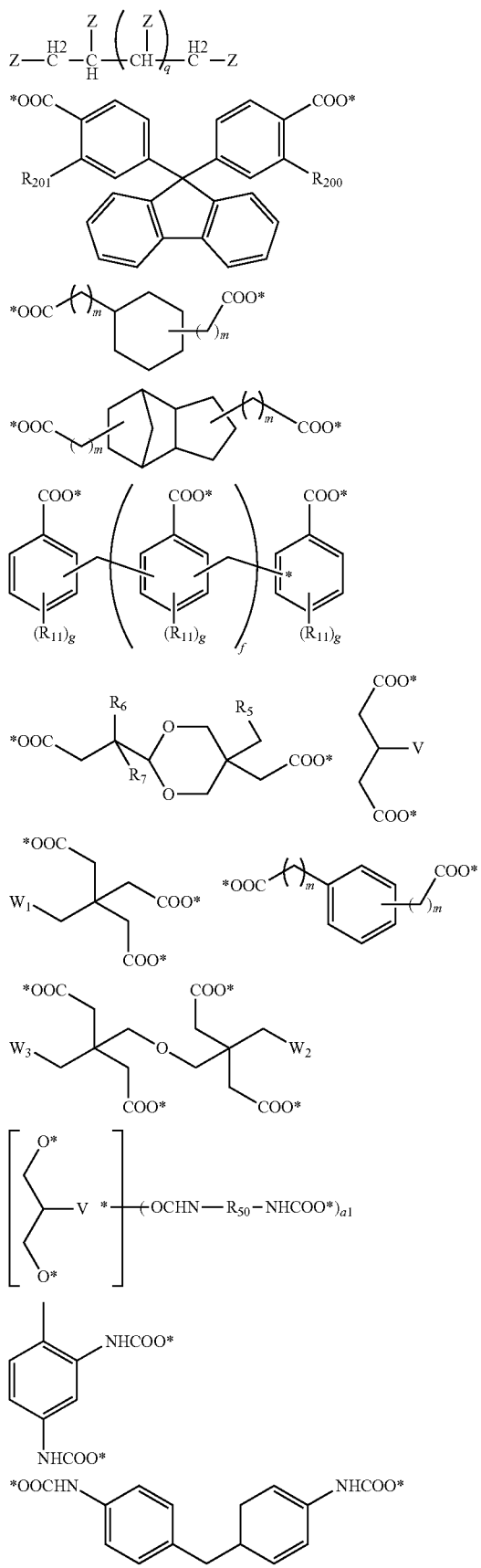

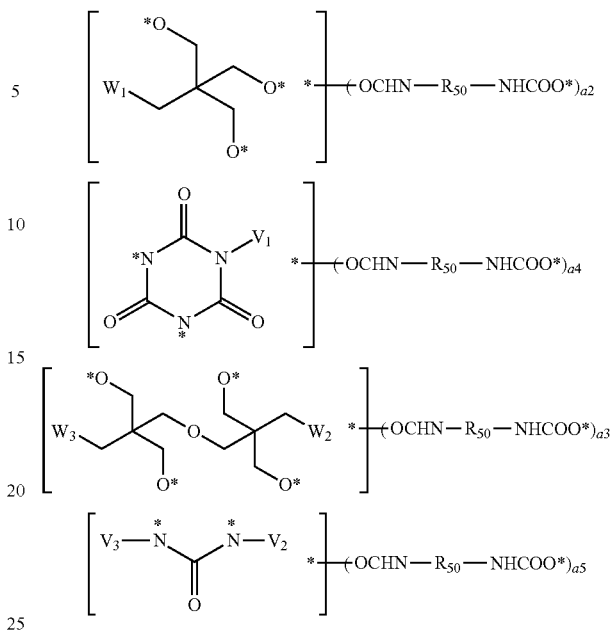

The letter A is an atom or group selected from above.

In the above formulae, * indicates a bonding hand.

$R_{10}$ and $R_{11}$ are each independently H or $CH_3$. $R_{100}$ and $R_{101}$ are each independently H or an alkyl group of 1 to 6 carbon atoms. $R_{200}$ and $R_{201}$ are each independently H, $CH_3$ or a phenyl and $R_{201}$ group. R is hexamethylene, isophorone (1-methylene-3-ethylene-3-methyl-5,5-dimethyl-cyclohexane), norbornanedimethylene, dicyclohexylenemethane, cyclohexanedimethylene or xylylene. $R_{50}$ is hexamethylene, isophorone (1-methylene-3-ethylene-3-methyl-5,5-dimethyl-cyclohexane), norbornanedimethylene, dicyclohexylenemethane, cyclohexanedimethylene, toluylene, diphenylmethane or xylylene.

V is OH or an oxygen atom having a bonding hand (*). W1 to W3 are each independently H, $CH_3$, OH or an oxygen atom having a bonding hand (*). Z is OH, an oxygen atom having a bonding hand (*), COOH or a carboxyl group having a bonding hand (*) (COO). V1 to V3 are each independently H or a bonding hand (*).

n1 and n2 each independently indicate an integer of 0 to 8; o1 and o2 each independently indicate an integer of 1 to 3; f indicates an integer of 1 to 20; g indicates an integer of 0 to 3; m indicates 0 or 1; q indicates an integer of 1 to 7, preferably an integer of 1 to 5, and more preferably an integer of 1 to 3; a1 indicates an integer of 2 to 3, and is preferably 3; a2 indicates an integer of 3 to 4, and is preferably 3; a3 indicates an integer of 4 to 6, and is preferably 5 or 6; a4 indicates an integer of 2 to 3, and is preferably 3; and a5 indicates an integer of 2 to 4, and is preferably 3 or 4.

The polyvalent monomers represented by General Formulae (2-1) and (2-2) may be produced by a known method or in accordance with a known method, or may be purchased in the market.

Of the polyvalent monomers represented by General Formula (2-1) and General Formula (2-2), those polyvalent monomers represented by General Formulae (3) to (8) and (10) to (33) below are preferable.

[Chem. 55]

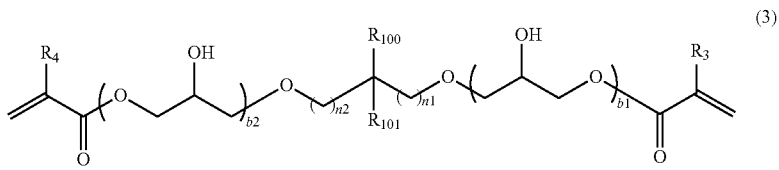
(3)

In Formula (3), $R_3$ and $R_4$ are each independently H or $CH_3$; $R_{100}$ and $R_{101}$ are each independently H or an alkyl group of 1 to 6 carbon atoms; b1 and b2 each independently indicate an integer of 0 to 2; and n1 and n2 each independently indicate an integer of 0 to 8.

[Chem. 56]

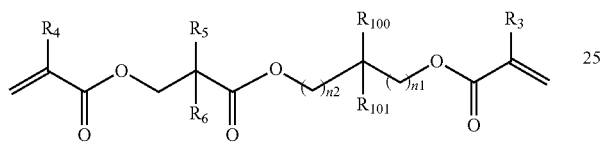
(4)

In Formula (4), $R_3$ to $R_6$ are each independently H or $CH_3$; $R_{100}$ and $R_{101}$ are each independently H or an alkyl group of 1 to 6 carbon atoms; and n1 and n2 each independently indicate an integer of 0 to 8.

[Chem. 57]

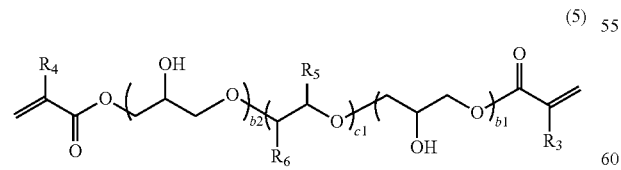
(5)

In Formula (5) $R_3$ to $R_6$ are each independently H or $CH_3$; b1 and b2 each independently indicate an integer of 0 to 2; and c1 indicates an integer of 2 to 30.

[Chem. 58]

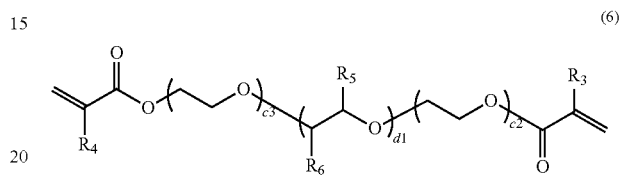
(6)

In Formula (6), $R_3$ to $R_6$ are each independently H or $CH_3$; c2 and c3 each independently indicate an integer of 1 to 5; and d1 indicates an integer of 2 to 20.

[Chem. 59]

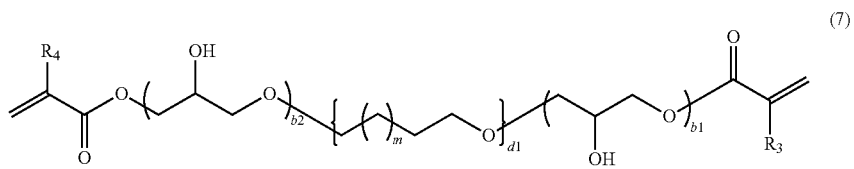
(7)

In Formula (7), $R_3$ and $R_4$ are each independently H or $CH_3$; b1 and b2 each independently indicate an integer of 0 to 2; d1 indicates an integer of 2 to 20; and m indicates 0 or 1.

[Chem. 60]

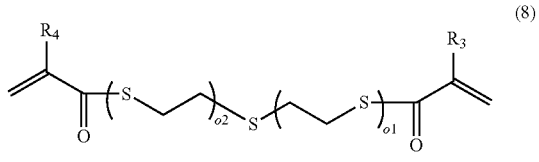
(8)

In Formula (8), $R_3$ and $R_4$ are each independently H or $CH_3$; and o1 and o2 each independently indicate an integer of 1 to 3.

[Chem. 61]

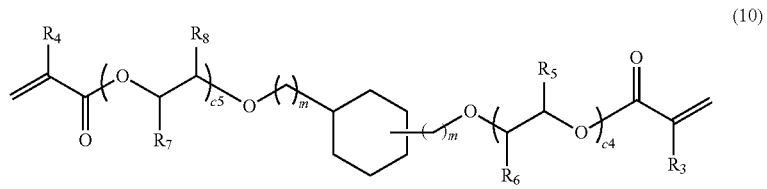

(10)

In Formula (10), $R_3$ to $R_8$ are each independently H or $CH_3$; c4 and c5 each independently indicate an integer of 0 to 5; and m indicates 0 or 1.

[Chem. 62]

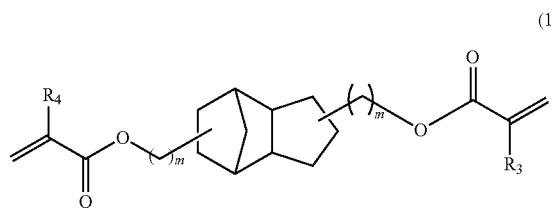

(11)

In Formula (11), $R_3$ and $R_4$ are each independently H or $CH_3$; and m indicates 0 or 1.

[Chem. 63]

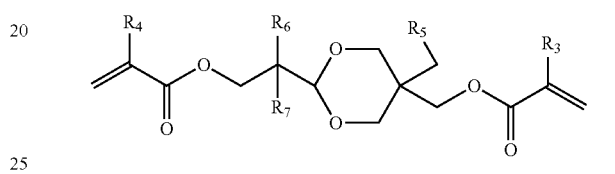

(12)

In Formula (12), $R_3$ to $R_7$ are each independently H or $CH_3$.

[Chem. 64]

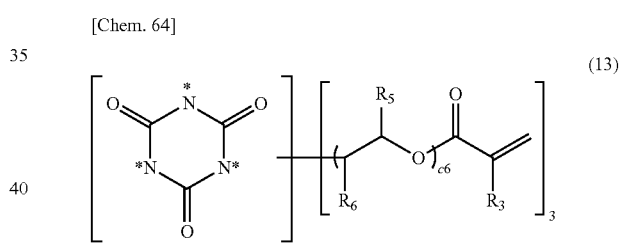

(13)

In Formula (13), * represents a bonding hand; R3, R5 and R6 are each independently H or $CH_3$; and c6 indicates an integer of 0 to 3.

[Chem. 65]

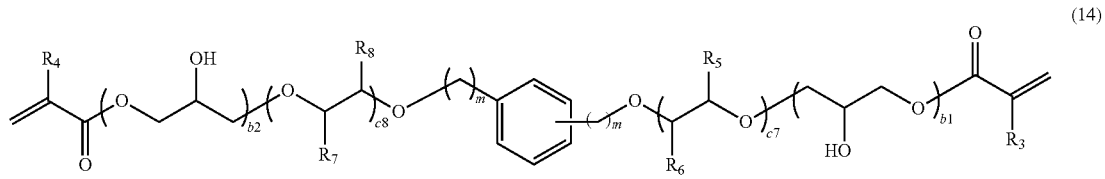

(14)

In Formula (14), $R_3$ to $R_8$ are each independently H or $CH_3$; b1 and b2 each independently indicate an integer of 0 to 2; c7 and c8 each independently indicate an integer of 0 to 5; and m indicates 0 or 1.

[Chem. 66]

(15)

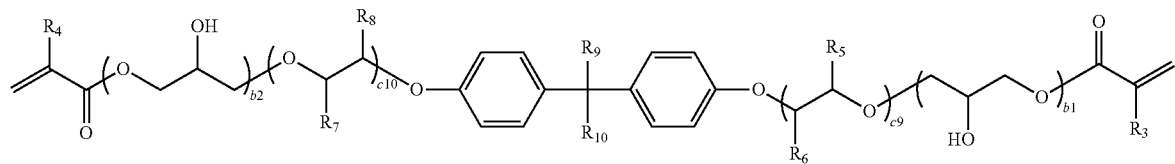

In Formula (15), $R_3$ to $R_{10}$ are each independently H or $CH_3$; b1 and b2 each independently indicate an integer of 0 to 2; and c9 and c10 each independently indicate an integer of 0 to 30.

[Chem. 67]

(16)

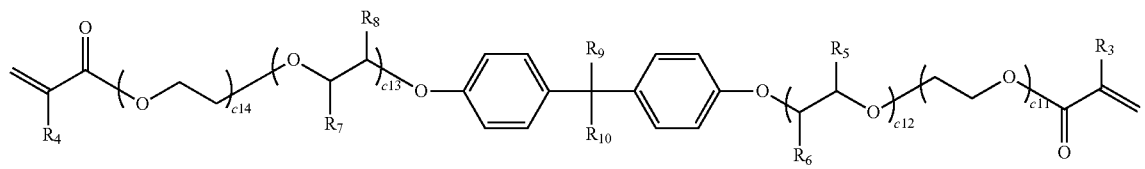

In Formula (16), $R_3$ to $R_{10}$ are each independently H or $CH_3$; c11 to c14 indicate integers of 1 or above and satisfy c11+c12+c13+c14=4 to 30.

[Chem. 68]

(17)

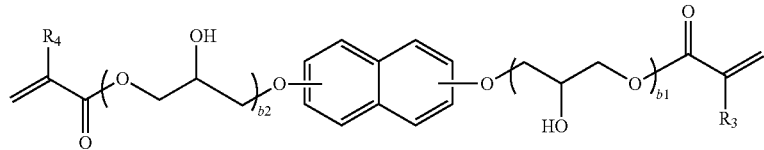

In Formula (17), $R_3$ and $R_4$ are each independently H or $CH_3$; and b1 and b2 each independently indicate an integer of 0 to 2.

[Chem. 69]

(18)

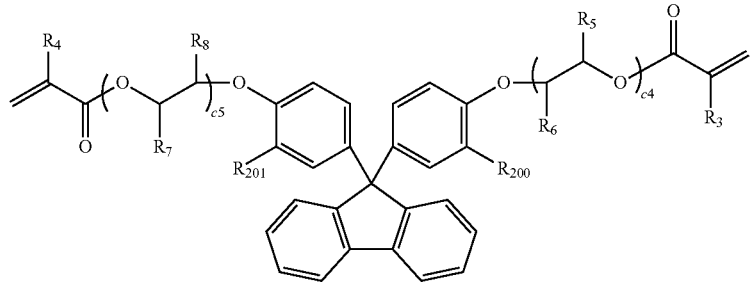

In Formula (18), $R_3$ to $R_8$ are each independently H or $CH_3$; $R_{200}$ and $R_{201}$ are each independently H, $CH_3$ or a phenyl group; and c4 and c5 each independently indicate an integer of 0 to 5.

[Chem. 70]

(19)

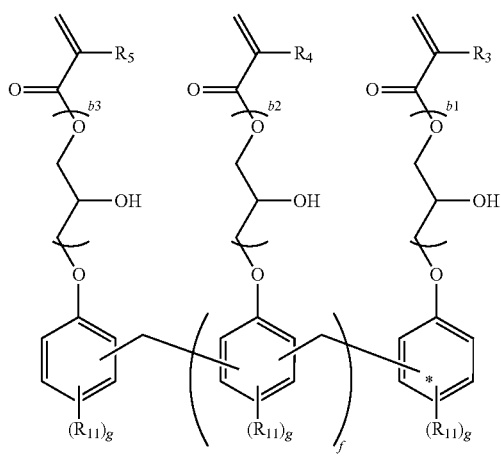

In Formula (19), $R_3$ to $R_5$ and $R_{11}$ are each independently H or $CH_3$; b1 to b3 each independently indicate an integer of 0 to 2; and f indicates an integer of 1 to 20.

[Chem. 71]

(20)

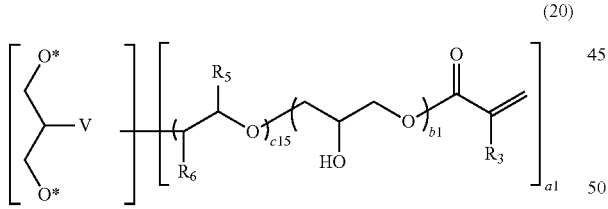

In Formula (20), * represents a bonding hand; V is OH or an oxygen atom having a bonding hand (*); $R_3$, $R_5$ and $R_6$ are each independently H or $CH_3$; a1 indicates 2 or 3; b1 indicates an integer of 0 to 2; and c15 indicates an integer of 0 to 20.

[Chem. 72]

(21)

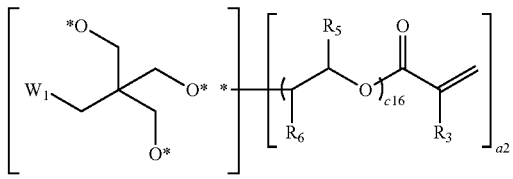

In Formula (21), * represents a bonding hand; W1 is H, $CH_3$, OH or an oxygen atom having a bonding hand (*); $R_3$, $R_5$ and $R_6$ are each independently H or $CH_3$; a2 indicates 3 or 4; and c16 indicates an integer of 0 to 20.

[Chem. 73]

(22)

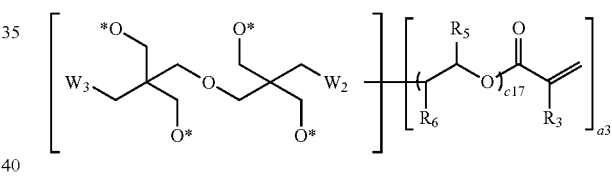

In Formula (22), * represents a bonding hand; W2 and W3 are each independently H, $CH_3$, OH or an oxygen atom having a bonding hand (*); $R_3$, $R_5$ and $R_6$ are each independently H or $CH_3$; a3 indicates an integer of 4 to 6; and c17 indicates an integer of 0 to 3.

[Chem. 74]

(23)

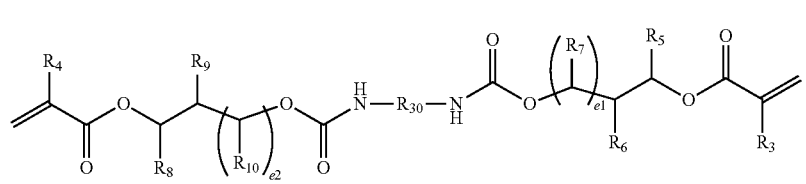

In Formula (23), R is hexamethylene, isophorone (1-methylene-3-ethylene-3-methyl-5,5-dimethyl-cyclohexane), norbornanedimethylene, dicyclohexylenemethane, cyclohexanedimethylene or xylylene; $R_3$ to $R_{10}$ are each independently H or $CH_3$; and e1 and e2 each independently indicate an integer of 0 to 2.

[Chem. 75]

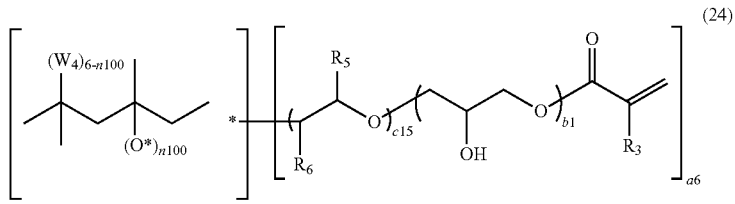

(24)

In Formula (24), $R_3$, $R_5$ and $R_6$ are each independently H or $CH_3$; b1 indicates an integer of 0 to 2; c15 indicates an integer of 0 to 20; and n100 indicates an integer of 1 to 6.

[Chem. 76]

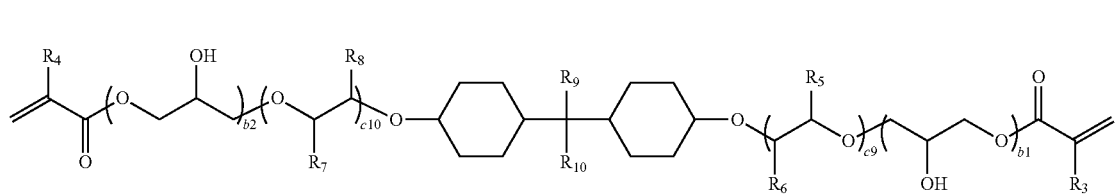

(25)

In Formula (25), $R_3$ to $R_{10}$ are each independently H or $CH_3$; b1 and b2 each independently indicate an integer of 0 to 2; and c9 and c10 each independently indicate an integer of 0 to 5.

[Chem. 77]

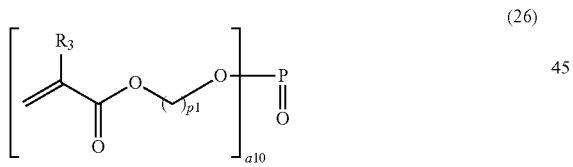

(26)

In Formula (26), $R_3$ is H or $CH_3$; p1 indicates an integer of 1 to 6; and a10 indicates 3.

[Chem. 78]

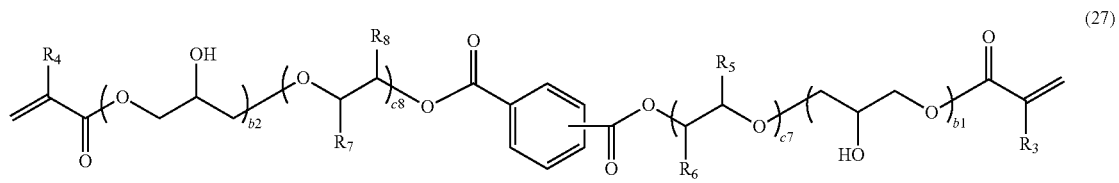

(27)

In Formula (27), $R_3$ to $R_8$ are each independently H or $CH_3$; b1 and b2 each independently indicate an integer of 0 to 2; and c7 and c8 each independently indicate an integer of 0 to 5.

[Chem. 79]

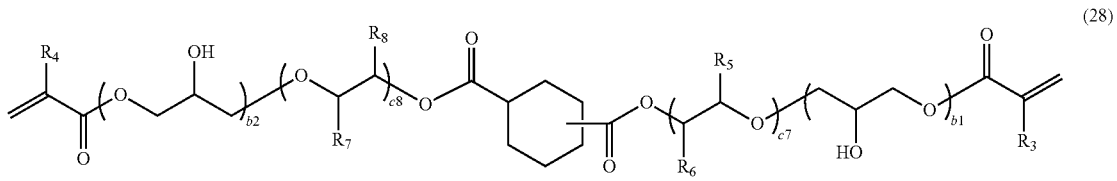
(28)

In Formula (28), $R_3$ to $R_8$ are each independently H or $CH_3$; b1 and b2 each independently indicate an integer of 0 to 2; and c7 and c8 each independently indicate an integer of 0 to 5.

[Chem. 80]

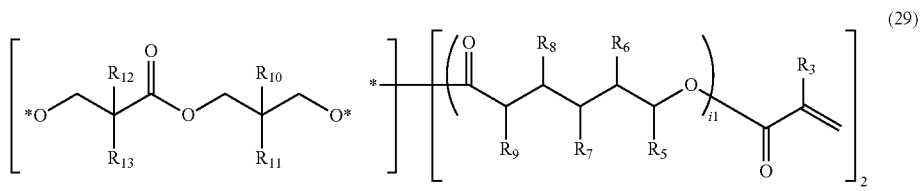
(29)

In Formula (29), $R_3$ and $R_5$ to $R_{13}$ are each independently H or $CH_3$; and i1 indicates an integer of 0 to 5.

[Chem. 81]

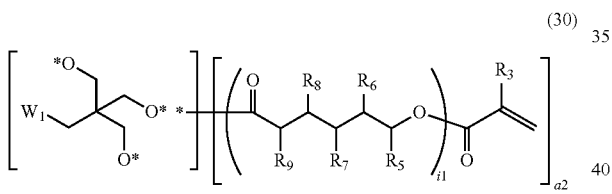
(30)

In Formula (30), $R_3$ and $R_5$ to $R_9$ are each independently H or $CH_3$; W1 is H, $CH_3$, OH or an oxygen atom having a bonding hand (*); a2 indicates 3 or 4; and i1 indicates an integer of 0 to 5.

[Chem. 82]

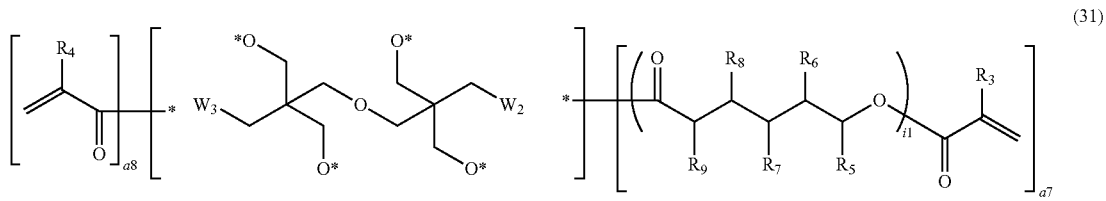
(31)

In Formula (31), $R_3$ to $R_9$ are each independently H or $CH_3$; W2 and W3 are each independently H, $CH_3$, OH or an oxygen atom having a bonding hand (*); a7 indicates an integer of 1 to 6; a8 indicates an integer of 0 to 5; and a7+a8=2 to 6.

[Chem. 83]

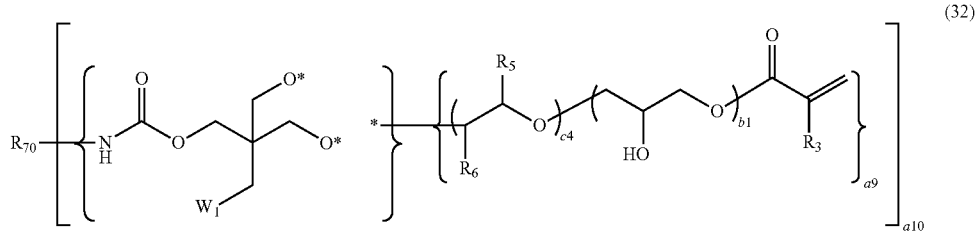

(32)

In Formula (32), $R_{70}$ is toluylene, diphenylmethane, hexamethylene, isophorone (1-methylene-3-ethylene-3-methyl-5,5-dimethyl-cyclohexane), norbornanedimethylene, dicyclohexylenemethane, cyclohexanedimethylene, N,N',N"-tris(hexamethylene)-isocyanurate, N,N,N'-tris(hexamethylene)-urea, N,N,N',N'-tetrakis(hexamethylene)-urea or xylylene; $R_3$, $R_5$ and $R_6$ are each independently H or $CH_3$; W1 is H, $CH_3$, OH or an oxygen atom having a bonding hand (*); a9 indicates an integer of 1 to 4; a10 indicates an integer of 2 to 4; b1 indicates an integer of 0 to 2; and c4 indicates an integer of 0 to 5.

Examples of the polyvalent monomers (II) represented by General Formula (5) include polyethylene glycol di(meth)acrylate, 1,2-polypropylene glycol di(meth)acrylate, 1,3-polypropylene glycol di(meth)acrylate, 1,4-polybutylene glycol di(meth)acrylate, polyethylene glycol-bis{3-(meth)acryloyloxy-2-hydroxy-propyl}ether and 1,2-polypropylene glycol-bis{3-(meth)acryloyloxy-2-hydroxy-propyl}ether.

Examples of the polyvalent monomers (II) represented by General Formula (6) include 1,2-polypropylene glycol-bis{(meth)acryloyl-poly(oxyethylene)}ether.

[Chem. 84]

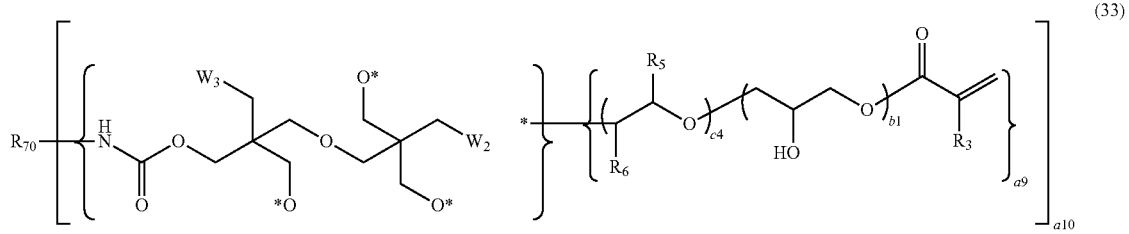

(33)

In Formula (33), $R_{70}$ is toluylene, diphenylmethane, hexamethylene, isophorone (1-methylene-3-ethylene-3-methyl-5,5-dimethyl-cyclohexane), norbornanedimethylene, dicyclohexylenemethane, cyclohexanedimethylene, N,N',N"-tris(hexamethylene)-isocyanurate, N,N,N'-tris(hexamethylene)-urea, N,N,N',N'-tetrakis(hexamethylene)-urea or xylylene; $R_3$, $R_5$ and $R_6$ are each independently H or $CH_3$; W1 is H, $CH_3$, OH or an oxygen atom having a bonding hand (*); a9 indicates an integer of 1 to 4; a10 indicates an integer of 2 to 4; b1 indicates an integer of 0 to 2; and c4 indicates an integer of 0 to 5.

Examples of the polyvalent monomers (II) represented by General Formula (3) include ethylene glycol di(meth)acrylate, 1,2-propanediol di(meth)acrylate, 1,3-propanediol di(meth)acrylate, 1,4-butanediol di(meth)acrylate, 1,6-hexanediol di(meth)acrylate, 1,9-nonanediol di(meth)acrylate, 1,10-decanediol di(meth)acrylate, neopentyl glycol di(meth)acrylate, 2-methyl-1,8-octanediol di(meth)acrylate, 2-butyl-2-ethyl-1,3-propanediol di(meth)acrylate, 1,2-bis{3-(meth)acryloyloxy-2-hydroxy-propyloxy}ethane, 1,2-bis{3-(meth)acryloyloxy-2-hydroxy-propyloxy}propane, 1,3-bis{3-(meth)acryloyloxy-2-hydroxy-propyloxy}propane, 1,4-bis{3-(meth)acryloyloxy-2-hydroxy-propyloxy}butane and 1,6-bis{3-(meth)acryloyloxy-2-hydroxy-propyloxy}hexane.

Examples of the polyvalent monomers (II) represented by General Formula (4) include neopentyl glycol hydroxypivalate di(meth)acrylate.

Examples of the polyvalent monomers (II) represented by General Formula (7) include 1,3-polypropylene glycol di(meth)acrylate, 1,4-polybutylene glycol di(meth)acrylate and 1,4-polybutylene glycol-bis{3-(meth)acryloyloxy-2-hydroxy-propyl}ether.

Examples of the polyvalent monomers (II) represented by General Formula (8) include bis{2-(meth)acryloylthioethyl}sulfide and bis{5-(meth)acryloylthio-3-thiapentyl}sulfide.

Examples of the polyvalent monomers (II) represented by General Formula (10) include cyclohexanediol di(meth)acrylate, bis{(meth)acryloyloxy-methyl}cyclohexane, bis{7-(meth)acryloyloxy-2,5-dioxaheptyl}cyclohexane and bis{(meth)acryloyloxy-poly(ethyleneoxy)-methyl}cyclohexane.

Examples of the polyvalent monomers (II) represented by General Formula (11) include tricyclodecanedimethanol di(meth)acrylate.

Examples of the polyvalent monomers (II) represented by General Formula (12) include 2-propenoic acid {2-(1,1-dimethyl-2-{(1-oxo-2-propenyl)oxy}ethyl)-5-ethyl-1,3-dioxan-5-yl}methyl ester (trade name "KAYARAD R-604", manufactured by Nippon Kayaku Co., Ltd.).

Examples of the polyvalent monomers (II) represented by General Formula (13) include N,N',N"-tris{2-(meth)acryloyloxy-ethyl}isocyanurate.

Examples of the polyvalent monomers (II) represented by General Formula (14) include xylylenediol di(meth)acrylate, bis{7-(meth)acryloyloxy-2,5-dioxaheptyl}benzene and bis{(meth)acryloyloxy-poly(ethyleneoxy)-methyl}benzene.

Examples of the polyvalent monomers (II) represented by General Formula (15) include bisphenol A di(meth)acrylate, bis{(meth)acryloyl-oxyethyl}bisphenol A, bis{(meth)acryloyl-oxypropyl}bisphenol A, bis{(meth)acryloyl-poly(oxyethylene)}bisphenol A, bis{(meth)acryloyl-poly(oxy-1,2-propylene)}bisphenol A, bis{3-(meth)acryloyloxy-2-hydroxy-propyl}bisphenol A, bis{3-(meth)acryloyloxy-2-hydroxy-propyl-oxyethyl}bisphenol A, bis{3-(meth)acryloyloxy-2-hydroxy-propyl-oxypropyl}bisphenol A, bis{3-(meth)acryloyloxy-2-hydroxy-propyl-poly(oxyethylene)}bisphenol A and bis{3-(meth)acryloyloxy-2-hydroxy-propyl-poly(oxy-1,2-propylene)}bisphenol A.

Examples of the polyvalent monomers (II) represented by General Formula (16) include bis{(meth)acryloyl-oxyethyl-oxypropyl}bisphenol A and bis{(meth)acryloylpoly(oxyethylene)-poly(oxy-1,2-propylene)}bisphenol A.

Examples of the polyvalent monomers (II) represented by General Formula (17) include naphthalene diol di(meth)acrylate and bis{3-(meth)acryloyloxy-2-hydroxy-propyl-oxy}naphthalene.

Examples of the polyvalent monomers (II) represented by General Formula (18) include 9,9-fluorene diol di(meth)acrylate, 9,9-bis{4-(2-(meth)acryloyloxy-ethyl-oxy)}fluorene and 9,9-bis{3-phenyl-4-(meth)acryloyloxy-poly(ethyleneoxy)}fluorene.

Examples of the polyvalent monomers (II) represented by General Formula (19) include phenol novolak epoxy(meth)acrylate (trade names "NK Oligo EA-6320, EA-7120 and EA-7420", manufactured by Shin-Nakamura Chemical Co., Ltd.).

Examples of the polyvalent monomers (II) represented by General Formula (20) include glycerin-1,3-di(meth)acrylate, 1-acryloyloxy-2-hydroxy-3-methacryloyloxy-propane, 2,6,10-trihydroxy-4,8-dioxaundecane-1,11-di(meth)acrylate, 1,2,3-tris{3-(meth)acryloyloxy-2-hydroxy-propyl-oxy}propane, 1,2,3-tris{2-(meth)acryloyloxy-ethyl-oxy}propane, 1,2,3-tris{2-(meth)acryloyloxy-propyl-oxy}propane, 1,2,3-tris{(meth)acryloyloxy-poly(ethyleneoxy)}propane and 1,2,3-tris{(meth)acryloyloxy-poly(1,2-propyleneoxy)}propane.

Examples of the polyvalent monomers (II) represented by General Formula (21) include trimethylolpropane tri(meth)acrylate, trimethylolpropane-tris{(meth)acryloyloxy-ethyl-oxy}ether, trimethylolpropane-tris{2-(meth)acryloyloxy-propyl-oxy}ether, trimethylolpropane-tris{(meth)acryloyloxy-poly(ethyleneoxy)}ether, trimethylolpropane-tris{(meth)acryloyloxy-poly(1,2-propyleneoxy)}ether, pentaerythritol tri(meth)acrylate, pentaerythritol tetra(meth)acrylate, pentaerythritol-tetrakis{(meth)acryloyloxy-ethyl-oxy}ether, pentaerythritol-tetrakis{2-(meth)acryloyloxy-propyl-oxy}ether, pentaerythritol-tetrakis{(meth)acryloyloxy-poly(ethyleneoxy)}ether and pentaerythritol-tetrakis{(meth)acryloyloxy-poly(1,2-propyleneoxy)}ether.

Examples of the polyvalent monomers (II) represented by General Formula (22) include ditrimethylolpropane tetra(meth)acrylate, ditrimethylolpropane-tetrakis{(meth)acryloyloxy-ethyl-oxy}ether, ditrimethylolpropane-tetrakis {2-(meth)acryloyloxy-propyl-oxy}ether, ditrimethylolpropane-tetrakis{(meth)acryloyloxy-poly(ethyleneoxy)}ether, ditrimethylolpropane-tetrakis{(meth)acryloyloxy-poly(1,2-propyleneoxy)}ether, dipentaerythritol penta(meth)acrylate, dipentaerythritol hexa(meth)acrylate, dipentaerythritol-hexa{(meth)acryloyloxy-ethyl-oxy}ether, dipentaerythritol-hexa{2-(meth)acryloyloxy-propyl-oxy}ether, dipentaerythritol-hexa{(meth)acryloyloxy-poly(ethyleneoxy)}ether and dipentaerythritol-hexa{(meth)acryloyloxy-poly(1,2-propyleneoxy)}ether.

Examples of the polyvalent monomers (II) represented by General Formula (23) include products obtained by the reaction of hydroxyalkyl(meth)acrylates such as 2-hydroxyethyl(meth)acrylate, 2-hydroxypropyl(meth)acrylate, 3-hydroxypropyl(meth)acrylate or 4-hydroxybutyl(meth)acrylate with hexamethylene diisocyanate; products obtained by the reaction of hydroxyalkyl(meth)acrylates with isophorone diisocyanate; products obtained by the reaction of hydroxyalkyl(meth)acrylates with bis(isocyanatomethyl)norbornane; products obtained by the reaction of hydroxyalkyl(meth)acrylates with norbis(4-isocyanatocyclohexyl)methane; products obtained by the reaction of hydroxyalkyl(meth)acrylates with 1,3-bis(isocyanatomethyl)cyclohexane; and products obtained by the reaction of hydroxyalkyl(meth)acrylates with m-xylylene diisocyanate.

The monomer composition includes the monomer (I) and the polyvalent monomer (II) in a monomer (I)/polyvalent monomer (II) molar ratio of 1/1000 to less than 1/30. This molar ratio of the monomer (I) to the polyvalent monomer (II) ensures that the obtainable monolayer film achieves excellent transparency even when the film thickness of the monolayer film is large, and also exhibits excellent scratch resistance.

In the invention, the molar ratio of the monomer (I) to the polyvalent monomer (II), namely, monomer (I)/polyvalent monomer (II), is 1/1000 to less than 1/30, preferably 1/500 to less than 1/31, and more preferably 1/300 to less than 1/32.

The haze value is a frequent indicator of the transparency of coating films. It is accepted that a haze value of less than 1% is usually needed in applications such as optical applications where high transparency is required.

On the other hand, while the monolayer film described in Patent Literature 7 is an excellent material as an antifouling film, an antifogging film or the like, it is often the case that the film has a haze value of 1% or above and that the film fails to sufficiently satisfy the need for higher scratch resistance. When the molar ratio of the monomer (I) to the polyvalent monomer (II) is in the above range, the obtainable monolayer film tends to exhibit excellent transparency with a haze value of less than 1%. Further, such a monolayer film tends to outperform the film of Patent Literature 7 in terms of scratch resistance.

The monomer composition may include an additional monomer (III) other than the monomers (I) and the monomers (II) while still achieving the advantageous effects of the invention.

Examples of the additional monomers (III) include carboxyl group- or carboxylate salt group-containing monomers other than the monomers (I), such as (meth)acrylic acid; hydroxyalkyl(meth)acrylates such as hydroxyethyl(meth)acrylate, hydroxypropyl(meth)acrylate and hydroxybutyl(meth)acrylate; alkyl mono(meth)acrylates such as methyl(meth)acrylate, ethyl(meth)acrylate, butyl(meth)acrylate and isobornyl(meth)acrylate; amino group- or ammonium salt group-containing monomers such as N,N-dimethyl-aminoethyl-(meth)acrylate and N,N-dimethyl-aminoethyl-(meth)acrylate hydrochloride; sulfonic group- or sulfonate salt group-containing monomers other than the monomers (I), such as sodium vinylsulfonate, styrenesulfonic acid, sodium styrenesulfonate, potassium styrenesulfonate, 2-acrylamido-2-methylpropanesulfonic acid and potassium 2-acrylamido-2-methylpropanesulfonate; allyl(meth)acrylate, diethylene glycol bis(allyl carbonate), diallyl phthalate, divinylbenzene, divinylsulfone, glycidyl(meth)acrylate, 3-isopropenyl-α,α-dimethyl-benzyl isocyanate, (meth)acryloyl isocyanate, (meth)acryloyloxyethyl isocyanate, xylylene diisocyanate, hexamethylene diisocyanate, bis(isocyanatomethyl)norbornane, isophorone diisocyanate, 1,3-bis(isocyanatomethyl)cyclohexane and bis(4-isocyanato-cyclohexyl)methane.

When the refractive index of the monolayer film is to be increased, monomers having sulfur atoms may be used as the monomers (III), with examples including 2,5-bis(acryloylthiomethyl)-1,4-dithiane, 1,8-bis(acryloylthio)-5-acryloylthiomethyl-3,6-dithiaoctane, 2,5-bis(acryloylthiomethyl)-1,4-dithiane and 1,11-bis(acryloylthio)-4,8-bis(acryloylthiomethyl)-3,6,9-trithiaundecane.

The content of the monomers (III) in the monomer composition is not particularly limited as long as the advantageous effects of the invention are not impaired. However, such monomers are usually used in not more than 100 mol %, preferably not more than 49 mol %, and more preferably not more than 40 mol % relative to the total of the monomer (I) and the monomer (II) taken as 100 mol %. When the additional monomers are present in the monomer composition in the above content, properties such as flexibility, toughness and refractive index may be adjusted.

In the invention, the monomer composition is mixed together with a solvent including a compound with a solubility parameter σ of not less than 9.3 (cal/cm$^3$).

The solubility parameter σ (cal/cm$^3$) may be calculated based on the following values (1) to (4).

(1) Latent heat of evaporation per 1 mol: $Hb=21\times(273+Tb)$ [unit: cal/mol], Tb: boiling point (° C.) of the solvent (2) Latent heat of evaporation per 1 mol at 25° C.: $H25=Hb\times\{1+0.175\times(Tb-25)/100\}$ [unit: cal/mol], Tb: boiling point (° C.) of the solvent (3) Intermolecular bond energy: $E=H25-596$ [unit: cal/mol]

(4) Intermolecular bond energy per 1 ml (cm$^3$) solvent: $E1=E\times D/Mw$ [unit: cal/cm$^3$], D: density (g/cm$^3$), Mw: molecular weight of the solvent (5) Solubility parameter: $\sigma=(E1)^{1/2}$ [unit: cal/cm$^3$]

According to the configuration in which the mixture contains the monomer composition and the solvent including a compound with a solubility parameter σ (cal/cm$^3$) of not less than 9.3, a certain interaction is produced between the solvent and the anionic hydrophilic groups derived from the monomer (I). Consequently, the removal of the solvent from the mixture that has been applied onto a substrate takes place in such a manner that the anionic hydrophilic groups (the monomer (I)) migrate together with the solvent to the surface of the applied mixture which is in contact with outside air, with the result that the anionic hydrophilic groups are concentrated in the surface and the monolayer film obtained in the invention attains a structure (a gradient structure) in which the anionic hydrophilic groups are concentrated in the outer surface of the monolayer film.

If the solubility parameter σ (cal/cm$^3$) is less than 9.3, the above interaction becomes weak and fails to realize the formation of a sufficient gradient structure. In order to facilitate the formation of this gradient structure, the solubility parameter σ (cal/cm$^3$) is preferably not less than 9.5.

In order to further facilitate the formation of the gradient structure, solvents having a boiling point of 30 to 170° C. are preferable, solvents having a boiling point of 50 to 140° C. are more preferable, and solvents having a boiling point of 60 to 125° C. are still more preferable. In the case where the solvent is a mixed solvent including two or more compounds, the highest boiling point of the mixed solvent should be in the above range.

Examples of the compounds usable as the solvents which have a solubility parameter σ (cal/cm$^3$) of not less than 9.3 and a boiling point of 30 to 170° C. include alcohols such as methanol, ethanol, 2-methoxyethanol, cyclohexanol, 1-propanol, IPA (isopropanol), 2-ethoxyethanol, 1-butanol, isobutanol, 1-methoxy-2-propanol, 2-butanol, 1-pentanol, 2-methyl-1-butanol and isopentanol (3-methyl-1-butanol);

ketones such as cyclohexanone, 2-methylcyclohexanone and acetone;

carboxylic acids such as formic acid, acetic acid and propionic acid;

carboxylate esters such as methyl acetate;

ethers such as dioxane, anisole and THF (tetrahydrofuran);

amides such as DMF (N,N'-dimethylformamide) and DMAC (N,N'-dimethylacetamide);

nitriles such as acetonitrile; and water.

Of the above compounds, alcohols are preferable. Of the alcohols, preferred results tend to be obtained with primary alcohols such as methanol, ethanol, 1-propanol, 2-methoxyethanol, 2-ethoxyethanol, 1-butanol, 1-pentanol, 2-methyl-1-butanol and isopentanol (3-methyl-1-butanol).

The solvent may include a single compound with a solubility parameter σ (cal/cm$^3$) of not less than 9.3, or a mixture of such compounds.

In the case where the solvent is a mixed solvent including two or more compounds, at least one of the compounds should satisfy the solubility parameter requirement. When the solubility parameter of one of the compounds in the solvent satisfies the above conditions, that compound will have a certain interaction with the anionic hydrophilic groups derived from the monomer (I). Thus, the removal of the solvent from the mixture that has been applied onto a substrate similarly takes place in such a manner that the anionic hydrophilic groups (the monomer (I)) migrate together with that compound to the surface of the applied mixture which is in contact with outside air, with the result that the anionic hydrophilic groups are concentrated in the surface.

In the case of a mixed solvent including two or more compounds, the compound with the highest boiling point tends to be most influential on the formation of a gradient structure. Thus, it is preferable that the compound with the highest boiling point in the mixed solvent have a solubility parameter σ (cal/cm$^3$) of not less than 9.3.

In the case of a mixed solvent including two or more compounds, the weight ratio of the compound satisfying the requirement of the solubility parameter σ (cal/cm$^3$) to (:) other compound(s) is preferably in the range of 99.9:0.1 to 1:99, more preferably 99:1 to 10:90, and more preferably 98:2 to 30:70.

Ethanolamine compounds having a hydroxyethylamino structure [$NR_aR_b(CH_2CH_2OH)$: $R_a$ and $R_b$ are each independently a hydrogen atom, an alkyl group of 1 to 15 carbon atoms or a $CH_2CH_2OH$ group] are desirably not present in the solvent, although these compounds have a solubility parameter σ (cal/cm$^3$) of not less than 9.3. Examples of such compounds include ethanolamine, diethanolamine, triethanolamine, N-ethyl-ethanolamine, N-(2-ethylhexyl)ethanolamine, N-butyl-diethanolamine, N-hexyl-diethanolamine, N-lauryl-diethanolamine and N-cetyl-diethanolamine. Such an ethanolamine compound has so strong an interaction with the anionic hydrophilic group derived from the monomer (I) that the ethanolamine compound and the anionic hydrophilic group interact as if they form a molecule (typically a salt) to increase the apparent molecular weight of the anionic hydrophilic group. This increase in molecular weight decreases the speed of migration in the medium and makes it difficult for the anionic hydrophilic groups to be migrated to the surface in contact with outside air when the solvent is removed from the mixture of the solvent and the monomer composition that has been applied onto a substrate. Even if the anionic hydrophilic groups are migrated together with the ethanolamine compound to the surface in contact with outside air, the anion concentration per unit surface area is inevitably decreased compared to when the anions have no interaction with the ethanolamine compound, because of the increased apparent molecular weight of the anions which have been interacted with the ethanolamine compound. Thus, it is difficult for the anions to be concentrated at the surface. In addition to the strong interaction, the ethanolamine compounds have a relatively high boiling point (about 170° C. or above) and are difficult to evaporate. Consequently, the ethanolamine compounds, even when present in the free form, are unlikely to migrate toward the surface and tend to remain inside. Thus, the substances resulting from the interaction between the ethanolamine compounds and the anions have been increased in molecular weight and it tends to be more difficult for these substances to migrate to the surface. That is, the use of a solvent including the ethanolamine compound suppresses the migration of anions to the surface in contact with outside air and tends to result in residual anions in the mixture of the solvent and the monomer composition (in the inside of the monolayer film). As a result, the monolayer film obtained according to the invention tends to fail to have a structure in which the anionic hydrophilic groups are concentrated at the outer surface (a gradient structure), and tends to be deteriorated in properties such as hydrophilicity.

Further, the use of the ethanolamine compound as a solvent sometimes results in the occurrence of undesired side reactions such as the decomposition (such as hydrolysis, alcoholysis, and direct decomposition by the primary or secondary amino groups of the ethanolamine compound) of the ester bonds present in materials such as the monomer (I) and the polyvalent monomer (II), and the direct reaction (the Michael addition) of the primary or secondary amino groups of the ethanolamine compound to the (meth)acryloyl groups present in the monomer (I) and the polyvalent monomer (II), leading to problems such as insufficient polymerization of the monomer mixture and a decrease in the crosslink density in the monolayer film.

The mixture containing the monomer composition and the solvent with a solubility parameter a of not less than 9.3 (cal/cm$^3$) may contain a polymerization initiator as required.

For example, when the monomer composition in the mixture is polymerized on a substrate by the application of radiations, for example, UV rays, the mixture containing the monomer composition and the solvent with a solubility parameter a of not less than 9.3 (cal/cm$^3$) may contain a photopolymerization initiator such as a radical photopolymerization initiator, a cationic photopolymerization initiator or an anionic photopolymerization initiator.

Preferred examples of the radical photopolymerization initiators include benzophenone, 4-phenylbenzophenone, 2,4-diethylthioxanthone, IRGACURE 651 (manufactured by Ciba Specialty Chemicals Inc.), IRGACURE 184 (manufactured by Ciba Specialty Chemicals Inc.), DAROCUR 1173 (manufactured by Ciba Specialty Chemicals Inc.), IRGACURE 500 (manufactured by Ciba Specialty Chemicals Inc.), IRGACURE 2959 (manufactured by Ciba Specialty Chemicals Inc.), IRGACURE 127 (manufactured by Ciba Specialty Chemicals Inc.), IRGACURE 907 (manufactured by Ciba Specialty Chemicals Inc.), IRGACURE 369 (manufactured by Ciba Specialty Chemicals Inc.), IRGACURE 1300 (manufactured by Ciba Specialty Chemicals Inc.), IRGACURE 819 (manufactured by Ciba Specialty Chemicals Inc.), IRGACURE 1800 (manufactured by Ciba Specialty Chemicals Inc.), DAROCUR TPO (manufactured by Ciba Specialty Chemicals Inc.), DAROCUR 4265 (manufactured by Ciba Specialty Chemicals Inc.), IRGACURE OXE01 (manufactured by Ciba Specialty Chemicals Inc.), IRGACURE OXE02 (manufactured by Ciba Specialty Chemicals Inc.), ESACURE KT55 (manufactured by Lamberti S.P.A.), ESACURE KIP150 (manufactured by Lamberti S.P.A.), ESACURE KIP100F (manufactured by Lamberti S.P.A.), ESACURE KT37 (manufactured by Lamberti S.P.A.), ESACURE KT046 (manufactured by Lamberti S.P.A.), ESACURE 1001M (manufactured by Lamberti S.P.A.), ESACURE KIP/EM (manufactured by Lamberti S.P.A.), ESACURE DP250 (manufactured by Lamberti S.P.A.) and ESACURE KB1 (manufactured by Lamberti S.P.A.). Of these radical photopolymerization initiators, IRGACURE 184 (manufactured by Ciba Specialty Chemicals Inc.), DAROCUR 1173 (manufactured by Ciba Specialty Chemicals Inc.), IRGACURE 500 (manufactured by Ciba Specialty Chemicals Inc.), IRGACURE 819 (manufactured by Ciba Specialty Chemicals Inc.), DAROCUR TPO (manufactured by Ciba Specialty Chemicals Inc.), ESACURE KIP100F (manufactured by Lamberti S.P.A.), ESACURE KT37 (manufactured by Lamberti S.P.A.) and ESACURE KT046 (manufactured by Lamberti S.P.A.) are preferable.

Examples of the cationic photopolymerization initiators include IRGACURE 250 (manufactured by Ciba Specialty Chemicals Inc.), IRGACURE 784 (manufactured by Ciba Specialty Chemicals Inc.), ESACURE 1064 (manufactured by Lamberti S.P.A.), CYRAURE UVI6990 (manufactured by Union Carbide Corp. Japan), ADEKA OPTOMER SP-172 (manufactured by ADEKA CORPORATION), ADEKA OPTOMER SP-170 (manufactured by ADEKA CORPORATION), ADEKA OPTOMER SP-152 (manufactured by ADEKA CORPORATION) and ADEKA OPTOMER SP-150 (manufactured by ADEKA CORPORATION).

Of the photopolymerization initiators, the radical photopolymerization initiators are preferable.

The photopolymerization initiator is preferably used in an amount of 0.1 to 20 parts by weight, more preferably 0.5 to 10 parts by weight, and still more preferably 1 to 5 parts by weight with respect to 100 parts by weight of the total of the monomer (I), the polyvalent monomer (II) and the optional monomer (III) in the monomer composition.

In addition to the photopolymerization initiator, the mixture may further contain a photopolymerization accelerator.

Examples of the photopolymerization accelerators include 2,2-bis(2-chlorophenyl)-4,5'-tetraphenyl-2'H-<1,2'>biimidazolyl, tris(4-dimethylaminophenyl)methane, 4,4'-bis(dimethylamino)benzophenone, 2-ethylanthraquinone and camphorquinone.

Further, the mixture containing the monomer composition and the solvent with a solubility parameter a of not less than 9.3 (cal/cm$^3$) may contain a UV absorber and a hindered amine light stabilizer (HALS).

In order for the inventive monolayer film to be used as an antifouling material, an antifogging material or the like which is not denatured even by prolonged exposure to outside, the weather resistance of the obtainable monolayer film can be improved by the addition of a UV absorber and a hindered amine light stabilizer (HALS) to the mixture.

The UV absorbers may be any of various kinds of general UV absorbers such as benzotriazole UV absorbers, triazine UV absorbers, benzophenone UV absorbers, benzoate UV absorbers, propanedioate ester UV absorbers and oxanilide UV absorbers.

Examples of the UV absorbers include benzotriazole UV absorbers such as 2-(2H-benzotriazol-2-yl)-p-cresol, 2-(2H- benzotriazol-2-yl)-4-tert-butylphenol, 2-(2H-benzotriazol-2-yl)-4,6-di-tert-butylphenol, 2-(2H-benzotriazol-2-yl)-4,6-bis(1-methyl-1-phenylethyl) phenol, 2-(2H-benzotriazol-2-yl)-4-(1,1,3,3-tetramethyl-butyl)-6-(1-methyl-1-phenylethyl)phenol, 2-(2H-benzotriazol-2-yl)-4-(3-one-4-oxa-dodecyl)-6-tert-butyl-phenol, 2-{5-chloro(2H)-benzotriazol-2-yl}-4-(3-one-4-oxa-dodecyl)-6-tert-butyl-phenol, 2-{5-chloro(2H)-benzotriazol-2-yl}-4-methyl-6-tert-butyl-phenol, 2-(2H-benzotriazol-2-yl)-4,6-di-tert-pentylphenol, 2-{5-chloro(2H)-benzotriazol-2-yl}-4,6-di-tert-butylphenol, 2-(2H-benzotriazol-2-yl)-4-tert-octylphenol, 2-(2H-benzotriazol-2-yl)-4-methyl-6-n-dodecylphenol, and a product of the reaction between methyl-3-{3-(2H-benzotriazol-2-yl)-5-tert-butyl-4-hydroxyphenyl}propionate and polyethylene glycol 300;

triazine UV absorbers such as 2-(4-phenoxy-2-hydroxyphenyl)-4,6-diphenyl-1,3,5-triazine, 2-(2-hydroxy-4-oxa-hexadecyloxy)-4,6-di(2,4-dimethyl-phenyl)-1,3,5-triazine, 2-(2-hydroxy-4-oxa-heptadecyloxy)-4,6-di(2,4-dimethyl-phenyl)-1,3,5-triazine, 2-(2-hydroxy-4-iso-octyloxy-phenyl)-4,6-di(2,4-dimethyl-phenyl)-1,3,5-triazine, TINUVIN 400 (trade name, manufactured by Ciba Specialty Chemicals, Inc.), TINUVIN 405 (trade name, manufactured by Ciba Specialty Chemicals, Inc.), TINUVIN 460 (trade name, manufactured by Ciba Specialty Chemicals, Inc.) and TINUVIN 479 (trade name, manufactured by Ciba Specialty Chemicals, Inc.);

benzophenone UV absorbers such as 2-hydroxy-4-n-octoxybenzophenone;

benzoate UV absorbers such as 2,4-di-tert-butylphenyl-3,5-di-tert-butyl-4-hydroxybenzoate;

propanedioate ester UV absorbers such as propanedioic acid-{(4-methoxyphenyl)-methylene}-dimethyl ester, HOSTAVIN PR-25 (trade name, manufactured by Clariant (Japan) K.K.) and HOSTAVIN B-CAP (trade name, manufactured by Clariant (Japan) K.K.); and oxanilide UV absorbers such as 2-ethyl-2'-ethoxy-oxanilide and Sanduvor VSU (trade name, manufactured by Clariant (Japan) K.K.).

Of these UV absorbers, preferable results tend to be obtained with triazine UV absorbers.

The UV absorber is usually used in an amount of 0.1 to 20 parts by weight, and preferably 0.5 to 10 parts by weight with respect to 100 parts by weight of the total of the monomer (I), the polyvalent monomer (II) and the optional monomer (III) in the monomer composition.

If the amount of the UV absorber used is less than the lower limit, the effects tend to be small in the improvement of the weather resistance of the obtainable monolayer film. The use of the UV absorber in an amount exceeding the upper limit may result in insufficient polymerization.

The hindered amine light stabilizers (HALS) are compounds which usually have a 2,2,6,6-tetramethylpiperidine skeleton, and such compounds are generally abbreviated to as HALS. These compounds are largely classified depending on the molecular weight into low molecular weight HALS, medium molecular weight HALS and high molecular weight HALS, as well as into reactive HALS.

Examples of the HALS include TINUVIN 111FDL (trade name, manufactured by Ciba Specialty Chemicals, Inc.), bis(1-octyloxy-2,2,6,6-tetramethyl-4-piperidyl) sebacate (trade name: TINUVIN 123 (manufactured by Ciba Specialty Chemicals, Inc.)), TINUVIN 144 (trade name, manufactured by Ciba Specialty Chemicals, Inc.), TINUVIN 292 (trade name, manufactured by Ciba Specialty Chemicals, Inc.), TINUVIN 765 (trade name, manufactured by Ciba Specialty Chemicals, Inc.), TINUVIN 770 (trade name, manufactured by Ciba Specialty Chemicals, Inc.), N,N'-bis(3-aminopropyl)ethylenediamine-2,4-bis[N-butyl-N-(1,2,2,6,6-pentamethyl-4-piperidyl) amino]-6-chloro-1,3,5-triazine condensate (trade name: CHIMASSORB 119FL (manufactured by Ciba Specialty Chemicals, Inc.)), CHIMASSORB 2020FDL (trade name, manufactured by Ciba Specialty Chemicals, Inc.), dimethyl succinate-1-(2-hydroxyethyl)-4-hydroxy-2,2,6,6-tetramethyl piperidine polycondensate (trade name: CHIMASSORB 622LD (manufactured by Ciba Specialty Chemicals, Inc.)), poly[{6-(1,1,3,3-tetramethylbutyl)amino-1,3,5-triazin-2,4-diyl}{(2,2,6,6-tetramethyl-4-piperidyl)imino}hexamethylene {(2,2,6,6-tetramethyl-4-piperidyl)imino}] (trade name: CHIMASSORB 944FD (manufactured by Ciba Specialty Chemicals, Inc.)), Sanduvor 3050 Liq. (trade name, manufactured by Clariant (Japan) K.K.), Sanduvor 3052 Liq. (trade name, manufactured by Clariant (Japan) K.K.), Sanduvor 3058 Liq. (trade name, manufactured by Clariant (Japan) K.K.), Sanduvor 3051 Powder. (trade name, manufactured by Clariant (Japan) K.K.), Sanduvor 3070 Powder. (trade name, manufactured by Clariant (Japan) K.K.), VP Sanduvor PR-31 (trade name, manufactured by Clariant (Japan) K.K.), Hostavin N20 (trade name, manufactured by Clariant (Japan) K.K.), Hostavin N24 (trade name, manufactured by Clariant (Japan) K.K.), Hostavin N30 (trade name, manufactured by Clariant (Japan) K.K.), Hostavin N321 (trade name, manufactured by Clariant (Japan) K.K.), Hostavin PR-31 (trade name, manufactured by Clariant (Japan) K.K.), Hostavin 845 (trade name, manufactured by Clariant (Japan) K.K.) and Nylostab S-EED (trade name, manufactured by Clariant (Japan) K.K.).

The HALS is usually used in an amount of 0.1 to 10 parts by weight, preferably 0.5 to 5 parts by weight, and more preferably 1 to 3 parts by weight with respect to 100 parts by weight of the total of the monomer (I), the polyvalent monomer (II) and the optional monomer (III) in the monomer composition.

If the amount of the HALS used is less than the lower limit, the effects tend to be small in the improvement of the weather resistance of the obtainable monolayer film. The use of the HALS in an amount exceeding the upper limit may result in insufficient polymerization.

Where necessary, the mixture which contains the monomer composition and the solvent including a compound with a solubility parameter σ of not less than 9.3 (cal/cm$^3$) may contain further additives such as infrared absorbers, radical scavengers, antioxidants, polymerization inhibitors, pigments, binders, internal release agents, leveling agents, catalysts, various metal oxides, metals, metal salts, iodine and iodonium salts.

Such additives as metals or metal oxides, for example, silica and titanium oxide, may be added in order to, for example, enhance properties such as mechanical strength or heat stability, and to obtain properties such as photoresponse properties or bactericidal properties. Further, such additives as metal salts, for example, silver salts and lithium salts, as well as iodine and iodonium salts may be added in order to obtain bactericidal properties or antibacterial properties.

The amounts of these further additives may be determined appropriately in accordance with the purposes. However, these further additives are usually added in an amount of 0.01 to 200 parts by weight, and preferably 0.1 to 100 parts by weight with respect to 100 parts by weight of the total of the monomer (I), the polyvalent monomer (II) and the optional monomer (III) in the monomer composition.

In the invention, a mixture is prepared which includes the monomer composition and the solvent including a compound with a solubility parameter σ of not less than 9.3 (cal/cm³), and the mixture is applied onto a substrate.

Exemplary materials for forming the substrates include crystalline or amorphous inorganic materials such as silicas, metals and metal oxides; polymer materials such as polymethyl methacrylates, polycarbonates, polyethylene terephthalates, polyethylenes, polypropylenes, polystyrenes, polyurethane resins, epoxy resins, vinyl chloride resins and silicone resins, organic materials such as papers and pulps, and hybrid materials composed of inorganic materials and organic materials such as mixtures of glass fillers and polyethylene terephthalates.

The substrates in the invention may be formed of the aforementioned exemplary materials. Alternatively, the substrates used in the invention may be such that the surface of substrates formed of materials such as inorganic materials and organic materials is coated with coatings or the like.

Where necessary, the surface of the substrate may be subjected to a surface treatment such as a physical or chemical treatment, or a primer treatment. For example, this surface treatment is performed for the purpose of activating the surface of the substrate in order to improve the adhesion (bonding) between the substrate and the monolayer film.

Examples of the physical or chemical treatments include corona treatments, ozone treatments, low-temperature plasma treatments using gas such as oxygen gas or nitrogen gas, glow discharge treatments, and oxidation treatments using chemical agents and the like.

A primer treatment is carried out by applying a coating agent called a primer coating agent, an undercoating agent or an anchor coating agent onto the surface of the substrate, and drying the coating film.

Examples of the coating agents include polymer compositions which contain, as the main components of vehicles, polymers such as polyesters, polyamides, polyurethanes, epoxy resins, phenolic resins, (meth)acrylic resins, polyvinyl acetates, polyolefins such as polyethylenes and polypropylenes, modified polyolefins and cellulose resins.

Examples of the types of the coating agents include solvent-based coating agents in which the polymers are dissolved in solvents, and aqueous latex or dispersion-type coating agents in which the polymers are dispersed in aqueous solvents such as water.

Examples of the polymers used in the aqueous coating agents include polyolefins, polyethylene vinyl alcohols, polyethyleneimines, polybutadienes, polyurethanes such as urethane acrylic resins and polyester polyurethanes, polyvinyl chlorides, silicon acrylic resins, vinyl acetate acrylic resins, acrylic resins, styrene-butadiene copolymers, acrylonitrile-butadiene copolymers, methyl methacrylate-butadiene copolymers, rubbers such as chloroprene rubbers and polybutadienes, polyacrylate esters, polyvinylidene chlorides, and polymers obtained by modifying these resins with modifiers such as carboxylic acids.

Of the coating agents, those coating agents containing polyurethanes are preferable. Polymers having urethane bonds at any of the main chain and side chains may be used as the polyurethanes. Examples thereof include polyurethanes obtained by reacting polyols such as polyester polyols, polyether polyols or acrylic polyols, with isocyanate compounds.

Alternatively, the coating agent containing a polyurethane may be a two-part coating agent used in such a manner that a polyol-containing liquid and an isocyanate compound-containing liquid are mixed together on the spot and the mixture is applied. In the case of a two-part coating agent, a polyol-containing liquid and an isocyanate compound-containing liquid may be mixed together by any method without limitation as long as a primer is formed on the substrate. The ratio in which a polyol and an isocyanate compound are blended is not particularly limited as long as a primer is formed on the substrate. However, the value given by (OH groups in polyol)/(NCO groups in isocyanate compound) is usually in the range of 2/1 to 1/40 in terms of equivalent weight.

Of the coating agents containing polyurethanes, preferred coating agents are those which contain polyurethanes formed from polyester polyols such as condensed polyester polyols and lactone polyester polyols, and such isocyanate compounds as tolylene diisocyanate, hexamethylene diisocyanate and xylene diisocyanate. Such coating agents advantageously exhibit excellent adhesion with respect to the substrate and the monolayer film and thus achieve high peel strength.

For example, the coating agent may be applied to a substrate by a method such as a gravure coating method, a reverse roll coating method, a knife coating method or a kiss coating method. The amount of the coating agent applied is usually 0.01 g/m² to 10 g/m², and preferably 0.05 g/m² to 5 g/m² on dry basis.

After the application, at least part of the solvent is removed from the mixture applied to the substrate.

If the removal of the solvent from the mixture is insufficient, the gradient of anions in the obtainable monolayer film becomes insufficient and consequently hydrophilicity may be lowered, and further the adhesion between the monolayer film and the substrate tends to be decreased. Thus, the amount of the solvent remaining in the mixture immediately before the monomer composition is polymerized on the substrate is usually about less than 20 wt %, preferably less than 10 wt %, more preferably less than 5 wt %, still more preferably less than 2 wt %, and most preferably less than 1 wt %.

The solvent may be removed from the mixture by any method without limitation. Exemplary methods include a method in which the mixture is allowed to stand at room temperature to let the solvent evaporate naturally, a method in which the mixture is heated to remove the solvent, a method in which the mixture is allowed to stand at room temperature and the solvent is removed from the mixture by the action of wind, a method in which the solvent is removed from the mixture by reducing the pressure, a method in which the solvent is removed from the mixture by pressure reduction and heating, and a method in which the solvent is removed from the mixture by heating as well as by the action of wind.

Of these methods, it is preferable to remove the solvent from the mixture by heating and by the action of wind, that is, by a method in which the solvent is removed from the mixture applied to the substrate by the action of hot wind or by a method in which the solvent is removed from the mixture by the action of hot wind while heating the substrate on which the mixture has been applied.

The heating temperature in the removal of the solvent by heating is usually in the range from room temperature to 200° C., preferably from 30° C. to 150° C., and more preferably from 40° C. to 100° C.

The removal of the solvent may be performed in air atmosphere or an inert gas atmosphere such as nitrogen. However, it tends to be more preferable that the humidity in the atmosphere be lower. The humidity in the atmosphere is preferably not more than 70%, more preferably not more than 60%, and still more preferably not more than 55%.

When the solvent is removed by heating, the evaporation rate is increased by the application of wind to make it possible, for example, to reduce the residual amount of the solvent, shorten the drying time, and lower the drying temperature. Further, such a configuration tends to suppress the separation of the film from the substrate (the decrease in adhesion) and the occurrence of cracks (in the film) during the solvent removal.

When wind is applied, the wind speed is preferably in the range of 0.1 m/sec to 30 m/sec, more preferably in the range of 0.1 m/sec to 10 m/sec, and more preferably in the range of 0.2 m/sec to 5 m/sec. Any wind speed exceeding the upper limit tends to make it difficult to obtain a uniform coating surface. On the other hand, the application of wind at a speed of less than the lower limit tends to produce insufficient effects.

The pressure in the solvent removal is not particularly limited. It is relatively preferable to perform the solvent removal at normal pressure or a reduced pressure. The solvent may be removed at a slightly increased pressure.

The duration of time of the solvent removal may be determined appropriately in accordance with, for example, the desired amount of the residual solvent. In consideration of productivity, a shorter time tends to be more preferable. For example, the solvent removal is carried out for not more than 5 minutes, typically not more than 3 minutes, and more typically not more than 2 minutes.

After the mixture is applied to the substrate and at least part of the solvent is removed as described above, the monomer composition including the monomer (I) and the monomer (II) is polymerized. The monomer composition may be polymerized by any method without limitation. The monomer composition may be usually polymerized by heat or radiation, or by both heat and radiation. The polymerization may be performed in air atmosphere. However, the polymerization is preferably carried out in an inert gas atmosphere such as nitrogen from the viewpoint of, for example, reducing the polymerization time.

When the polymerization involves heating, the monomers may be polymerized by adding a thermal radical generator such as an organic peroxide as required to the monomer composition and heating the composition usually at a range of room temperature to 300° C.

When the polymerization involves a radiation, an energy ray usually with a wavelength in the range of 0.0001 to 800 nm may be used as the radiation. Examples of such radiations include α-rays, β-rays, γ-rays, X-rays, electron beams, UV lights and visible lights. An appropriate radiation may be selected in accordance with the chemical composition of the monomer composition and further in accordance with the photopolymerization initiator and the photopolymerization accelerator optionally used.

Of the radiations, UV lights having wavelengths of 200 to 450 nm are preferable.

The use of a radiation lamp having an output peak in the range of 240 to 270 nm or 370 to 430 nm is preferable in the case where the inventive monolayer film is produced in such a manner that a UV absorber or HALS is added to the mixture including the monomer composition and the solvent including a compound with a solubility parameter a of not less than 9.3 (cal/cm$^3$) and thereafter the monomer composition is polymerized by radiation.

Electron beams having an output peak in the range of 0.01 to 0.002 nm are also preferable because the polymerization can be completed in a short time, although such apparatuses are expensive.

In order to prevent the polymerization from being inhibited by oxygen, the polymerization may be performed in such a manner that after at least part of the solvent is removed from the mixture applied to a substrate, the coating layer of the mixture is covered with a covering material such as a film and thereafter the monomers are polymerized. The coating layer is desirably covered with a covering material tightly so that air (oxygen) will not be entrapped between the coating layer and the covering material. By excluding air, in particular oxygen, the radiation dose may be sometimes decreased when the polymerization is made by radiation, and the amount of a polymerization initiator can be reduced when a polymerization initiator such as a photopolymerization initiator is used in the polymerization.

The covering materials are not particularly limited and various materials may be used in various forms as long as oxygen can be blocked. Films are preferable in terms of handleability. When the polymerization is performed by radiation, transparent films which have high radiation transmittance and do not inhibit the polymerization are preferable.

Exemplary materials for the covering materials include vinyl alcohol polymers such as polyvinyl alcohols (PVA) and ethylene-vinyl alcohol copolymers, polyacrylamides, polyisopropyl acrylamides, polyacrylonitriles, polycarbonates (PC), polymethyl methacrylates (PMMA), polyethylene terephthalates (PET), polystyrenes (PS) and biaxially oriented polypropylenes (OPP).

The thickness of the covering materials, typically films, is usually in the range of 3 to 200 μm, preferably 5 to 100 μm, and more preferably 10 to 50 μm.

In the inventive monolayer film, as well as in a stack in which the monolayer film is disposed on at least one surface of a substrate, the monolayer film may remain covered with the above covering material. The presence of the covering material on the monolayer film can prevent the monolayer film from being scratched or fouled during transportation, storage, laying out and the like of the monolayer film or the stack.

The inventive monolayer film formed on the substrate as described above has at least one anionic hydrophilic group selected from the sulfonic group ($SO_3^-$), the carboxyl group ($CO_2^-$) and the phosphoric group ($PO_4^-$), and the anion concentration ratio (Sa/Da) of the anion concentration (Sa) at the outer surface to the anion concentration (Da) at the middle point between the inner surface in contact with the substrate and the outer surface is not less than 1.1.

Here, the middle point between the inner surface in contact with the substrate and the outer surface is a point which halves the length between the inner surface in contact with the substrate and the outer surface in contact with outside air as viewed along the direction of film thickness of the monolayer film.

The anion concentration ratio is determined by cutting at a slant the monolayer film provided on the substrate, and measuring the anion concentration in the outer surface of the monolayer film in contact with outside air and the anion concentration at the middle point between the inner surface and the outer surface with a time-of-flight secondary ion mass spectrometer (TOF-SIMS).

In the inventive monolayer film, the anions are distributed in the monolayer film with differing concentrations from the inner surface on the substrate side to the outer surface in contact with outside air. The anions have different concentrations such that the anions have the largest population in the outer surface in contact with outside air. The reason why the anions have different concentrations in the film thickness direction is probably because the hydrophilic anions are self-assembled to the surface in contact with outside air during the course of the formation of the monolayer film. Because the highly hydrophilic groups in the form of anions are present in a high concentration in the outer surface of the monolayer film, the inventive monolayer film exhibits excellent properties in terms of antifogging properties, antifouling properties or self-cleaning properties, antistatic properties and anti-dust properties.

The anion concentration ratio (Sa/Da) is preferably not less than 1.2, and more preferably not less than 1.3. When the anion concentration ratio is equal to or greater than this value, the monolayer film tends to achieve further improvements in properties such as antifogging properties, antifouling properties or self-cleaning properties, antistatic properties and anti-dust properties. The anion concentration ratio (Sa/Da) is usually about 20.0 or less.

The water contact angle of the inventive monolayer film is usually not more than 30°, preferably not more than 20°, and more preferably not more than 10°. When the water contact angle is not more than the upper limit, the monolayer film exhibits high hydrophilicity and is an excellent hydrophilic material which does not repel water (which is wetted with water). Thus, the monolayer films are useful as, for example, antifogging materials, antifogging films (hereinafter, also antifogging coats), antifouling materials, antifouling films or self-cleaning coats, antistatic materials, quick-dry materials or quick-dry coats, and antistatic films or anti-dust coats.

When used as an antifogging coat as an example, the film allows water droplets to spread on the surface to form a water film, thus achieving excellent antifogging effects. When used as a self-cleaning coat, water can penetrate into between the dirt and the coating face to lift and remove the dirt, thus achieving excellent antifouling effects.

The inventive monolayer films having the anionic hydrophilic groups outperform conventional films having nonionic hydrophilic groups in terms of antistatic properties, and are therefore useful also as antistatic materials and as antistatic films or anti-dust coats.

The thickness of the monolayer film may be determined appropriately in accordance with the application, but is usually in the range of 0.1 to 100 μm, preferably 0.5 to 20 μm, and more preferably 1 to 10 μm.

The inventive monolayer films may be produced with various forms by, for example, designing the shapes of the substrates.

The inventive monolayer film may be used also as a stack in which the monolayer film is combined with a substrate. This stack according to the invention may be produced by forming the monolayer film on at least one surface of a substrate by any of the aforementioned methods.

In the stack, a pressure-sensitive adhesive layer may be disposed on the other surface of the substrate on which the monolayer film is not disposed.

Such a stack having a pressure-sensitive adhesive layer may be easily attached as, for example, an antifogging film or an antifouling film to surfaces such as glasses, bathroom mirrors or the like, surfaces of display devices such as displays and televisions, information boards such as signboards, advertisements and guideboards, indicators such as railroad indicators and traffic signs, exterior walls and interior walls of buildings, and window glasses.

The pressure-sensitive adhesive layer may be formed on the substrate by applying a pressure-sensitive adhesive to the surface of the substrate on which the monolayer film is not disposed, and removing the solvent as required. Any pressure-sensitive adhesives may be used without limitation. Examples of the pressure-sensitive adhesives include acrylic pressure-sensitive adhesives, rubber pressure-sensitive adhesives, vinyl ether polymer pressure-sensitive adhesives and silicone pressure-sensitive adhesives. The thickness of the pressure-sensitive adhesive layer is usually in the range of 2 to 50 μm, and preferably 5 to 30 μm.

A peel layer may be further disposed on the pressure-sensitive adhesive layer.

In the stack of the invention, a peelable cover layer may be further disposed on the surface of the monolayer film.

The inventive stacks may be produced with various forms by, for example, designing the shapes of the substrates. For example, the monolayer films and the stacks according to the invention may be used in such forms as films, sheets and tapes. Further, the inventive monolayer films may be used also as primer layers.

The monolayer films and the stacks of the invention exhibit excellent hydrophilicity and are useful as such materials as antifogging materials, antifouling materials and antistatic materials. For example, stacks in which the inventive monolayer films are laminated on substrates composed of transparent materials such as transparent resins and glasses may be used as stacks having excellent transparency, hydrophilicity, antifogging properties and antifouling properties as well as excellent antistatic properties, quick-dry properties and anti-condensation properties.

Thus, the monolayer films and the stacks according to the present invention may be used in applications including materials for transport machines, typically automobiles, ships and airplanes, such as bodies, wheels, exterior materials and interior materials; building materials and housing materials such as exterior wall materials, interior wall materials, floor materials, furniture materials, bathroom materials, lavatory materials, kitchen materials such as air fans, toilet materials and pipe materials; construction materials such as sound insulating boards located at places such as expressways; garment materials such as cloths, fabrics and fibers; optical materials such as window materials, mirrors, optical films, optical disks, eyeglasses, contact lenses, goggles, reflective films and reflectors; illuminating materials such as lamp materials and light materials; industrial materials such as cooling fins; electric and electronic materials such as electric appliance materials, wiring materials, materials for displays such as touch panels and flat panels, and photoresists; printing materials such as inkjet recording materials, and printing or typing primers; and commodity materials such as cosmetic containers.

EXAMPLES

Hereinbelow, the present invention will be described in further detail by presenting examples and other discussions. However, the scope of the invention is not limited to such examples.

In the invention, properties of films were evaluated as follows.

⟨Measurement of Water Contact Angle⟩

The water contact angle was measured with respect to 3 points for each sample by the use of water contact angle meter CA-V manufactured by Kyowa Interface Science Co., Ltd. The measured values were averaged to give a value of water contact angle.

⟨Measurement of Haze⟩

The haze was measured with respect to 4 points for each sample by the use of haze meter NDH2000 manufactured by NIPPON DENSHOKU INDUSTRIES CO., LTD. The measured values were averaged to give a haze value.

⟨Scratch Resistance Test⟩

The surface was scrubbed with steel wool #0000 ten times back and forth under the application of a prescribed constant load.

The scratch resistance was evaluated to be ○ when no scratches were produced, Δ when 1 to 5 streaks of scratches were produced, and x when 6 to countless streaks of scratches were produced.

⟨Evaluation of Antifogging Properties⟩

The antifogging properties were evaluated to be ○ when the surface did not become fogged with breath, and x when the surface became fogged with breath.

⟨Evaluation of Antifouling Properties⟩

The surface was marked with oil-based marker "Mackee Gokuboso (ultrafine)" (black, code: MO-120-MC-BK) manufactured by ZEBRA CO., LTD., and water droplets were dropped thereon, allowed to stand for 30 seconds, and wiped with tissue paper. The antifouling properties were evaluated to be ○ when the mark came off, and x when the mark did not come off and remained.

⟨Evaluation of Adhesion⟩

The adhesion was evaluated by a crosscut adhesion test.

⟨Measurement of Anion Concentration Ratio⟩

A sample was cut at a slant as illustrated in the view of sample preparation in FIG. 1. The anion concentration (Sa) in the outer surface and the anion concentration (Da) at the middle point were measured with a time-of-flight secondary ion mass spectrometer (TOF-SIMS). The obtained values were expressed as an anion concentration ratio (Sa/Da) of the anion concentration in the outer surface of the monolayer film in contact with outside air to the anion concentration at the middle point between the inner surface and the outer surface of the monolayer film.

Analyzer and Measurement Conditions

TOF-SIMS: TOF-SIMS$^5$ manufactured by ION TOF
Primary ions: $Bi_3^{2+}$ (accelerating voltage 25 kV)
Measurement area: 400 μm$^2$ In the measurement, a neutralizing gun for correcting electric charges was used.

Preparation and Analysis of Sample

As illustrated in FIG. 1, a sample in which a coating layer 20 was provided on a surface of a substrate 10 was cut at a slant accurately along a cutting direction 30. Thereafter, an approximately 10×10=$^2$ piece was cut out, and a mesh was placed on the measurement surface. The sample was then fixed to a sample holder, and the anion concentrations were measured with a time-of-flight secondary ion mass spectrometer (TOF-SIMS) with respect to a coating layer surface 40 in contact with outside air and an inside 50 of the coating layer which was within the monolayer film (at a point halving (½) the film thickness, an inner surface of the coating layer in contact with the substrate 10).

Evaluation

The evaluation was made according to the following equation. The ion concentrations at respective measurement points were based on relative intensities (relative to the total of detected ions).

Anion concentration ratio=anion concentration in coating layer surface 40/anion concentration at ½ film thickness of coating layer 20

Reference Examples 1 to 5

Preparation of Solution 1

A solution 1 including a homogeneous monomer composition with 80 wt % non-volatile content (NV) was prepared according to the formulation described in Table 1.

TABLE 1

| | Solution 1 | | | |
|---|---|---|---|---|
| Material name | Molecular weight | Amount (g) | Amount (mmol) | Concentration (wt %) |
| SPA-K | 232.3 | 3.00 | 12.91 | 2.3 |
| A-200 | 302.3 | 35.00 | 115.77 | 27.1 |
| A-GLY-9E | 650.7 | 10.00 | 15.37 | 7.8 |
| A-9530 | 524.5 | 55.00 | 104.86 | 42.6 |
| Methanol | | 25.80 | | 20.0 |
| S-EED | | 0.20 | 0.45 | 0.2 |
| | | 129.0 | 249.37 | 100.0 |

Non-volatile content (wt %) = 80

Monomer (I)/polyvalent monomer (II) molar ratio = 0.0547

Polyvalent monomer (II)/monomer (I) molar ratio = 18.3

[Chem. 85]

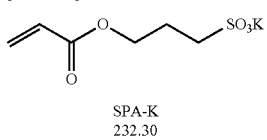

SPA-K
232.30

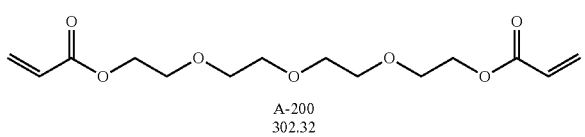 [SMILES: C=CC(=O)OCCOCCOCCOCCOC(=O)C=C]

A-200
302.32

TABLE 1-continued

| Solution 1 | | | | |
|---|---|---|---|---|
| Material name | Molecular weight | Amount (g) | Amount (mmol) | Concentration (wt %) |

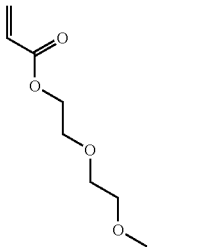

A-GLY-9E
650.71

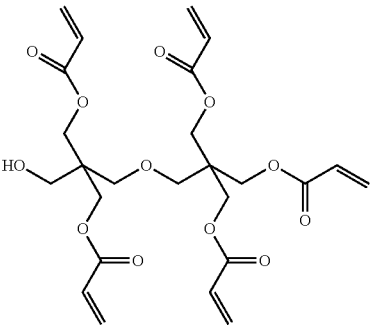

A-9530
MW = 523.51

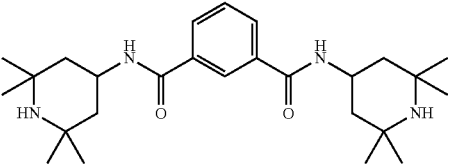

S-EED
442.64

Preparation of Monolayer Film Formation Mixture 1

7.8 g of methanol was added to 0.3 g of polymerization initiator IRGACURE 127 (2-hydroxy-1-{4-[4-(2-hydroxy-2-methyl-propionyl)-benzyl]phenyl}-2-methyl-propan-1-one). These were mixed with each other to give a solution. Further, 12.5 g of the solution 1 with a non-volatile content of 80 wt % was added thereto. These were mixed with each other to give a solution. Thus, a monolayer film formation mixture 1 with a non-volatile content of 50 wt % was obtained.

Formation of Monolayer Films

The monolayer film formation mixture 1 was applied to a polycarbonate plate as a substrate (manufactured by TAKIRON CO., LTD.) with a bar coater. In order to evaluate monolayer films with different film thicknesses in Reference Examples 1 to 5, the rod numbers of bar coaters used for the application in Reference Examples 1 to 5 were changed as follows.

Reference Example 1: #03 (monolayer film thickness: 2 μm as dry)

Reference Example 2: #05 (monolayer film thickness: 3 μm as dry)

Reference Example 3: #08 (monolayer film thickness: 5 μm as dry)

Reference Example 4: #12 (monolayer film thickness: 8 μm as dry)

Reference Example 5: #20 (monolayer film thickness: 14 μm as dry)

Immediately after the application, the wet films were dried with a hot air dryer at 45 to 50° C. for 2 minutes. After being dried, the films were passed through a UV conveyer (an electrodeless discharge lamp H bulb, Fusion UV Systems Japan K.K., conveyer speed 18 m/min) three times (accumulated dose 900 mJ/cm$^2$), thereby forming monolayer films having respective film thicknesses on the polycarbonate plates in Reference Examples 1 to 5. Lastly, the films were washed with running water in order to clean the outer surfaces of the monolayer films in contact with outside air, and the film surfaces were dried by air blowing. The obtained monolayer films were subjected to evaluations, the results being set forth in Table 2.

TABLE 2

Results of tests with monomer (I)/polyvalent monomer (II) molar ratio = 1/18

| No. | Film thickness | Appearance | Water contact angle (°) | Haze (%) | *Scratch resistance | | | Adhesion |
| --- | --- | --- | --- | --- | --- | --- | --- | --- |
| | | | | | 1 kg | 3 kg | 6 kg | |
| Ref. Ex. 1 | 2 μm | Transparent | 4.6 | 0.6 | x | x | x | 100/100 |
| Ref. Ex. 2 | 3 μm | Transparent | 4.9 | 0.6 | o | x | x | 100/100 |
| Ref. Ex. 3 | 5 μm | Transparent | 4.3 | 0.6 | o | o | x | 100/100 |
| Ref. Ex. 4 | 8 μm | Transparent | 4.3 | 1.0 | o | o | Δ | 100/100 |
| Ref. Ex. 5 | 14 μm | Slightly whitened | 5.2 | 2.0 | o | o | o | 100/100 |

*Steel wool #0000 × 10 times back and forth, o No scratches, Δ 5 or less scratches, x 6 or more scratches It has been illustrated that when the monomer (I)/polyvalent monomer (II) molar ratio is outside the range specified in the invention, increasing the film thickness to obtain higher scratch resistance tends to be accompanied by an increase in haze and a decrease in transparency.

Example 1

Preparation of Solution 2

A solution 2 which included a homogeneous monomer composition with 80 wt % non-volatile content containing no hydrophilic monomer SPA-K was prepared according to the formulation described in Table 3.

TABLE 3

Solution 2

| Material name | Molecular weight | Amount (g) | Amount (mmol) | Concentration (wt %) |
| --- | --- | --- | --- | --- |
| SPA-K | 232.3 | 0.00 | 0.00 | 0.0 |
| A-200 | 302.3 | 35.00 | 115.77 | 27.9 |
| A-GLY-9E | 650.7 | 10.00 | 15.37 | 8.0 |
| A-9530 | 524.5 | 55.00 | 104.86 | 43.9 |
| Methanol | | 25.05 | | 20.0 |
| S-EED | | 0.20 | 0.45 | 0.2 |
| | | 125.3 | 236.45 | 100.0 |

Non-volatile content (wt %) = 80
Monomer (I)/polyvalent monomer (II) molar ratio = 0.0000
Polyvalent monomer (II)/monomer (I) molar ratio = —

Preparation of Monolayer Film Formation Mixture 2

6.2 g of methanol was added to 0.24 g of polymerization initiator IRGACURE 127 (2-hydroxy-1-{4-[4-(2-hydroxy-2-methyl-propionyl)-benzyl]phenyl}-2-methyl-propan-1-one). These were mixed with each other to give a solution. Further, 5.9 g of the solution 1 with a non-volatile content of 80 wt % and 4.1 g of the solution 2 with a non-volatile content of 80 wt % were added thereto. These were mixed together to give a solution. Thus, a monolayer film formation mixture 2 with a non-volatile content of 50 wt % was obtained.

Formation of Monolayer Films

The monolayer film formation mixture 2 was applied to a polycarbonate plate as a substrate (manufactured by TAKIRON CO., LTD.) with a bar coater #12. Immediately after the application, the wet films were dried with a hot air dryer at 45 to 50° C. for 2 minutes. After being dried, the films were passed through a UV conveyer (an electrodeless discharge lamp H bulb, Fusion UV Systems Japan K.K., conveyer speed 18 m/min) three times (accumulated dose 900 mJ/cm$^2$), thereby forming monolayer films having a film thickness of about 8 μm on the polycarbonate plates. Lastly, the films were washed with running water in order to clean the outer surfaces of the monolayer films in contact with outside air, and the film surfaces were dried by air blowing. The obtained monolayer films were subjected to evaluations, the results being set forth in Table 4.

Examples 2 and 3

Monolayer films were prepared and evaluated in the same manner as in Example 1, except that the mixing ratio of the solution 1 and the solution 2 was changed as described in Table 4. The results are described in Table 4.

TABLE 4

Results of evaluations in Examples 1 to 3 (film thickness 8 μm)

| No. | Solution 1 (g) | Solution 2 (g) | **Molar ratio | Appearance | Water contact angle (°) | Haze (%) | *Scratch resistance 6 kg | Adhesion |
| --- | --- | --- | --- | --- | --- | --- | --- | --- |
| Ref. Ex. 4 | 10.0 | 0.0 | 1/18 | Transparent | 4.3 | 1.0 | Δ | 100/100 |
| Ex. 1 | 5.9 | 4.1 | 1/31 | Transparent | 4.3 | 0.5 | o | 100/100 |
| Ex. 2 | 4.0 | 6.0 | 1/46 | Transparent | 3.7 | 0.3 | o | 100/100 |
| Ex. 3 | 3.0 | 7.0 | 1/61 | Transparent | 4.4 | 0.2 | o | 100/100 |

*Steel wool #0000 × 6 kg load × 10 times back and forth, o No scratches, Δ 5 or less scratches, x 6 or more scratches
**Monomer (I)/polyvalent monomer (II) molar ratio Examples 4 to 6

Monolayer films were prepared and evaluated in the same manner as in Example 1, except that the mixing ratio of the solution 1 and the solution 2 was changed as described in Table 5 and that the rod number of the bar coater was changed from #12 to #20 (monolayer film thickness: 14 μl as dry). The results are described in Table 5.

TABLE 5

Results of evaluations in Examples 4 to 6 (film thickness 14 μm)

| No. | Solution 1 (g) | Solution 2 (g) | **Molar ratio | Appearance | Water contact angle (°) | Haze (%) | *Scratch resistance 6 kg | Adhesion |
|---|---|---|---|---|---|---|---|---|
| Ref. Ex. 5 | 10.0 | 0.0 | 1/18 | Slightly whitened | 5.2 | 2.0 | ○ | 100/100 |
| Ex. 4 | 5.9 | 4.1 | 1/31 | Transparent | 4.5 | 0.6 | ○ | 100/100 |
| Ex. 5 | 4.0 | 6.0 | 1/46 | Transparent | 3.9 | 0.4 | ○ | 100/100 |
| Ex. 6 | 3.0 | 7.0 | 1/61 | Transparent | 4.4 | 0.2 | ○ | 100/100 |

*Steel wool #0000 × 6 kg load × 10 times back and forth, ○ No scratches, Δ 5 or less scratches, × 6 or more scratches
**Monomer (I)/polyvalent monomer (II) molar ratio It has been demonstrated that transparency and scratch resistance are improved by controlling the monomer (I)/polyvalent monomer (II) ratio to be in the inventive range.

Reference Examples 6 to 9

Preparation of Solution 3

A solution 3 including a homogeneous monomer composition with 50 wt % non-volatile content was prepared according to the formulation described in Table 6.

TABLE 6

Solution 3

| Material name | Molecular weight | Amount (g) | Amount (mmol) | Concentration (wt %) |
|---|---|---|---|---|
| SPA-K | 232.3 | 2.50 | 10.76 | 1.5 |
| PE-3A | 298.3 | 80.00 | 268.20 | 48.4 |
| Methoxyethanol | | 82.70 | | 50.0 |
| S-EED | | 0.20 | | 0.1 |
| | | 165.4 | 279.41 | 100.0 |

Non-volatile content (wt %) = 50
Monomer (I)/polyvalent monomer (II) molar ratio = 0.0401
Polyvalent monomer (II)/monomer (I) molar ratio = 24.9
[Chem. 86]

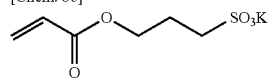

SPA-K
232.30

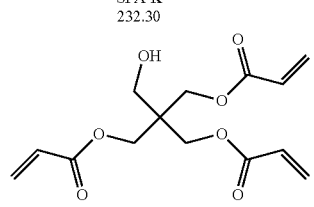

PE-3A
298.29

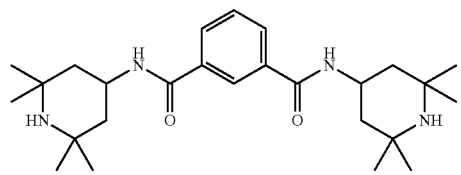

S-EED
442.64

Preparation of Polymerization Initiator Solution 3

50 g of IRGACURE 127 (2-hydroxy-1-{4-[4-(2-hydroxy-2-methyl-propionyl)-benzyl]phenyl}-2-methyl-propan-1-one) and 50 g of methanol were mixed with each other to give a solution. Thus, a polymerization initiator solution 3 with a non-volatile content of 50 wt % was obtained.

Preparation of Monolayer Film Formation Mixture 3

10.0 g of the solution 3 and 0.3 g of the polymerization initiator solution 3 were mixed with each other to give a monolayer film formation mixture 3 with a non-volatile content of 50 wt %.

Formation of Monolayer Films

The monolayer film formation mixture 3 was applied to a polycarbonate plate as a substrate (manufactured by TAKIRON CO., LTD.) with a bar coater. In order to evaluate monolayer films with different film thicknesses in Reference Examples 6 to 9, the rod numbers of bar coaters used for the application in Reference Examples 6 to 9 were changed as follows. After the application, the wet films were treated to give monolayer films and the monolayer films were evaluated in the same manner as in Reference Examples 1 to 5. The results are described in Table 7.

Reference Example 6: #02 (monolayer film thickness: 1 μm as dry)

Reference Example 7: #03 (monolayer film thickness: 2 μm as dry)

Reference Example 8: #05 (monolayer film thickness: 3 μm as dry)

Reference Example 9: #08 (monolayer film thickness: 5 μm as dry)

TABLE 7

Results of tests with monomer (I)/polyvalent monomer (II) molar ratio = 1/25

| No. | Film thickness | *Appearance | *Water contact angle (°) | *Haze (%) |
|---|---|---|---|---|
| Ref. Ex. 6 | 1 μm | Transparent | 8.1 | 0.9 |
| Ref. Ex. 7 | 2 μm | Slightly whitened | 6.2 | 2.0 |
| Ref. Ex. 8 | 3 μm | Whitened | 7.6 | 12.3 |
| Ref. Ex. 9 | 5 μm | Whitened | 9.7 | 25.3 |

*Evaluated after washing under running water

Similarly to Reference Examples 1 to 5, it has been illustrated that when the monomer (I)/polyvalent monomer (II) ratio is outside the range specified in the invention, increasing the film thickness tends to be accompanied by an increase in haze and a decrease in transparency.

Example 7

Preparation of Solution 4

A solution 4 which included a homogeneous monomer composition with 50 wt % non-volatile content containing no hydrophilic monomer SPA-K was prepared according to the formulation described in Table 8.

TABLE 8

| Solution 4 | | | | |
|---|---|---|---|---|
| Material name | Molecular weight | Amount (g) | Amount (mmol) | Concentration (wt %) |
| SPA-K | 232.3 | 0.00 | 0.00 | 0.0 |
| PE-3A | 298.3 | 80.00 | 268.20 | 49.9 |
| Methoxyethanol | | 80.20 | | 50.0 |
| S-EED | | 0.20 | 0.45 | 0.1 |
| | | 160.4 | 268.65 | 100.0 |

Non-volatile content (wt %) = 50
Monomer (I)/polyvalent monomer (II) molar ratio = 0.0000
Polyvalent monomer (II)/monomer (I) molar ratio = —

Preparation of Monolayer Film Formation Mixture 4

5.0 g of the solution 3, 5.0 g of the solution 4 and 0.3 g of the polymerization initiator solution 3 were mixed together to give a solution. Thus, a monolayer film formation mixture 4 with 50 wt % non-volatile content was obtained.

Formation of Monolayer Films

The monolayer film formation mixture 4 was applied to a polycarbonate plate as a substrate (manufactured by TAKIRON CO., LTD.) with a bar coater #05. Immediately after the application, the wet films were dried with a hot air dryer at 45 to 50° C. for 2 minutes. After being dried, the films were passed through a UV conveyer (an electrodeless discharge lamp H bulb, Fusion UV Systems Japan K.K., conveyer speed 18 m/min) three times (accumulated dose 900 mJ/cm$^2$), thereby forming monolayer films having a film thickness of about 3 μm on the polycarbonate plates. Lastly, the films were washed with running water in order to clean the outer surfaces of the monolayer films in contact with outside air, and the film surfaces were dried by air blowing. The obtained monolayer films were subjected to evaluations, the results being set forth in Table 9.

Examples 8 to 10

Monolayer films were prepared and evaluated (monolayer film thickness: 3 μm as dry) in the same manner as in Example 7, except that the mixing ratio of the solution 3 and the solution 4 was changed as described in Table 9.

The results are described in Table 9.

TABLE 9

| | | | | | Water contact angle | Haze |
|---|---|---|---|---|---|---|
| | Solution 3 | Solution 4 | | | | |
| No. | (g) | (g) | *Molar ratio | Appearance | (°) | (%) |
| Ref. Ex. 8 | 10.0 | 0.0 | 1/25 | Whitened | 7.6 | 12.3 |
| Ex. 7 | 5.0 | 5.0 | 1/50 | Transparent | 5.5 | 0.7 |
| Ex. 8 | 2.5 | 7.5 | 1/100 | Transparent | 4.8 | 0.3 |
| Ex. 9 | 1.7 | 8.3 | 1/147 | Transparent | 3.8 | 0.4 |
| Ex. 10 | 1.3 | 8.7 | 1/192 | Transparent | 5.2 | 0.2 |

*Monomer (I)/polyvalent monomer (II) molar ratio

Transparency was markedly improved by controlling the monomer (I)/polyvalent monomer (II) ratio to be in the inventive range.

With respect to the monolayer films obtained in Example 4 and Example 10, the relative ion intensity ratios (distributions of anion concentrations) in cut sections of the films were analyzed with TOF-SIMS. The results are described in Table 10.

TABLE 10

| Gradient (based on relative ion intensities) | | |
|---|---|---|
| | Ex. 4 | Ex. 10 |
| | Molar | Molar |
| Test items | ratio** = 1/31 | ratio** = 1/192 |
| Appearance | Transparent | Transparent |
| Water contact angle (°) | 4.5 | 5.2 |
| Haze (%) | 0.6 | 0.2 |
| Crosscut adhesion test | 100/100 | 100/100 |
| Antifogging properties (breath) | ○ | ○ |
| Antifouling properties (oil-based marker) | ○ | ○ |
| Sulfonic groups | | |
| Intensity of sulfonic groups on outer surface of film, Sa* | 3.9E+00 | 2.6E+00 |
| Intensity of sulfonic groups at middle point in film, Da* | 1.0E+00 | 5.8E−01 |
| Intensity* of sulfonic groups on inner surface of film | 7.8E−01 | 5.2E−01 |
| Gradient (Sa/Da) | 3.9 | 4.5 |

*Relative intensities of SO$_3^-$ (m/z = 80) (relative to total ions)
**Monomer (I)/polyvalent monomer (II) molar ratio Example 11

Preparation of Solution 5

A solution 5 including a homogeneous monomer composition with 80 wt % non-volatile content was prepared according to the formulation described in Table 11.

TABLE 11

| | | Solution 5 | | | |
|---|---|---|---|---|---|
| Material name | Molecular weight | Amount (g) | Amount (mmol) | Concentration (wt %) | Remarks |
| SPA-K | 232.3 | 2.0 | 8.6 | 0.7 | Monomer (I) |
| P-2M | 322.3 | 0.5 | 1.6 | 0.2 | Monomer (I) |
| A-GLY-9E | 650.7 | 40.0 | 61.5 | 13.2 | Polyvalent monomer (II) |
| A9300-1CL | 537.2 | 5.0 | 9.3 | 1.6 | Polyvalent monomer (II) |
| U-15HA | 2078.1 | 55.0 | 26.5 | 18.1 | Polyvalent monomer (II) |
| M-402 | 578.6 | 140.0 | 242.0 | 46.2 | Polyvalent monomer (II) |
| S-EED | | 0.1 | | 0.0 | Stabilizer |
| Methanol | | 60.7 | | 20.0 | Solvent |
| | | 303.3 | | 100.0 | |

Non-volatile content (wt %) = 80.0

Monomer (I)/polyvalent monomer (II) molar ratio = 0.030

Polyvalent monomer (II)/monomer (I) molar ratio = 33

[Chem. 87]

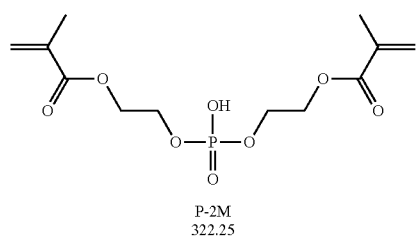 [SMILES: C=C(C)C(=O)OCCOP(=O)(O)OCCOC(=O)C(=C)C]

P-2M
322.25

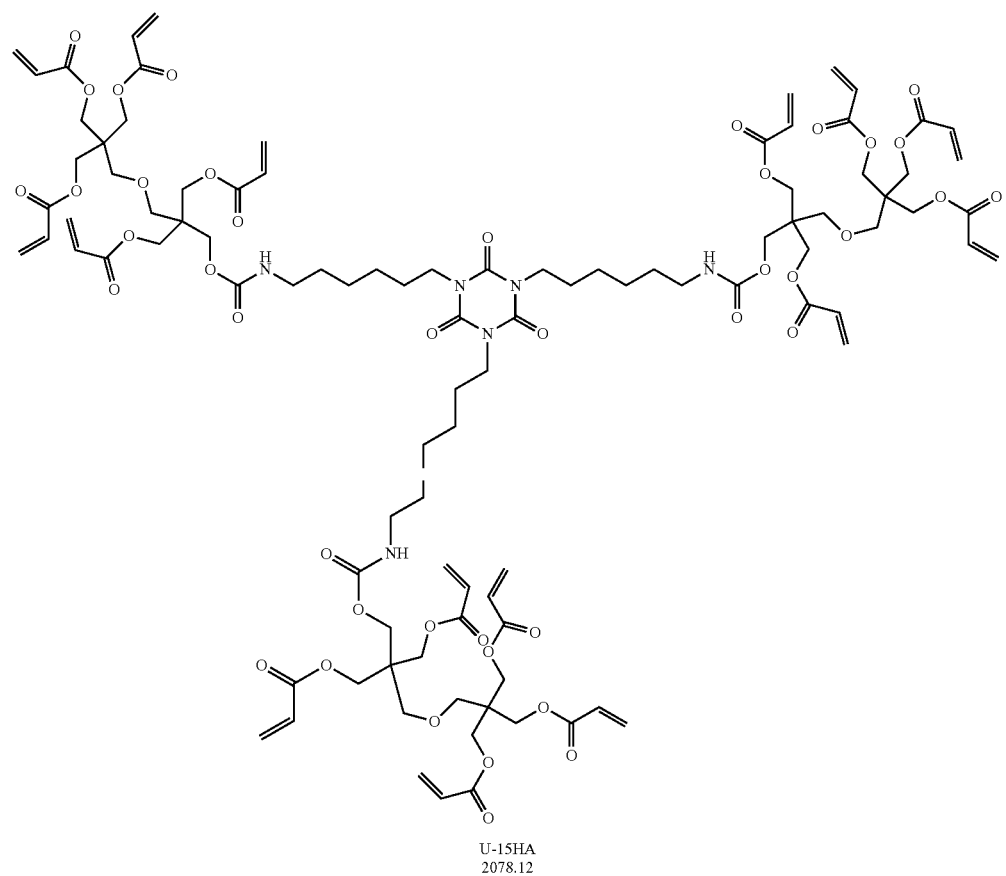 [SMILES: C=CC(=O)OCC(COCC(COC(=O)C=C)(COC(=O)C=C)COC(=O)NCCCCCCn1c(=O)n(CCCCCCNC(=O)OCC(COCC(COC(=O)C=C)(COC(=O)C=C)COC(=O)C=C)(COC(=O)C=C)COC(=O)C=C)c(=O)n(CCCCCCNC(=O)OCC(COCC(COC(=O)C=C)(COC(=O)C=C)COC(=O)C=C)(COC(=O)C=C)COC(=O)C=C)c1=O)(COC(=O)C=C)COC(=O)C=C]

U-15HA
2078.12

TABLE 11-continued

| | | | Solution 5 | | | |
|---|---|---|---|---|---|---|
| Material name | Molecular weight | Amount (g) | Amount (mmol) | Concentration (wt %) | | Remarks |

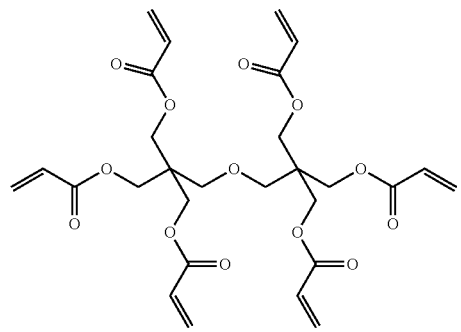

M-402
578.56

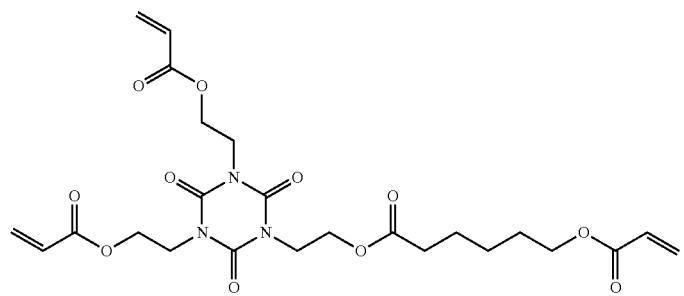

A-9300-1CL
537.20

Preparation of Monolayer Film Formation Mixture 5

0.3 g of methanol was added to 0.3 g of polymerization initiator IRGACURE 127. These were mixed with each other to give a solution. Next, 12.5 g of the solution 5 with a non-volatile content of 80 wt % was added, and further 6.0 g of a diluent solvent described in Table 12 was added. These were mixed together to give a monolayer film formation mixture 5 with a non-volatile content of 52 wt %.

Formation of Monolayer Films

The monolayer film formation mixture 5 was applied to a polycarbonate plate as a substrate with a bar coater #18. Immediately after the application, the wet films were dried with a hot air dryer at 45 to 55° C. for 2 minutes. After being dried, the films were passed through a UV conveyer (an electrodeless discharge lamp H bulb, Fusion UV Systems Japan K. K., conveyer speed 18 m/min) one time (accumulated dose 300 mJ/cm$^2$), thereby forming monolayer films having a film thickness of about 13 μm on the polycarbonate plates. Lastly, the films were washed with running water in order to clean the outer surfaces of the monolayer films in contact with outside air, and the film surfaces were dried by air blowing. The obtained monolayer films were subjected to evaluations, the results being set forth in Table 12.

TABLE 12

Results of Example 11

| | | Diluent solvents | | | | | | |
|---|---|---|---|---|---|---|---|---|
| | | Butyl acetate | Toluene | Isopentanol (3-methyl-1-butanol) | 2-Methoxy propanol | 1-Butanol | 2-Methoxy ethanol | Acetonitrile | Methanol |
| *Solubility parameter σ cal/cm$^3$) | | 8.4 | 9.0 | 9.3 | 9.6 | 9.9 | 10.8 | 12.0 | 13.1 |
| Appearance | | Slightly whitened | Whitened | Transp. | Transp. | Transp. | Transp. | Transp. | Transp. |
| Water contact angle (°) | | 53 | 35 | 5 | 4 | 6 | 3 | 5 | 4 |
| Haze (%) | | 1.8 | 29.9 | 0.2 | 0.2 | 0.3 | 0.1 | 0.4 | 0.4 |
| **Scratch resistance | 1 kg | ○ | x | ○ | ○ | ○ | ○ | ○ | ○ |
| | 3 kg | Δ | x | ○ | ○ | ○ | ○ | ○ | ○ |
| | 6 kg | x | x | Δ | Δ | Δ | Δ | ○ | ○ |

TABLE 12-continued

Results of Example 11

| | Diluent solvents | | | | | | | |
|---|---|---|---|---|---|---|---|---|
| | Butyl acetate | Toluene | Isopentanol (3-methyl-1-butanol) | 2-Methoxy propanol | 1-Butanol | 2-Methoxy ethanol | Acetonitrile | Methanol |
| Resistance to fogging by breath | x | x | ○ | ○ | ○ | ○ | ○ | ○ |
| ***Resistance to fouling by oil-based marker | x | x | ○ | ○ | ○ | ○ | ○ | ○ |
| Surface tackiness | None | None | None | None | None | None | None | None |

*Calculated values
**Steel wool scratch test: The coating surface was abraded with steel wool #0000 under the indicated load 10 times back and forth. ○ No scratches, Δ 1 to 5 scratches, x 6 or more scratches
***ZEBRA Mackee marker (black): Marking → dropping water droplets → wiping with Kim towel after 1 minute. ○ Marks came off. x Marks remained.

Example 12

Preparation of Monolayer Film Formation Mixture 6

0.9 g of methoxyethanol was added to 0.6 g of polymerization initiator IRGACURE 127. These were mixed with each other to give a solution. Next, 25.0 g of the solution 5 with a non-volatile content of 80 wt % was added, and further 5.0 g and 10.0 g of methanol and methoxyethanol, respectively, as diluent solvents were added. These were mixed together to give a solution. Thus, a monolayer film formation mixture 6 with a non-volatile content of 50 wt % was obtained.

Formation of Monolayer Films

The monolayer film formation mixture 6 was applied to a polycarbonate plate as a substrate with a bar coater #20. Immediately after the application, the wet films were dried with a hot air dryer at 43 to 47° C. while changing the wind speed for a duration of time described in Table 13. Here, drying at a wind speed of 0 m/sec (no wind applied) was performed with an IR (infrared) dryer. After being dried, the films were passed through a UV conveyer (an electrodeless discharge lamp H bulb, Fusion UV Systems Japan K.K., conveyer speed 18 m/min) one time (accumulated dose 300 mJ/cm$^2$), thereby forming monolayer films having a film thickness of about 13 μm on the polycarbonate plates. Lastly, the films were washed with running water in order to clean the outer surfaces of the monolayer films in contact with outside air, and the film surfaces were dried by air blowing. The obtained monolayer films were subjected to evaluations, the results being set forth in Table 13.

REFERENCE SIGNS LIST

10: SUBSTRATE, 20: COATING LAYER, 30: CUTTING DIRECTION, 40: COATING LAYER SURFACE, 50: INSIDE OF COATING LAYER

The invention claimed is:

1. A monolayer film disposed on a substrate, obtained by preparing a mixture including a monomer composition and a solvent, the monomer composition including a monomer (I) represented by General Formula (1) below and a polyvalent monomer (II) having two or more (meth)acryloyl groups and being free of sulfonic group, carboxyl group and phosphoric group in a monomer (I)/polyvalent monomer (II) molar ratio of 1/1000 to less than 1/30, the solvent including a compound with a solubility parameter σ of not less than 9.3 (cal/cm$^3$)$^{1/2}$;

applying the mixture onto the substrate and removing at least part of the solvent; and polymerizing the monomer composition including the monomer (I) and the monomer (II);

the monolayer film having at least one anionic hydrophilic group selected from a sulfonic group, a carboxyl group and a phosphoric group, the anion concentration ratio (Sa/Da) of the anion concentration (Sa) at the outer surface to the anion concentration (Da) at the middle point between the inner surface in contact with the substrate and the outer surface being not less than 1.1;

$$[X]_s[M1]_l[M2]_m \quad (1)$$

(in Formula (1), s indicates 1 or 2; l and m indicate integers satisfying s=l+2m; M1 is at least one monovalent cation selected from hydrogen ion, ammonium ions and alkali metal ions; M2 is at least one divalent cation selected from alkaline earth metal ions; and X is at least one

TABLE 13

Results of Example 12

| Drying conditions | | | | Water contact angle | Haze | *Scratch resistance | | | |
|---|---|---|---|---|---|---|---|---|---|
| Wind speed | Temperature | Time | | | | | | | |
| m/sec | ° C. | min | Appearance | (°) | (%) | 1 kg | 3 kg | 6 kg | Remarks |
| 3.3 | 43-47 | 2 | Transparent | 4.0 | 0.3 | ○ | ○ | Δ | |
| 2.8 | 43-47 | 2 | Transparent | 3.6 | 0.2 | ○ | ○ | Δ | |
| 1.9 | 43-47 | 2 | Transparent | 4.0 | 0.3 | ○ | ○ | Δ | |
| 0.9 | 43-47 | 2 | Transparent | 5.4 | 0.3 | ○ | ○ | Δ | |
| 0.0 | 43-47 | 2 | Transparent | 4.2 | 0.2 | ○ | ○ | Δ | Cracks |

*Steel wool #0000 × 10 times back and forth. ○ No scratches, Δ 1 to 5 scratches, x 6 or more scratches monovalent anion selected from groups represented by General Formulae (1-1) to (1-4) below:

[Chem. 1]

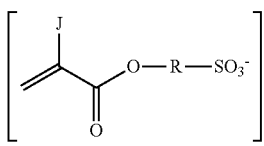
(1-1)

[Chem. 2]

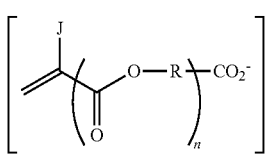
(1-2)

[Chem. 3]

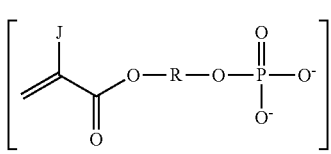
(1-3)

[Chem. 4]

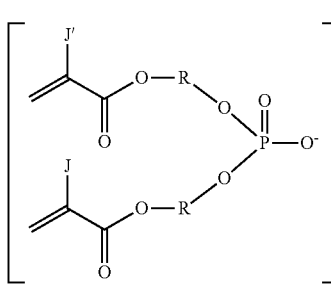
(1-4)

(in Formulae (1-1) to (1-4), J and J' are each independently H or $CH_3$; n indicates 0 or 1; and Rs are each independently an aliphatic hydrocarbon group of 1 to 600 carbon atoms optionally substituted at a carbon atom with at least one group selected from aromatic groups, aliphatic cyclic groups, ether groups and ester groups)).

2. The monolayer film according to claim 1, wherein the monomer (I) is at least one monomer selected from compounds represented by General Formula (1-1-1) and General Formula (1-1-2) below:

[Chem. 5]

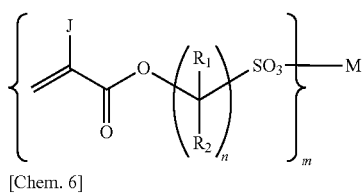
(1-1-1)

[Chem. 6]

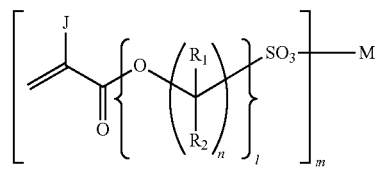
(1-1-2)

(in Formulae (1-1-1) and (1-1-2), J is H or $CH_3$; $R_1$ and $R_2$ are each independently H, $CH_3$ or $C_2H_5$; n indicates an integer of 1 to 20; l indicates an integer of 2 to 10; M is at least one monovalent cation selected from hydrogen ion, ammonium ions and alkali metal ions, or is at least one divalent cation selected from alkaline earth metal ions; and m is 1 when M is a monovalent cation, and m is 2 when M is a divalent cation).

3. The monolayer film according to claim 1, wherein the polyvalent monomer (II) is at least one monomer selected from compounds represented by General Formula (2-1) and General Formula (2-2) below:

[Chem. 7]

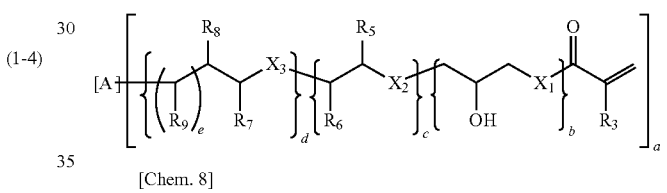
(2-1)

[Chem. 8]

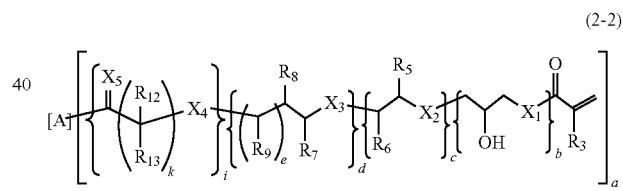
(2-2)

(in Formulae (2-1) and (2-2), $R_3$ and $R_5$ to $R_9$ are each independently H or $CH_3$; $R_{12}$ and $R_{13}$ are each independently H or $CH_3$;

$X_1$, $X_2$, $X_3$, $X_4$ and $X_5$ are each independently O or S;

the letter a indicates an integer of 2 to 30; b indicates an integer of 0 to 2; c indicates an integer of 0 to 30; d indicates an integer of 0 to 20; e indicates an integer of 0 to 2; i indicates an integer of 1 to 20; k indicates an integer of 1 to 10; and the letter A indicates an atom or group selected from:

[Chem. 9]

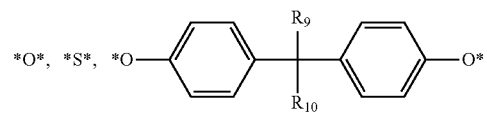

-continued
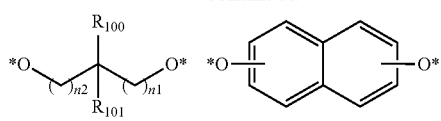
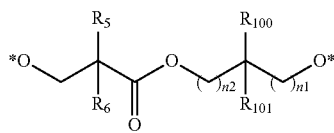
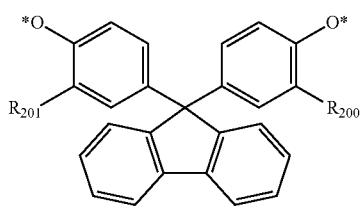
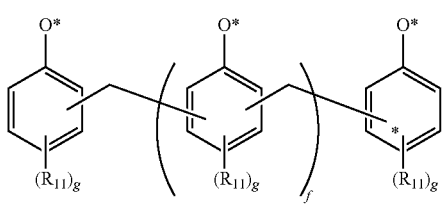
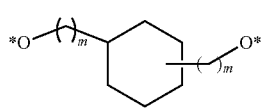
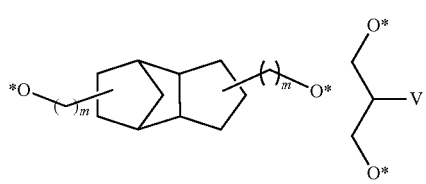
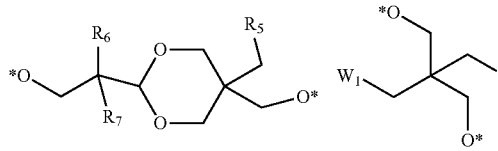
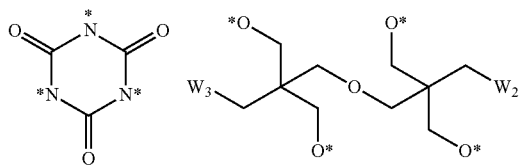
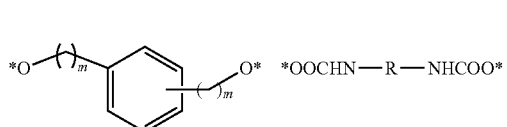
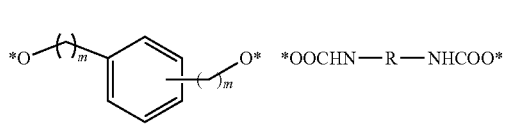
or from:
[Chem. 10]
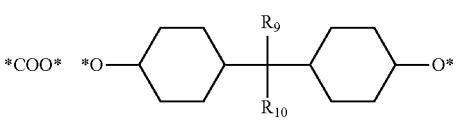
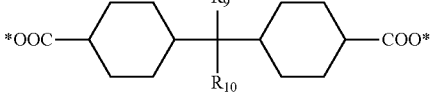
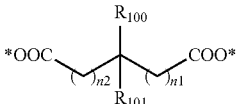
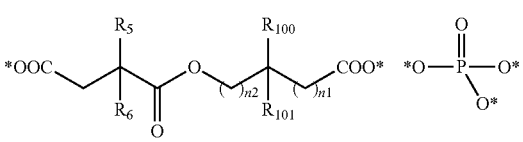
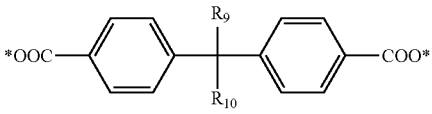
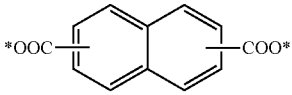
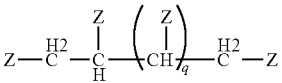
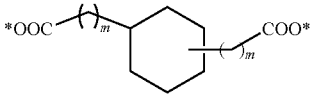
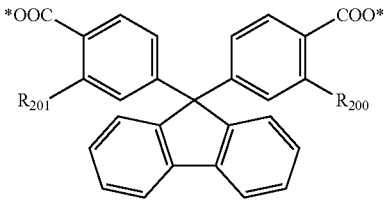

-continued

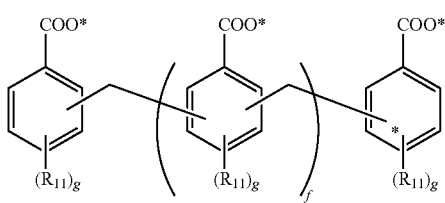

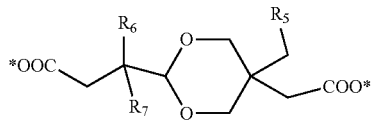

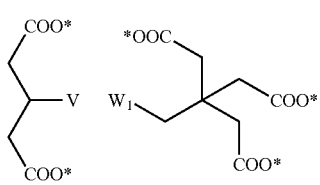

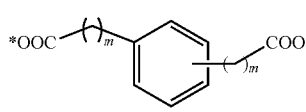

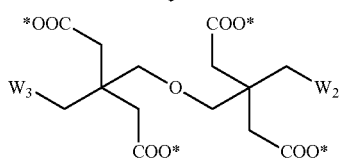

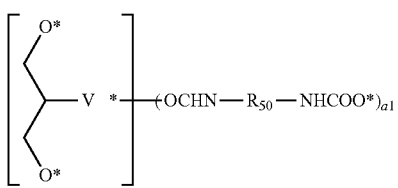

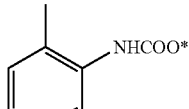

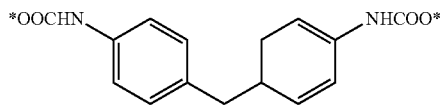

-continued

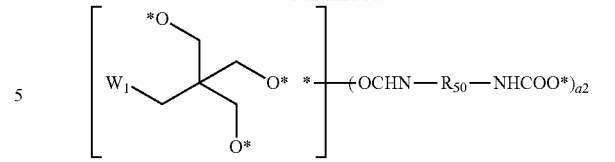

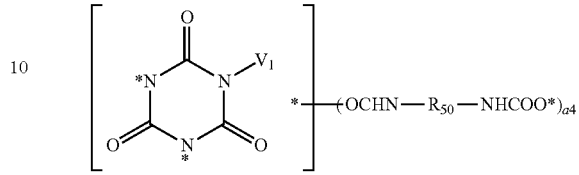

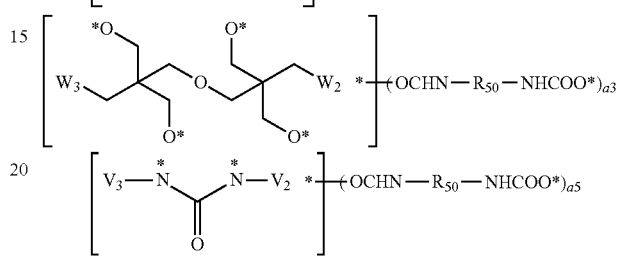

wherein * indicates a bonding hand;
$R_{10}$ and $R_{11}$ are each independently H or $CH_3$; $R_{100}$ and $R_{101}$ are each independently H or an alkyl group of 1 to 6 carbon atoms; $R_{200}$ and $R_{201}$ are each independently H, $CH_3$ or a phenyl group; R is hexamethylene, isophorone (1-methylene-3-ethylene-3-methyl-5,5-dimethyl-cyclohexane), norbomanedimethylene, dicyclohexylenemethane, cyclohexanedimethylene or xylylene; $R_{50}$ is hexamethylene, isophorone (1-methylene-3-ethylene-3-methyl-5,5-dimethyl-cyclohexane), norbomanedimethylene, dicyclohexylenemethane, cyclohexanedimethylene, toluylene, diphenylmethane or xylylene; V is OH or an oxygen atom having a bonding hand (*); W1 to W3 are each independently H, $CH_3$, OH or an oxygen atom having a bonding hand (*); Z is OH, an oxygen atom having a bonding hand (*), COOH or a carboxyl group having a bonding hand (*) (COO); V1 to V3 are each independently H or a bonding hand (*);
n1 and n2 each independently indicate an integer of 0 to 8; of and o2 each independently indicate an integer of 1 to 3; f indicates an integer of 1 to 20; g indicates an integer of 0 to 3; m indicates 0 or 1; q indicates an integer of 1 to 7; a1 indicates an integer of 2 to 3; a2 indicates an integer of 3 to 4; a3 indicates an integer of 4 to 6; a4 indicates an integer of 2 to 3; and a5 indicates an integer of 2 to 4).

4. The monolayer film according to claim 1, wherein the polyvalent monomer (II) is at least one monomer selected from compounds represented by General Formulae (3) to (8) and (10) to (33) below:

[Chem. 11]

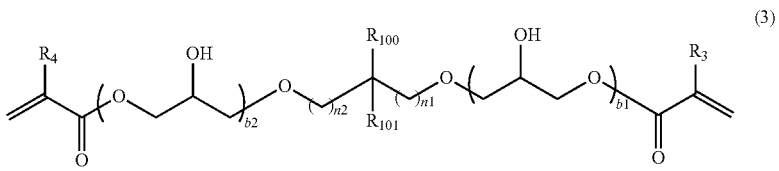

(3)

(in Formula (3), $R_3$ and $R_4$ are each independently H or $CH_3$; $R_{100}$ and $R_{101}$ are each independently H or an alkyl group of 1 to 6 carbon atoms; b1 and b2 each independently indicate an integer of 0 to 2; and n1 and n2 each independently indicate an integer of 0 to 8)

[Chem. 12]

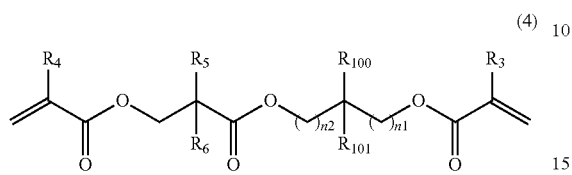

(4)

(in Formula (4), $R_3$ to $R_6$ are each independently H or $CH_3$; $R_{100}$ and $R_{101}$ are each independently H or an alkyl group of 1 to 6 carbon atoms; and n1 and n2 each independently indicate an integer of 0 to 8)

[Chem. 13]

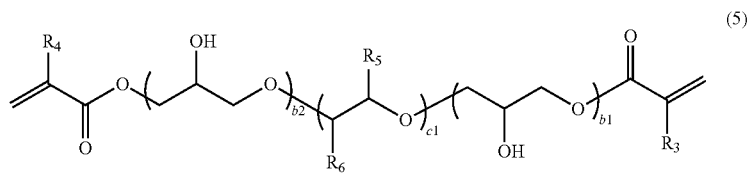

(5)

(in Formula (5), $R_3$ to $R_6$ are each independently H or $CH_3$; b1 and b2 each independently indicate an integer of 0 to 2; and c1 indicates an integer of 2 to 30)

[Chem. 14]

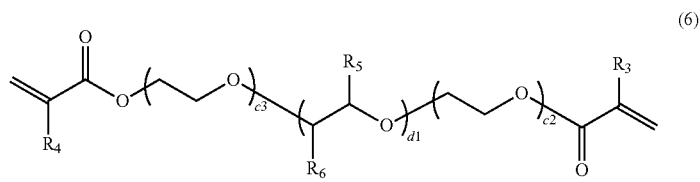

(6)

(in Formula (6), $R_3$ to $R_6$ are each independently H or $CH_3$; c2 and c3 each independently indicate an integer of 1 to 5; and d1 indicates an integer of 2 to 20)

[Chem. 15]

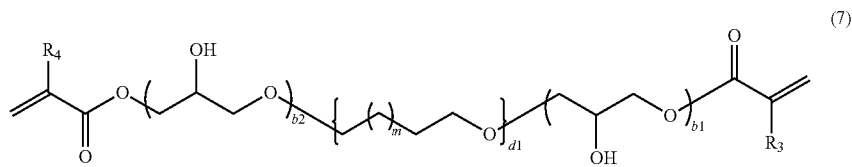

(7)

(in Formula (7), $R_3$ and $R_4$ are each independently H or $CH_3$; b1 and b2 each independently indicate an integer of 0 to 2; d1 indicates an integer of 2 to 20; and m indicates 0 or 1)

[Chem. 16]

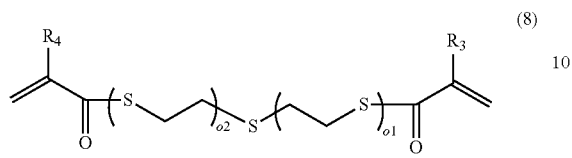
(8)

(in Formula (8), $R_3$ and $R_4$ are each independently H or $CH_3$; and o1 and o2 each independently indicate an integer of 1 to 3)

[Chem. 17]

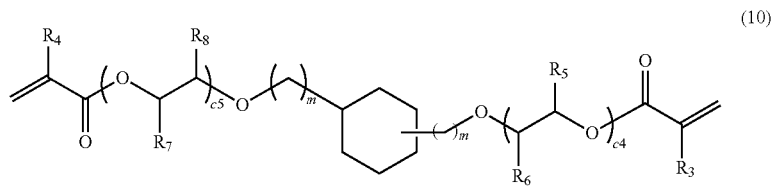
(10)

(in Formula (10), $R_3$ to $R_8$ are each independently H or $CH_3$; c4 and c5 each independently indicate an integer of 0 to 5; and m indicates 0 or 1)

[Chem. 18]

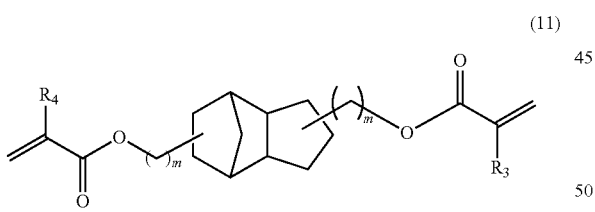
(11)

(in Formula (11), $R_3$ and $R_4$ are each independently H or $CH_3$; and m indicates 0 or 1)

[Chem. 19]

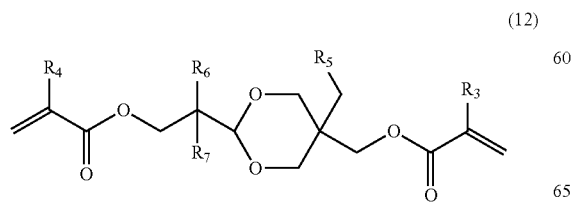
(12)

(in Formula (12), $R_3$ to $R_7$ are each independently H or $CH_3$)

[Chem. 20]

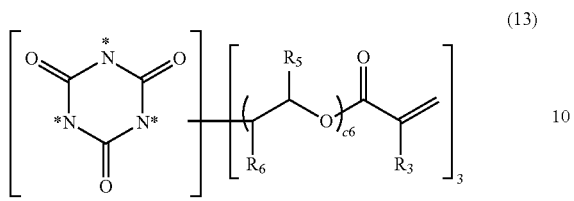

(13)

(in Formula (13), * represents a bonding hand; R3, R5 and R6 are each independently H or $CH_3$; and c6 indicates an integer of 0 to 3)

[Chem. 21]

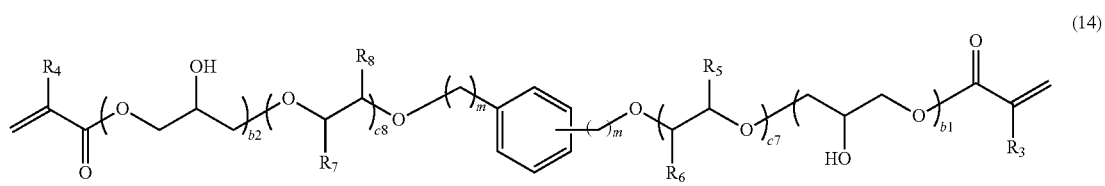

(14)

(in Formula (14), $R_3$ to $R_8$ are each independently H or $CH_3$; b1 and b2 each independently indicate an integer of 0 to 2; c7 and c8 each independently indicate an integer of 0 to 5; and m indicates 0 or 1)

[Chem. 22]

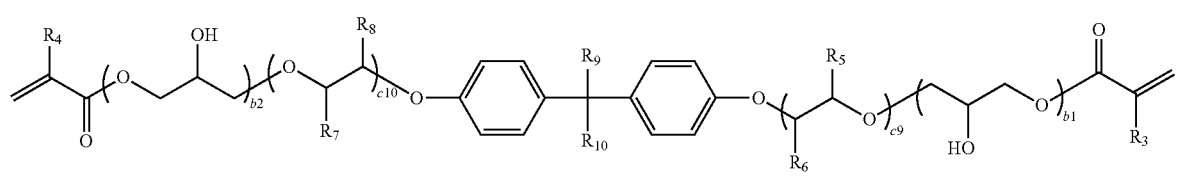

(15)

(in Formula (15), $R_3$ to $R_{10}$ are each independently H or $CH_3$; b1 and b2 each independently indicate an integer of 0 to 2; and c9 and c10 each independently indicate an integer of 0 to 30)

[Chem. 23]

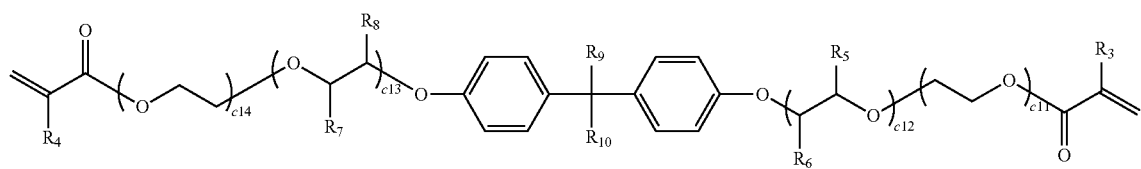

(16)

(in Formula (16), $R_3$ to $R_{10}$ are each independently H or $CH_3$; c11 to c14 indicate integers of 1 or above and satisfy c11+c12+c13+c14=4 to 30)

[Chem. 24]

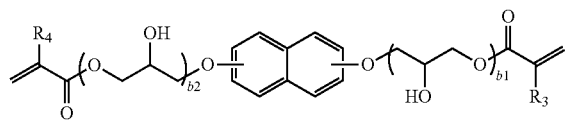
(17)

(in Formula (17), $R_3$ and $R_4$ are each independently H or $CH_3$; and b1 and b2 each independently indicate an integer of 0 to 2)

[Chem. 25]

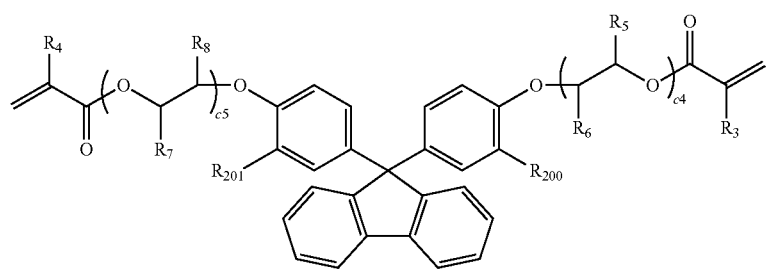
(18)

(in Formula (18), $R_3$ to $R_3$ are each independently H or $CH_3$; $R_{200}$ and $R_{201}$ are each independently H, $CH_3$ or a phenyl group; and c4 and c5 each independently indicate an integer of 0 to 5)

[Chem. 26]

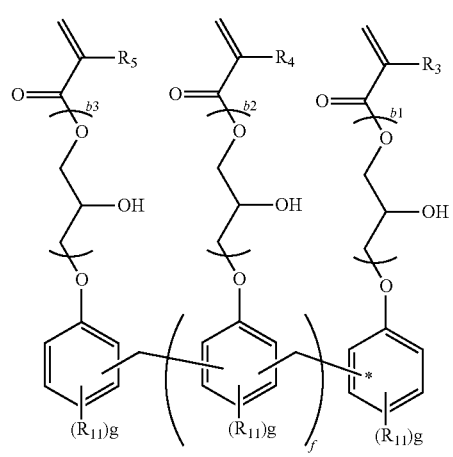
(19)

(in Formula (19), $R_3$ to $R_5$ and $R_{11}$ are each independently H or $CH_3$; b1 to b3 each independently indicate an integer of 0 to 2; and f indicates an integer of 1 to 20)

[Chem. 27]

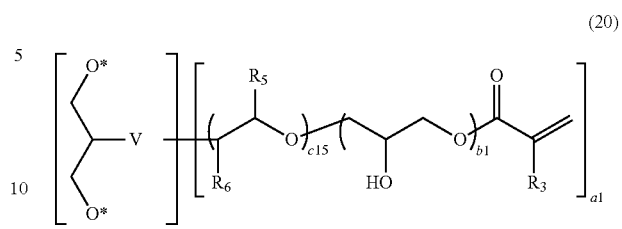
(20)

(in Formula (20), * represents a bonding hand; V is OH or an oxygen atom having a bonding hand (*); $R_3$, $R_5$ and $R_6$ are each independently H or $CH_3$; a1 indicates 2 or 3; b1 indicates an integer of 0 to 2; and c15 indicates an integer of 0 to 20)

[Chem. 28]

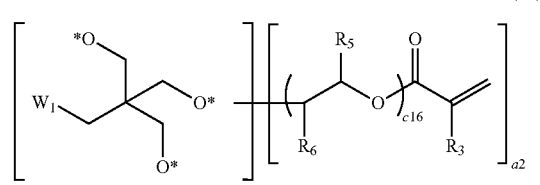
(21)

(in Formula (21), * represents a bonding hand; W1 is H, $CH_3$, OH or an oxygen atom having a bonding hand (*); $R_3$, $R_5$ and $R_6$ are each independently H or $CH_3$; a2 indicates 3 or 4; and c16 indicates an integer of 0 to 20)

[Chem. 29]

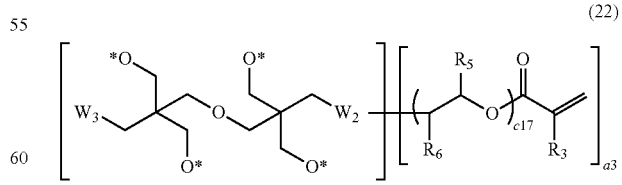
(22)

(in Formula (22), * represents a bonding hand; W2 and W3 are each independently H, $CH_3$, OH or an oxygen atom having a bonding hand (*); $R_3$, $R_5$ and $R_6$ are each independently H or $CH_3$; a3 indicates an integer of 4 to 6; and c17 indicates an integer of 0 to 3)

[Chem. 30]

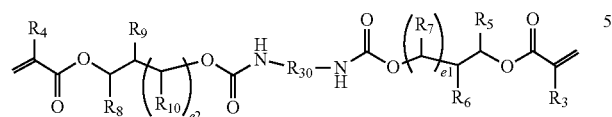

(23)

(in Formula (23), R is hexamethylene, isophorone (1-methylene-3-ethylene-3-methyl-5,5-dimethyl-cyclohexane), norbornanedimethylene, dicyclohexylenemethane, cyclohexanedimethylene or xylylene; $R_3$ to $R_{10}$ are each independently H or $CH_3$; and e1 and e2 each independently indicate an integer of 0 to 2)

[Chem. 31]

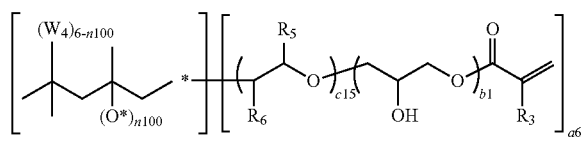

(24)

(in Formula (24), $R_3$, $R_5$ and $R_6$ are each independently H or $CH_3$; b1 indicates an integer of 0 to 2; c15 indicates an integer of 0 to 20; and n100 indicates an integer of 1 to 6)

[Chem. 32]

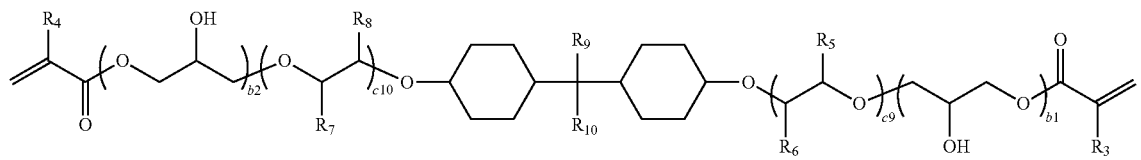

(25)

(in Formula (25), $R_3$ to $R_{10}$ are each independently H or $CH_3$; b1 and b2 each independently indicate an integer of 0 to 2; and c9 and c10 each independently indicate an integer of 0 to 5)

[Chem. 33]

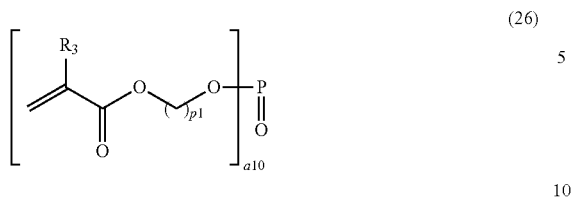
(26)

(in Formula (26), $R_3$ is H or $CH_3$; p1 indicates an integer of 1 to 6; and a10 indicates 3)

[Chem. 34]

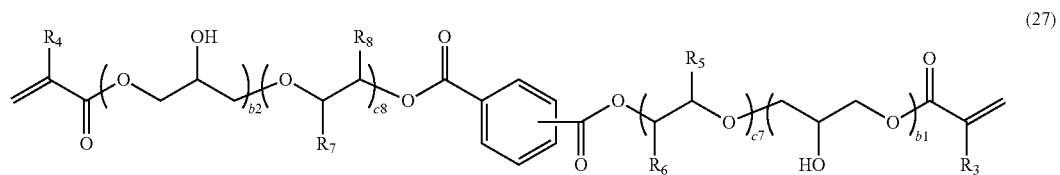
(27)

(in Formula (27), $R_3$ to $R_8$ are each independently H or $CH_3$; b1 and b2 each independently indicate an integer of 0 to 2; and c4 and c5 each independently indicate an integer of 0 to 5)

[Chem. 35]

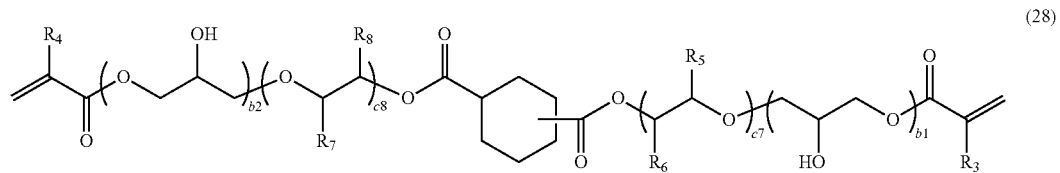
(28)

(in Formula (28), $R_3$ to $R_8$ are each independently H or $CH_3$; b1 and b2 each independently indicate an integer of 0 to 2; and c4 and c5 each independently indicate an integer of 0 to 5)

[Chem. 36]

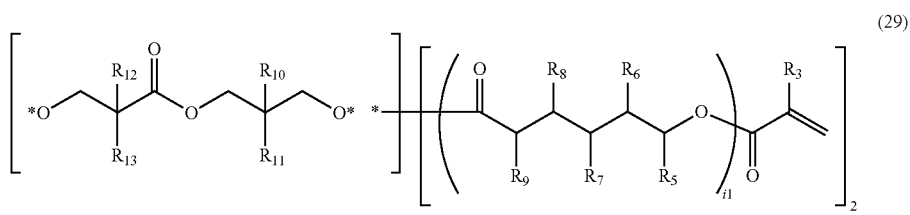
(29)

(in Formula (29), $R_3$ and $R_5$ to $R_{13}$ are each independently H or $CH_3$; and i1 indicates an integer of 0 to 5)

[Chem. 37]

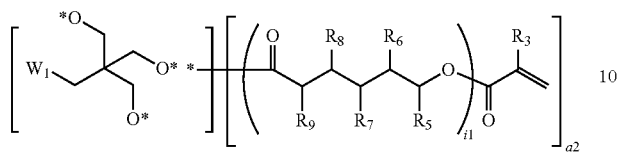
(30)

(in Formula (30), $R_3$ and $R_5$ to $R_9$ are each independently H or $CH_3$; W1 is H, $CH_3$, OH or an oxygen atom having a bonding hand (*); a2 indicates 3 or 4; and it indicates an integer of 0 to 5)

[Chem. 38]

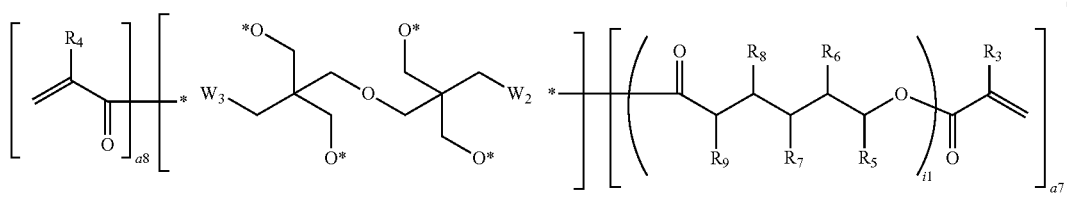
(31)

(in Formula (31), $R_3$ to $R_9$ are each independently H or $CH_3$; W2 and W3 are each independently H, $CH_3$, OH or an oxygen atom having a bonding hand (*); a7 indicates an integer of 1 to 6; a8 indicates an integer of 0 to 5; and a7+a8=2 to 6)

[Chem. 39]

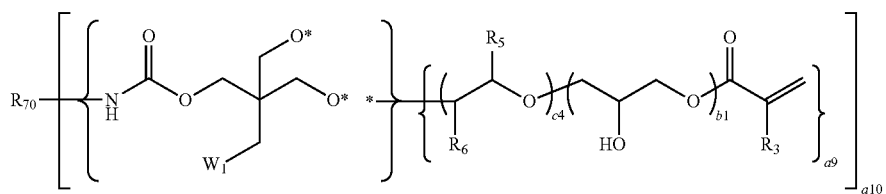
(32)

(in Formula (32), $R_{70}$ is toluylene, diphenylmethane, hexamethylene, isophorone (1-methylene-3-ethylene-3-methyl-5,5-dimethyl-cyclohexane), norbornanedimethylene, dicyclohexylenemethane, cyclohexanedimethylene, N,N',N"-tris(hexamethylene)-isocyanurate, N,N,N'-tris(hexamethylene)-urea, N,N,N',N'-tetrakis(hexamethylene)-urea or xylylene; $R_3$, $R_5$ and $R_6$ are each independently H or $CH_3$; W1 is H, $CH_3$, OH or an oxygen atom having a bonding hand (*); a9 indicates an integer of 1 to 4; a10 indicates an integer of 2 to 4; b1 indicates an integer of 0 to 2; and c4 indicates an integer of 0 to 5)

[Chem. 40]

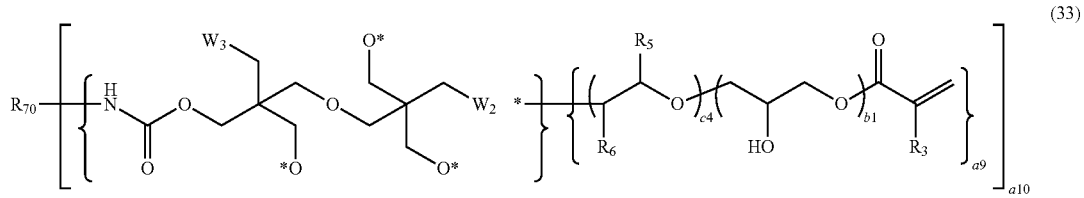

(in Formula (33), $R_{70}$ is toluylene, diphenylmethane, hexamethylene, isophorone (1-methylene-3-ethylene-3-methyl-5,5-dimethyl-cyclohexane), norbornanedimethylene, dicyclohexylenemethane, cyclohexanedimethylene, N,N',N"-tris(hexamethylene)-isocyanurate, N,N,N'-tris(hexamethylene)-urea, N,N,N',N'-tetrakis(hexamethylene)-urea or xylylene; $R_3$, $R_5$ and $R_6$ are each independently H or $CH_3$; W1 is H, $CH_3$, OH or an oxygen atom having a bonding hand (*); a9 indicates an integer of 1 to 4; a10 indicates an integer of 2 to 4; b1 indicates an integer of 0 to 2; and c4 indicates an integer of 0 to 5).

5. The monolayer film according to claim 1, wherein the water contact angle of the monolayer film is not more than 30°.

6. The monolayer film according to claim 1, wherein the film thickness of the monolayer film is 0.5 to 100 μm.

7. An antifogging material comprising the monolayer film described in claim 1.

8. An antifouling material comprising the monolayer film described in claim 1.

9. An antistatic material comprising the monolayer film described in claim 1.

10. A stack wherein the monolayer film described in claim 1 is disposed on at least one surface of a substrate.

* * * * *